(12) United States Patent
Goyal et al.

(10) Patent No.: US 11,497,056 B2
(45) Date of Patent: Nov. 8, 2022

(54) CHANNEL ACCESS PROCEDURES FOR DIRECTIONAL SYSTEMS IN UNLICENSED BANDS

(71) Applicant: IDAC Holdings, Inc., Wilmington, DE (US)

(72) Inventors: Sanjay Goyal, Deer Park, NY (US); Arnab Roy, Phoenixville, PA (US); Alpaslan Demir, East Meadow, NY (US); J. Patrick Tooher, Montreal (CA); Janet Stern-Berkowitz, Little Neck, NY (US); Moon-il Lee, Melville, NY (US); Lorenza Giupponi, Barcelona (ES); Sandra Lagén Morancho, Igualada (ES); Biljana Bojović, Barcelona (ES); Mihaela Beluri, Jericho, NY (US)

(73) Assignee: IDAC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/754,355

(22) PCT Filed: Oct. 17, 2018

(86) PCT No.: PCT/US2018/056353
§ 371 (c)(1),
(2) Date: Apr. 7, 2020

(87) PCT Pub. No.: WO2019/079500
PCT Pub. Date: Apr. 25, 2019

(65) Prior Publication Data
US 2020/0314906 A1 Oct. 1, 2020

Related U.S. Application Data

(60) Provisional application No. 62/689,046, filed on Jun. 22, 2018, provisional application No. 62/574,548, filed on Oct. 19, 2017.

(51) Int. Cl.
*H04W 4/00* (2018.01)
*H04W 74/08* (2009.01)
*H04B 7/06* (2006.01)

(52) U.S. Cl.
CPC ...... *H04W 74/0816* (2013.01); *H04B 7/0695* (2013.01)

(58) Field of Classification Search
CPC ............ H04W 74/0816; H04W 84/12; H04W 74/0808; H04W 72/046; H04W 16/28; H04W 28/26
See application file for complete search history.

(56) References Cited

U.S. PATENT DOCUMENTS

| 2002/0158801 A1 | 10/2002 | Crilly |
| 2003/0152086 A1* | 8/2003 | El Batt ............. H04W 74/0816 370/400 |

(Continued)

FOREIGN PATENT DOCUMENTS

| RU | 2367094 C1 | 9/2009 |
| WO | 2017132840 A1 | 8/2017 |

OTHER PUBLICATIONS

Third Generation Partnership Project, "Coexistence and Channel Access For NR-Based Unlicensed Band Operation". HiSilicon Huawei, 3GPP TSG RAN WG1 Meeting #91, R1-1719841, Nov. 27-Dec. 1, 2017, 7 pages.

(Continued)

Primary Examiner — Khalid W Shaheed
(74) Attorney, Agent, or Firm — Invention Mine LLC

(57) ABSTRACT

A method to reserve a directional channel, such as in an unlicensed spectrum for instance, is disclosed. In an example embodiment, the method may be performed by a receiving node, such as a user equipment (UE) for instance. In such method, the receiving node may receive an enhanced directional transmit request message from a transmitting (Continued)

node and transmit an enhanced directional transmit confirmation message using one or more first beams, with at least one first beam being directed in a first direction towards the transmitting node. Further, the receiving node may transmit at least one additional enhanced directional transmit confirmation message using one or more second beams, with at least one second beam being directed in a second direction towards a potentially interfering node. In the method, the second direction is a different direction than the first direction.

32 Claims, 42 Drawing Sheets

(56) References Cited

U.S. PATENT DOCUMENTS

| | | |
|---|---|---|
| 2009/0232103 A1 | 9/2009 | Kesselman |
| 2010/0054213 A1 | 3/2010 | Trainin |
| 2011/0205969 A1* | 8/2011 | Ahmad ................ H04W 16/28 370/328 |
| 2011/0211490 A1* | 9/2011 | Nikula .................. H04B 7/086 370/252 |
| 2017/0104563 A1 | 4/2017 | Lee |
| 2017/0105224 A1* | 4/2017 | Ghanbarinejad ... H04W 72/042 |
| 2017/0171887 A1 | 6/2017 | Shi |
| 2018/0098335 A1* | 4/2018 | Sun ...................... H04W 16/28 |
| 2018/0184457 A1* | 6/2018 | Islam .................. H04W 72/082 |
| 2018/0324825 A1 | 11/2018 | Jiang |
| 2018/0352577 A1* | 12/2018 | Zhang ................. H04W 16/14 |

OTHER PUBLICATIONS

Third Generation Partnership Project, "Coexistence and Channel Access For NR Unlicensed Band Operation". HiSilicon Huawei, 3GPP TSG RAN WG1 Meeting #90, R1-1713785, Aug. 21-25, 2017, 5 pages.

Harmonised European Standard, "Multiple-Gigabit/s Radio Equipment Operating In The 60 GHz Band; Harmonised Standard Covering The Essential Requirements Of Article 3.2 of Directive 2014/53/EU". ETSI EN 302 567, V2.1.1, Jul. 2017, 40 pages.

International Searching Authority and Written Opinion of the International Searching Authority for PCT/US2018/056353 dated Dec. 21, 2018.

International Preliminary Report on Patentability for PCT/US2018/056353 dated Apr. 21, 2020, 8 pages.

* cited by examiner

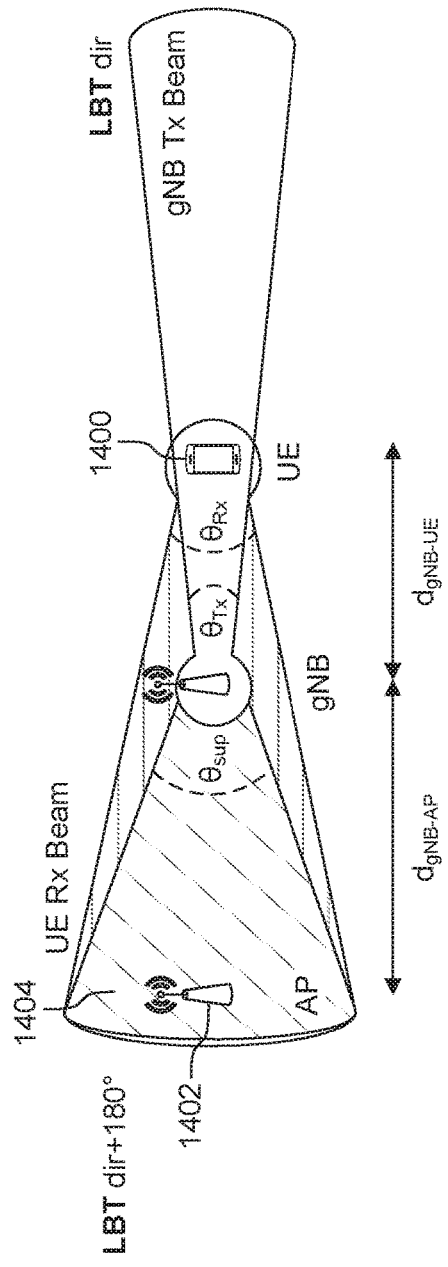
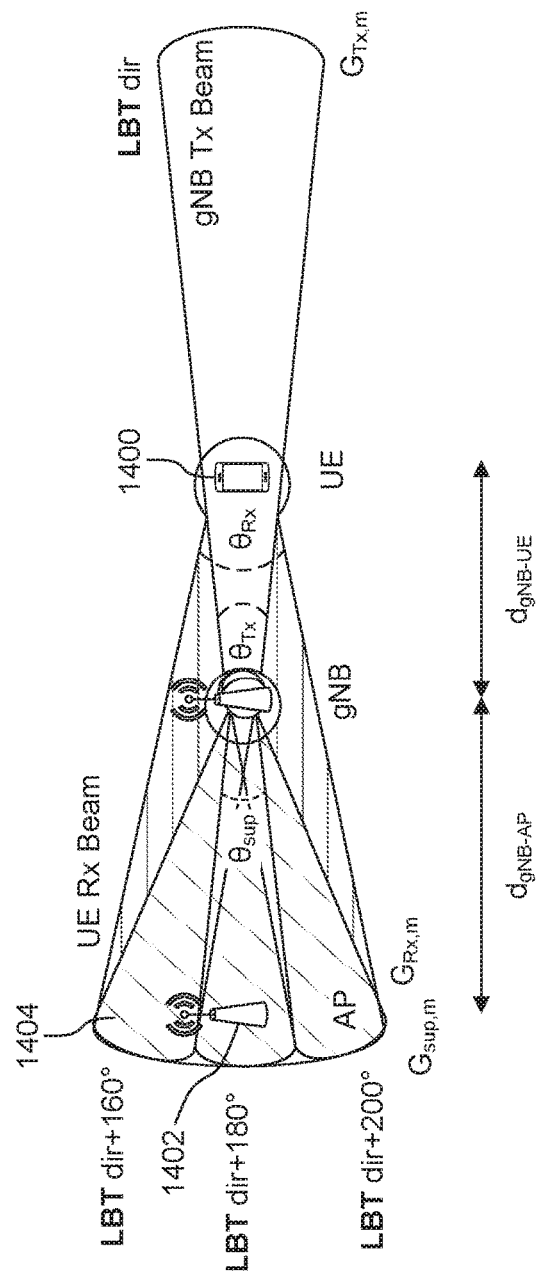
FIG. 17A
FIG. 17B

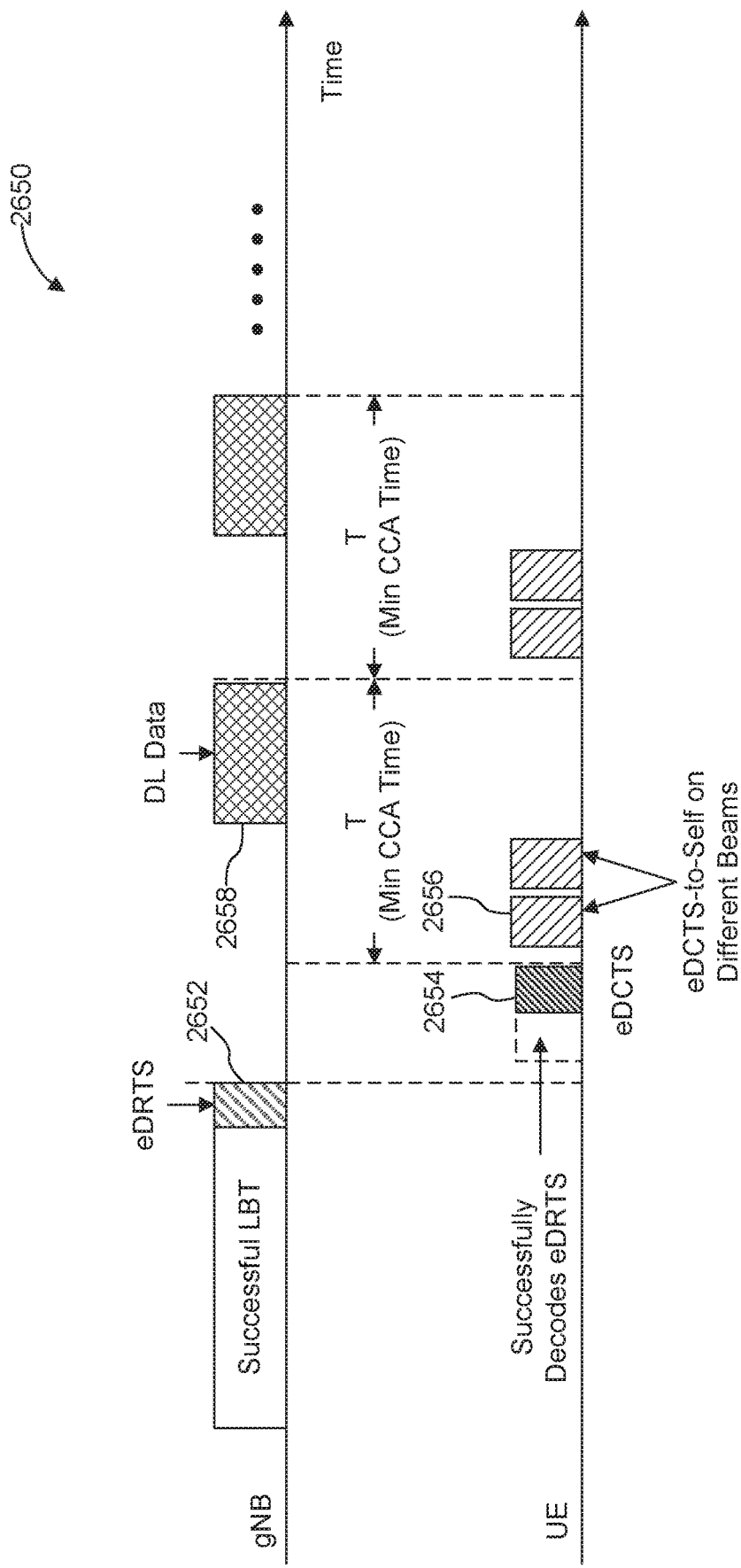

CHANNEL ACCESS PROCEDURES FOR DIRECTIONAL SYSTEMS IN UNLICENSED BANDS

CROSS-REFERENCE TO RELATED APPLICATIONS

The present application is a national stage application under 35 U.S.C. § 371 of International Application No. PCT/US2018/056353, entitled "CHANNEL ACCESS PROCEDURES FOR DIRECTIONAL SYSTEMS IN UNLICENSED BANDS," filed on Oct. 17, 2018, which claims benefit under 35 U.S.C. § 119(e) from U.S. Provisional Patent Application Ser. No. 62/574,548, filed Oct. 19, 2017, entitled "Channel Access for Directional Systems In Unlicensed Bands," and U.S. Provisional Patent Application Ser. No. 62/689,046, filed Jun. 22, 2018, entitled "Channel Access Procedures For Directional Systems In Unlicensed Bands," both of which are incorporated herein by reference in their entirety.

BACKGROUND

Wireless communications may need to support applications requirements. Application requirements may vary. For example, an application may require low latency, may be delay tolerant. Some applications may require high reliability. An application may include enhanced mobile broadband (eMBB), machine-type communications (MTC), massive MTC (mMTC) and/or ultra-reliable-and-low-latency communications (URLLC) applications. Applications may be useful in industry (e.g., automotive, health, agriculture, utilities and/or logistics).

Wireless communications may be deployed using licensed and/or unlicensed spectrums. An unlicensed spectrum may be used for non-cellular services and/or other applications (e.g., Wi-Fi). An unlicensed spectrum may be considered by cellular operators as a complementary tool. For example, an unlicensed spectrum may augment a cellular operator's service offerings by meeting a high demand for broadband data. An unlicensed spectrum may pose additional constraints on the use of the spectrum since, for example, an unlicensed spectrum may be shared by users. Users may interfere with each other.

SUMMARY

Methods and systems are described herein for reserving a directional channel in the presence of potentially interfering nodes(s), such as in an unlicensed spectrum for instance.

According to some embodiments, a method performed by a receiving node to reserve a directional channel includes: receiving a directional Request-to-Send (DRTS) message from a transmitting node; transmitting a directional Clear-to-Send (DCTS) message using one or more first beams, with at least one first beam being directed in a first direction towards the transmitting node; determining a second direction, the second direction being a different direction than the first direction; and transmitting at least one additional DCTS message using one or more second beams, with at least one second beam being directed in the second direction towards a potentially interfering node. In such method, the receiving node may be a wireless transmit/receive unit, and the transmitting node may be a base station. Further, the method may be performed by the receiving node to reserve the directional channel in an unlicensed spectrum.

In one example, the second direction may be determined based on information from a listen-before-talk (LBT) assessment of the directional channel. In other example, the DRTS message may contain an indication of the second direction, and the second direction may be determined based on the indication in the DRTS message. In yet another example, the second direction may be determined based on directional channel measurements.

In some embodiments, the DRTS message is an enhanced DRTS (eDRTS) message, and the DCTS message is an enhanced DCTS (eDCTS) message. In one example, the second direction may be determined from the eDRTS message. Further, in some embodiments, the at least one additional DCTS message is an enhanced DCTS-to-Self (eDCTS-to-Self) message. The DCTS message transmitted towards the transmitting node may indicate a count of eDCTS-to-Self message transmissions to be performed by the receiving node.

In some embodiments, the at least one additional DCTS message includes a defer duration field that specifies an amount of time for which a transmission is to be deferred. In some embodiments, the at least one additional DCTS message indicates a remaining time for which the directional channel is reserved. The at least one additional DCTS message may include a time remaining in a maximum channel occupancy time (MCOT).

In some embodiments, the at least one additional DCTS message includes multiple enhanced DCTS (eDCTS) messages. In one example, the at least one additional DCTS message may be transmitted multiple times within a maximum channel occupancy time (MCOT). In some embodiments, the method further includes: receiving data from the transmitting node; and in between receiving the data from the transmitting node, periodically transmitting subsequent one or more additional DCTS messages in at least the second direction within a MCOT. Further, in some embodiments, transmitting the at least one additional DCTS message using the one or more second beams includes transmitting the at least one additional DCTS message on different beams.

In some other embodiments, the method further includes: receiving a second DRTS message from the transmitting node; and transmitting a directional Deny-to-Send (DDTS) message to the transmitting node in response to the second DRTS message when the receiving node detects potential directional interference. The DDTS message may be an enhanced DDTS (eDDTS) message, and the eDDTS message may identify a node transmitting an interfering signal.

In some embodiments, a number of the at least one additional DCTS message to be transmitted is based on at least one of (i) a number of potentially interfering nodes, (ii) a power of the one or more second beams, and (iii) a width of the one or more second beams. Contents of each of the DRTS, DCTS, and the at least one additional DCTS message may be scrambled using a sequence that is common to a group of cells. In one example, contents of each of the DRTS, DCTS, and the at least one additional DCTS message may be scrambled using a Cell Group Sequence (CGS) that is common to a group of cells.

In yet other embodiments, the method further includes: performing a first directional listen-before-talk (LBT) assessment in a direction towards another node to which the receiving node intends to transmit, wherein the another node is different from the transmitting node; determining if a channel between the receiving node and the another node is busy based on the performed first directional LBT assessment; performing a second directional LBT assessment in a reverse direction; and determining if an interfering signal is detected from the reverse direction so as to either proceed with a transmission to the another node or defer the transmission if the interfering signal is detected.

According to some embodiments, another method performed by a receiving node to reserve a directional channel includes: receiving an enhanced directional transmit request message from a transmitting node; transmitting an enhanced directional transmit confirmation message using one or more first beams, with at least one first beam being directed in a first direction towards the transmitting node; and transmitting at least one additional enhanced directional transmit confirmation message using one or more second beams, with at least one second beam being directed in a second direction towards a potentially interfering node, wherein the second direction is a different direction than the first direction. Further, in some embodiments, the method is performed by the receiving node to reserve the directional channel in an unlicensed spectrum.

Other embodiments include a wireless transmit/receive unit, a system, and a receiving node configured (e.g., having a processor and a non-transitory computer-readable medium storing instructions for execution by the processor) to perform the methods described herein.

BRIEF DESCRIPTION OF THE DRAWINGS

FIG. 17A illustrates an example of an effect of increasing an energy detection (ED) threshold for a LBT in a single opposite direction with an optimized beam shape, in accordance with some embodiments.

FIG. 17B illustrates an example of an effect of increasing an ED threshold for a LBT in multiple opposite directions with predefined beams, in accordance with some embodiments.

FIG. 31 illustrates an example of downlink data transmission with an eDCTS-to-Self transmission, in accordance with some embodiments.

The entities, connections, arrangements, and the like that are depicted in, and in connection with, the various figures are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least some embodiments, . . . " For brevity and clarity of presentation, this implied leading clause is not repeated ad nauseum in the detailed description of the drawings.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
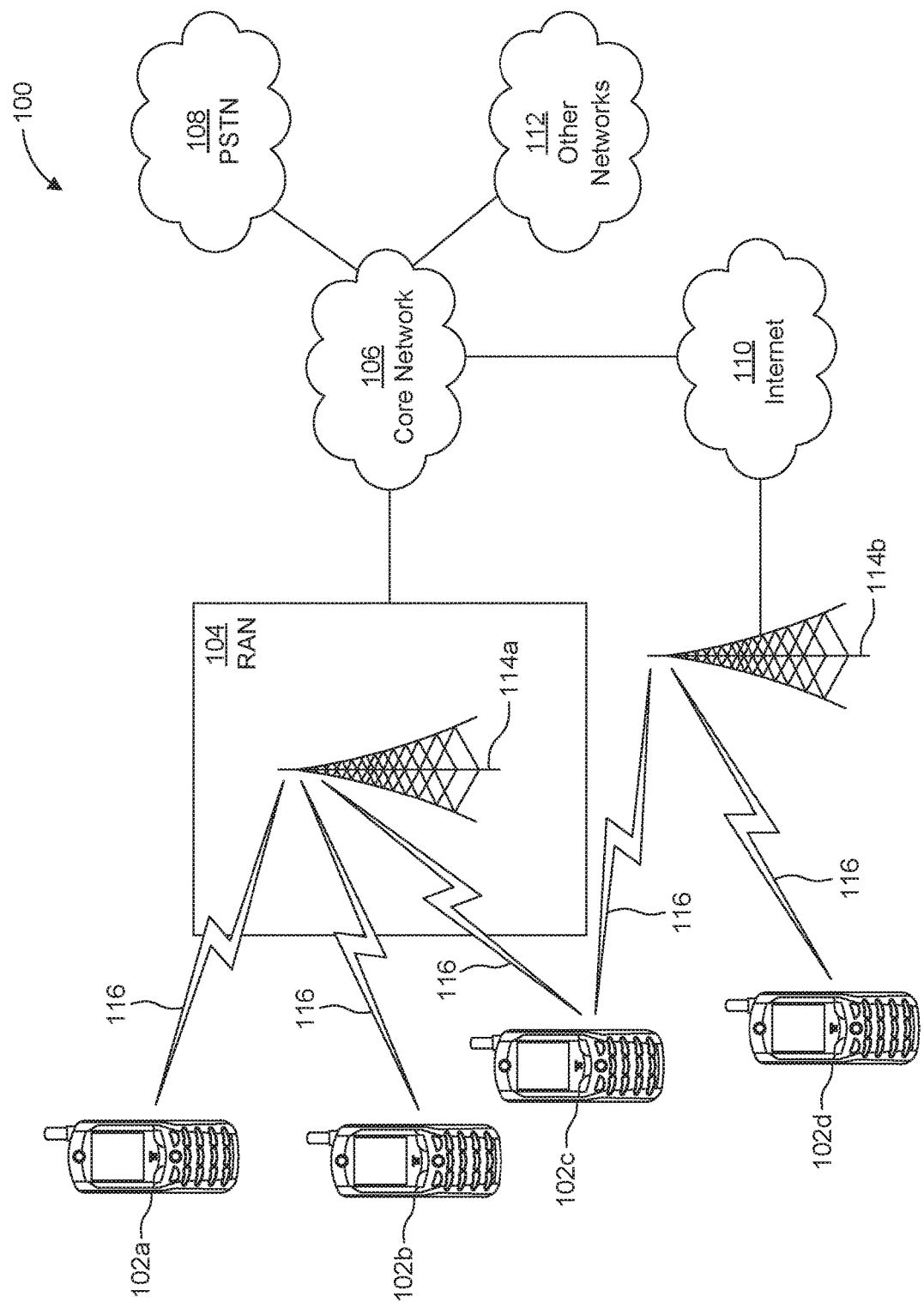
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WVRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
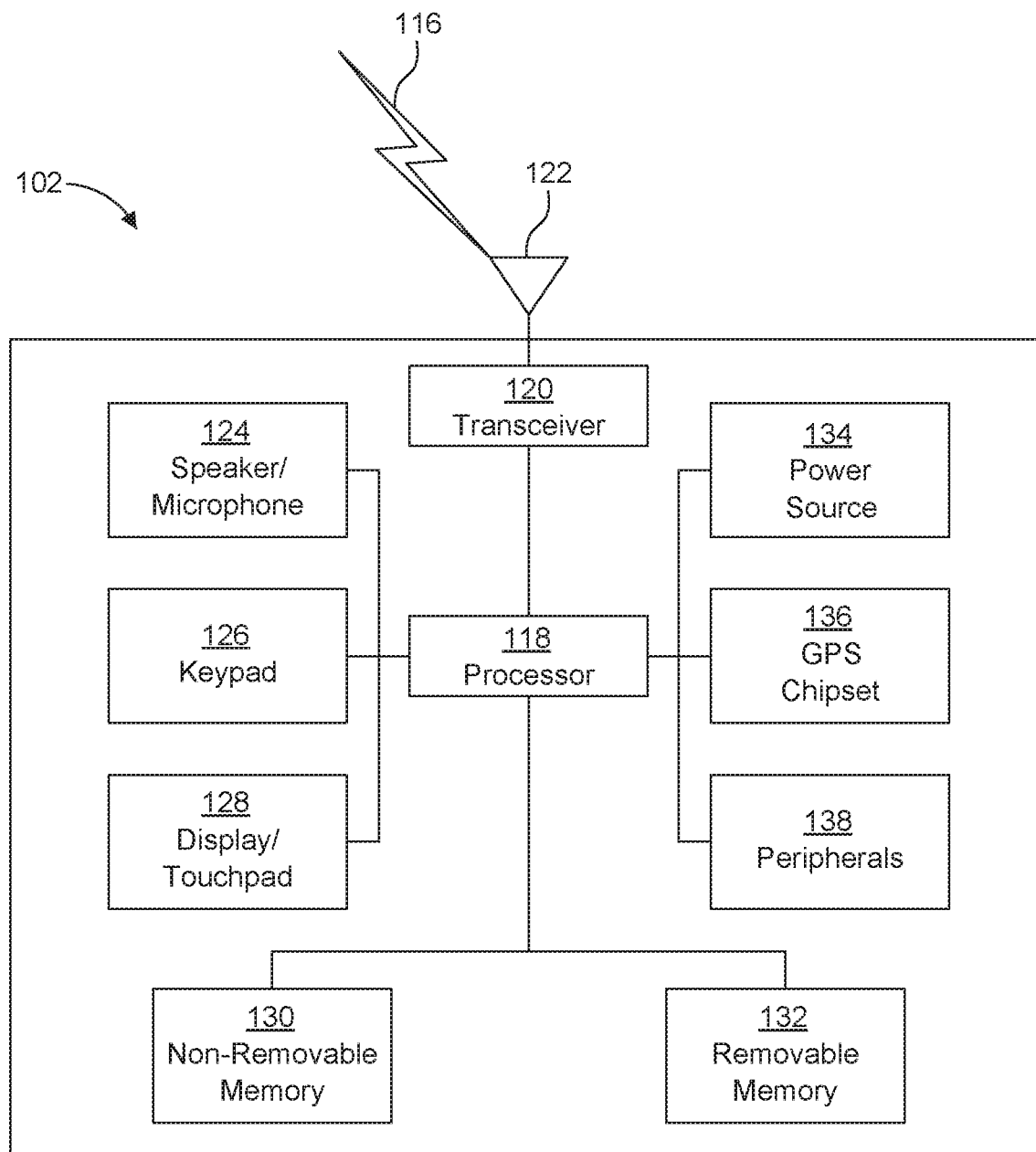
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
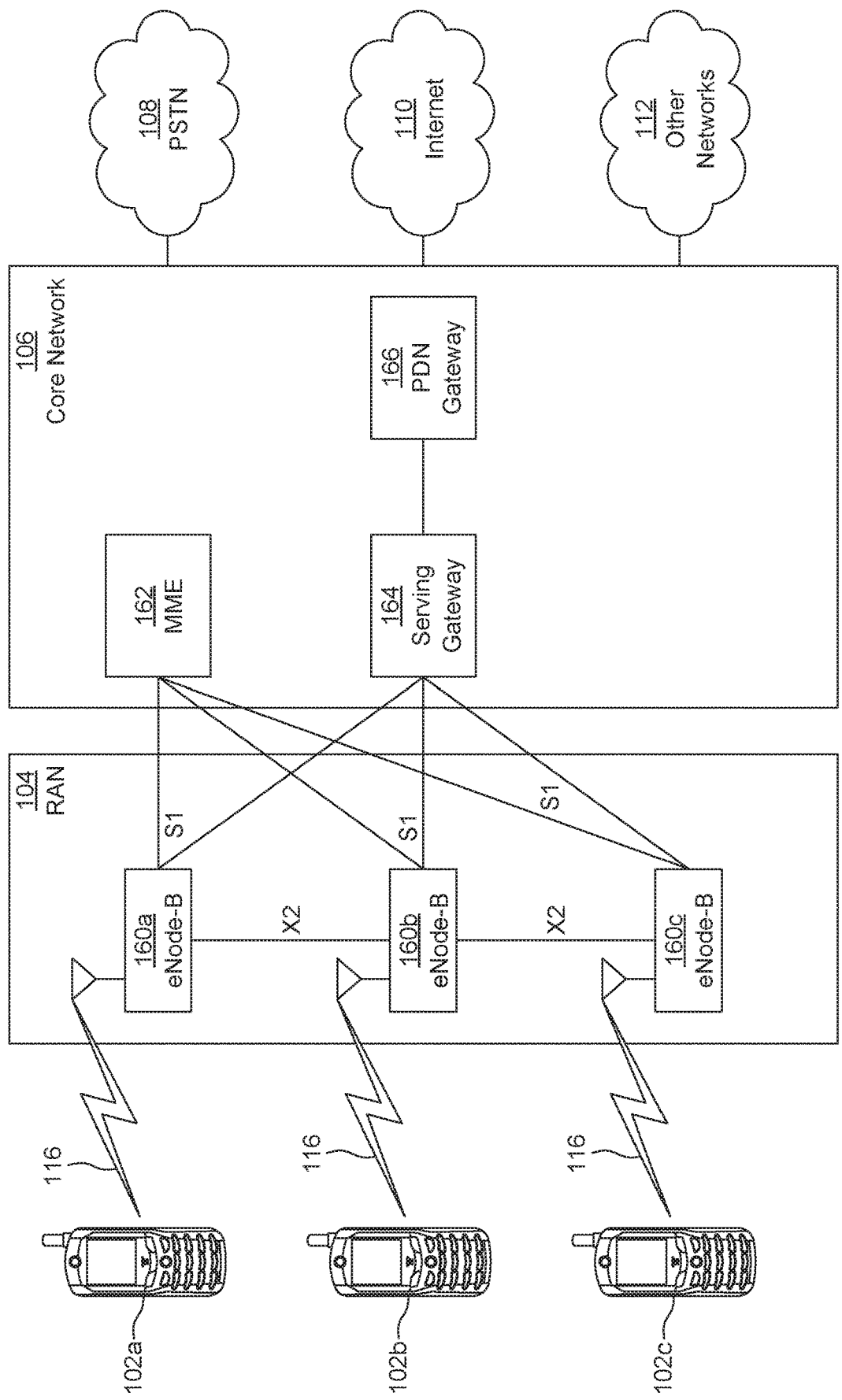
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 20A-D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11 af and 802.11 ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11 ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11 ac, 802.11 af, and 802.11 ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11 ah is 6 MHz to 26 MHz depending on the country code.

Figure 1D:
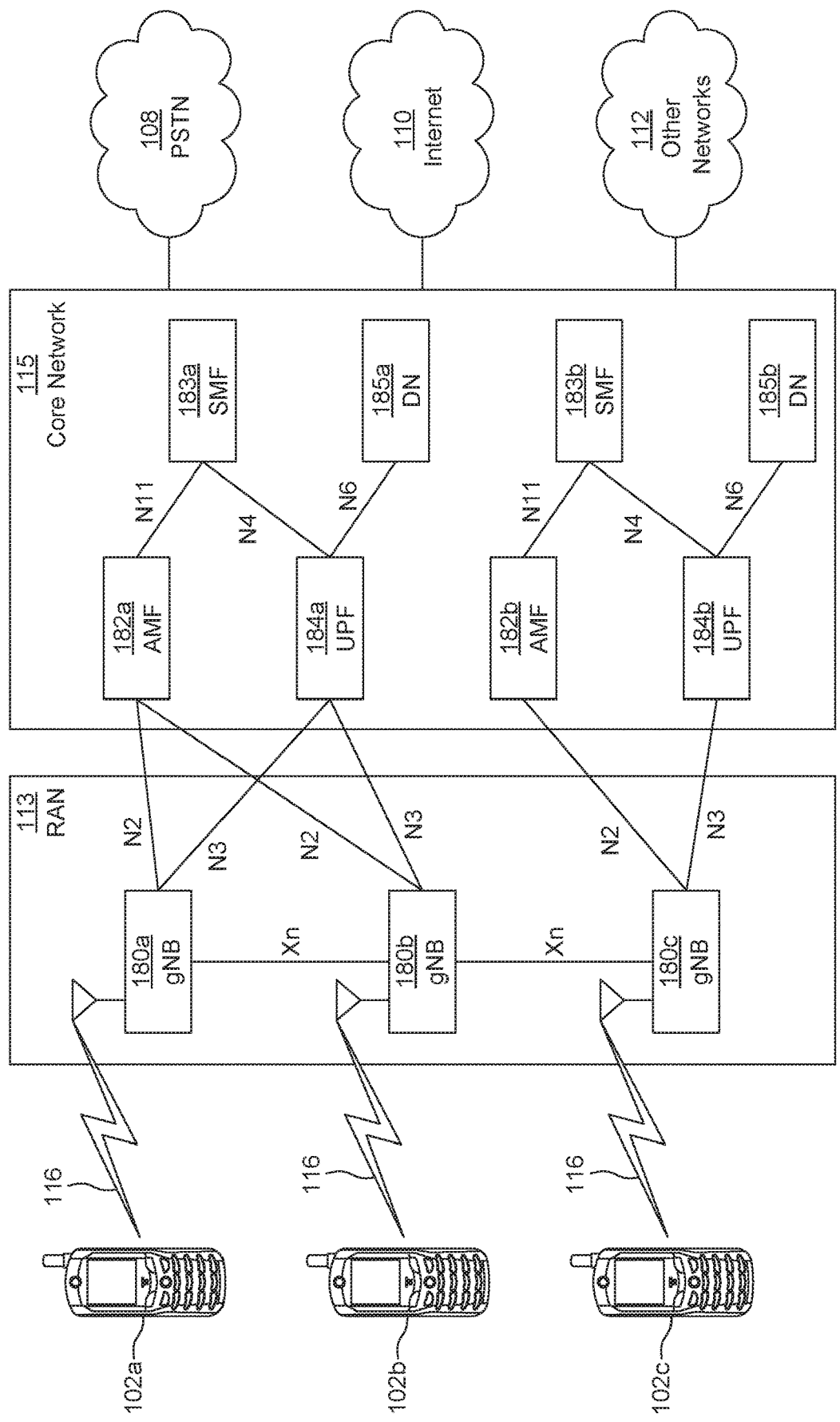
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WIRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WIRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Operation and/or use of a cell, transmission-reception point (TRP), and/or carrier in an unlicensed band may be stand-alone. Operation and/or use of a cell, transmission-reception point (TRP), and/or carrier in an unlicensed band may be assisted. For example, assistance may be provided by a carrier in a licensed band, which may be called licensed assisted access (LAA). For LAA, a licensed cell, TRP, and/or carrier may be the primary cell, TRP, and/or carrier. For LAA, a licensed cell, TRP, and/or carrier may be the anchor cell, TRP, or carrier.

A cellular system that operates in an unlicensed spectrum may coexist with other users of the spectrum. Other users of the spectrum may use unlicensed technologies (e.g., Wi-Fi, WiGig, and/or other cellular operators). A cellular system that operates in an unlicensed spectrum may attempt to minimize interference and/or may consider the fairness of other users of the spectrum. For example, a cellular system may use listen-before-talk (LBT), and/or clear channel assessment (CCA). In LBT and/or CCA, a system node such as an access point (AP), eNodeB (eNB), gNodeB (gNB), TRP, user equipment (UE), and the like, may listen to a channel (e.g., a frequency band with a certain center frequency and bandwidth). This may be done to determine if there may be another user using the channel before transmitting on the channel and/or transmitting on a portion of the channel. Listening and/or determining the usage of another may include and/or be based on measurements. Measurements may include energy detection.

LBT, CCA, and LBT/CCA may be used interchangeably herein. A channel may be determined to be busy, occupied, and/or in use when a measurement (e.g., of energy) is made. The determination may, for example, be based on an energy measurement that may be at and/or above a threshold. For example, a channel may be determined to be idle, free, clear, and/or unused when a measurement (e.g., of energy) is at or below a threshold.

Clear, free, idle, not occupied, and/or not busy may be used interchangeably. Not clear, not free, not idle, occupied, and/or busy may be used interchangeably. Channel and/or operating channel may be used interchangeably. A CCA failure may mean a channel was found to be busy. A CCA pass may mean that a channel was found to be clear.

A potential transmitter on a channel (e.g., a UE with a potential uplink (UL) transmission and/or an eNB with a potential downlink (DL) transmission) may evaluate and/or monitor (e.g., receive) a channel. This may be done, for example, to measure and/or determine signal presence and/or interference on the channel. This may be done prior to transmission, for example, in order to determine whether the channel may be in use (e.g., busy and/or occupied) by another (e.g., another system, user, and/or signal).

The potential transmitter may, e.g., as part of LBT/CCA, compare the received signal and/or interference from the channel to a criteria. The criteria may be a (e.g., one or more) threshold level(s). The comparison (e.g., between the received signal and criteria) may be used to determine whether the channel may be free. If, for example, the potential transmitter determines the channel may be free, the potential transmitter may transmit on the channel. If, for example, the potential transmitter determines the channel may not be free, the potential transmitter may not transmit on the channel, may defer the potential transmission, and/or discard the potential transmission.

Frame based equipment (FBE) may refer to equipment for which transmit/receive timing may be fixed and/or structured. Load based equipment (LBE), for example, may not perform LBT/CCA according to a certain frame structure (e.g., at a fixed and/or defined time). LBE may perform LBT/CCA, for example, when it has data to transmit.

Equipment may refer to a node and/or device that may transmit and/or receive on a licensed or unlicensed channel. For example, equipment may include a UE, eNB, gNB, TRP, STA, and/or AP.

An eNB, gNB, TRP, STA, cell, base station (BS), and/or AP may be used interchangeably herein (e.g., nodes that may transmit and receive). An eNB, gNB, and/or TRP may be used to represent one or more gNB, TRP, STA, cell, BS, AP, and/or another node such as a network node.

Equipment may perform a LBT/CCA check, which may detect energy on a channel. This may occur before a transmission and/or before a burst of transmissions on an operating channel. An LBT/CCA time period for channel evaluation may be a fixed time and/or have a minimum time. Channel occupancy time (COT) may be the total time during which an equipment may have transmissions on a given channel, e.g., without re-evaluating the availability of the channel. Maximum COT (MCOT) may be the total time that an equipment may use an operating channel for a given transmission and/or burst of transmissions. The MCOT value may be configured and/or allowed (e.g., by regulation). The MCOT value may be, for example, 4 ms and/or 10 ms. The MCOT for equipment may be less than a maximum allowed value. The maximum allowed value may be set by the manufacturer of the equipment, for example.

Idle period may be the time (e.g., a consecutive period of time) during which the equipment may not transmit on the channel. The idle period may have a minimum requirement. The minimum requirement may be based on a COT. For example, the idle period may be 5% of the COT. The idle period may be used by the equipment, for example for the current fixed frame period.

If the equipment determines, e.g., during and/or as a result of LBT/CCA, an operating channel(s) is clear, it may transmit on the clear channel(s). The transmission may be immediate.

In some embodiments, if the equipment determines, e.g., during and/or as a result of LBT/CCA, an operating channel(s) is occupied, it may not transmit on the channel. For example, the equipment may not transmit on the channel until it performs a subsequent LBT/CCA, e.g., that finds the channel clear.

In some embodiments, if the equipment determines, e.g., during and/or as a result of LBT/CCA, that an operating channel is occupied, it may not transmit on that channel. For example, it may not transmit on the channel during the next fixed frame period.

An LBT/CCA may be performed subsequent to a previous LBT/CCA. For example, the previous LBT/CCA may have determined that a channel may not be clear. The subsequent LBT/CCA may involve a wait and/or backoff time before checking whether the channel may be clear.

An LBT/CCA may be performed subsequent to a previous LBT/CCA. For example, the previous LBT/CCA may determine that a channel may not be clear. The subsequent LBT/CCA may involve a longer period during which to determine whether the channel may be clear and/or subsequently transmitting.

A UE may perform CCA to determine whether a channel may be free. If the UE determines the channel is not free, the UE may add an additional backoff and/or wait time (e.g., a contention window amount of time). If, for example, the UE determines the channel is free, the UE may check the channel again. This check may be before an actual transmission, for example, if the actual transmission may not begin right after the channel is determined to be free.

For example, if the UE is not within a check-window (e.g., 25 us) prior to an actual transmission, the UE may perform CCA for (e.g., at least) a check-window (e.g., a check window period of time) prior to an actual transmission. The UE may (e.g., only) transmit if, for example, the channel is determined to be free for a (e.g., at least a) part of the check-window.

A CCA may be a full CCA or a short CCA. A full CCA may include adding a (e.g., one or more) backoff times. For example, a full CCA may be performed when a channel is determined to be busy. A short CCA may be a quick check (e.g., an energy detection check). For example, short CCA may be performed in a check-window prior to the start of transmission, and/or an intended and/or planned transmission.

For example, if a UE performs a CCA for a (e.g., first) subframe (SF) or symbol, the UE may perform a full CCA, which may determine whether the channel is free. The UE may perform a short CCA prior to an actual transmission. The short CCA may be performed, for example, to re-check that the channel is still free. This may occur if there is a gap between the end of the full CCA and the start of the transmission.

Access, use of resources, and/or transmission of resources on a channel, in cell, to a cell, to a TRP and/or another node may be grant-based, allocation-based, and/or scheduler-based.

For example, a UE may (e.g., only) transmit on a set of resources. This may be in response to and/or according to a received grant and/or allocation of resources. Resources may be time and/or frequency resources.

A grant and/or allocation may be provided (e.g., explicitly). For example, an allocation may be provided in a DL control information (DCI). A grant and/or allocation may be configured, for example, by higher layer signaling. A grant and/or allocation may be used by the UE when the UE has data to transmit.

Access, use of resources, and/or transmission on resources on a channel, in cell, to a cell, to a TRP and/or another node may be grant-less and/or grant-free. Grant-less and grant-free may be used interchangeably herein. Resources may be time and/or frequency resources.

For example, a UE may transmit on a (e.g., a set) of resources when the UE has a transmission to make. The UE may determine and/or select the resources on which to transmit from one or more resource(s). The resource(s) may be, for example, a configured set of resources.

Resource(s) may be shared and/or used by another UE. The resource(s) may be referred to as contention-based resources. The transmissions of a (e.g., multiple) UEs may collide when the UEs choose and/or transmit on the same resources at the same time.

Mechanisms may be performed, which may reduce the possibility of collision(s). For example, resource selection may be determined randomly (e.g., partially randomly). Resource selection may be a function of a UE-ID. Different UE(s) (e.g., groups of UE(s)) may be configured with different resources (e.g., sets of resources).

Mechanisms may be included to enable a receiver of a grant-free transmission to identify the sender. For example, the transmission may include an identifier and/or a partial identifier.

LBT procedures may be designed for omni-directional based systems. In omni-direction based systems, transmission energy may be propagated (e.g., equally) in (e.g., all) directions. This may be sensed, for example, by devices (e.g. all devices) residing within the channel sense range of the receivers.

Directional transmissions may overcome propagation limits in mmWave bands. LBT may be performed with a transmit (Tx) beam at a Transmitter. This directional LBT may be referred to as "Legacy LBT" herein. Legacy LBT in directional systems (e.g., highly directional systems) may result in an increase in the number of hidden nodes (e.g., directional hidden node problem).

In directional systems (e.g., highly directional systems), the signal energy for a transmission may concentrate in a spatial region (e.g., a narrow spatial region) covered by the transmitted beam. Devices located in the region of the transmitted beam may sense the presence of the transmissions. Devices located outside of the region of the transmitted beam may not be able to sense the transmission. A device may sense the channel as clear to send. The device may start transmission, which may interfere and/or collide with an ongoing transmission.

In accordance with some embodiments, clear channel assessment (CCA) may include directional enhanced directional request-to-send/enhanced directional clear-to-send (eDRTS/eDCTS). eDRTS messages may be sent on, e.g., multiple adjacent beams or on wider beams. Transmissions may be enabled and/or configured based on quality of service (QoS) requirements. Enhanced signaling may be performed in eDRTS/eDCTS messages. Multiple concurrent eDRTS/eDCTS may be sent on different beam-pair links (BPLs) (e.g., for non-reciprocal beams). An eDCTS message, such as an eDCTS-to-Self message for instance, may be used to achieve greater spatial interference protection. In some embodiments, an eDCTS-to-Self message may be configured differently from the eDCTS message. For example, a successful eDRTS and eDCTS transmission may be followed by multiple eDCTS-to-Self transmissions. The multiple eDCTS-to-Self transmissions may be sent on multiple beams. Dynamic downlink/uplink (DL/UL) switching configurations may be used, which may cause other device transmissions not to interfere with an ongoing transmission.

In accordance with some embodiments, implementations for directional new radio (NR)-WiGig system coexistence in unlicensed bands may be performed. DL/UL switching configurations for a NR link may be determined based on a minimum distributed inter frame spacing (DIFS) duration in the WiGig system. Transmissions may be configured to be performed in a reverse direction per each window (e.g., DIFS period). Multiple block transmissions in the reverse direction may be sent. The transmit power of the transmissions may be increased.

In accordance with some embodiments, a listen-before-talk (LBT) may be performed in paired directions (e.g., in the direction of a receiver and in an opposite direction). This may reduce a number of hidden nodes that may interfere with an ongoing transmission. LBT parameters (e.g., beamwidth, energy detection (ED) thresholds) may be configured to reduce the number of hidden nodes that may interfere with an ongoing transmission. A transmit and receive strategy may be determined based on a function of the sensed power/energy during the LBT.

Figure 2A:
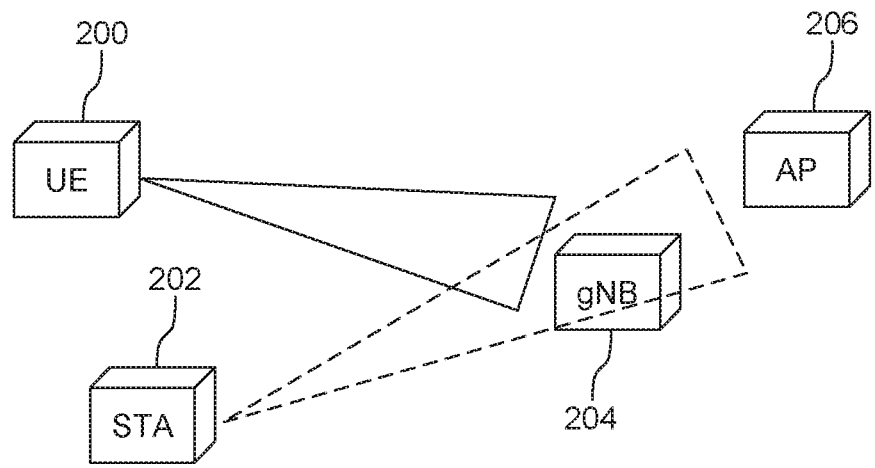
FIG. 2A illustrates an example of interference in beam-based systems using directional-based listen-before-talk (LBT) with a New Radio (NR)-WiGig (Wireless Gigabit Alliance) coexistence.
Figure 2B:
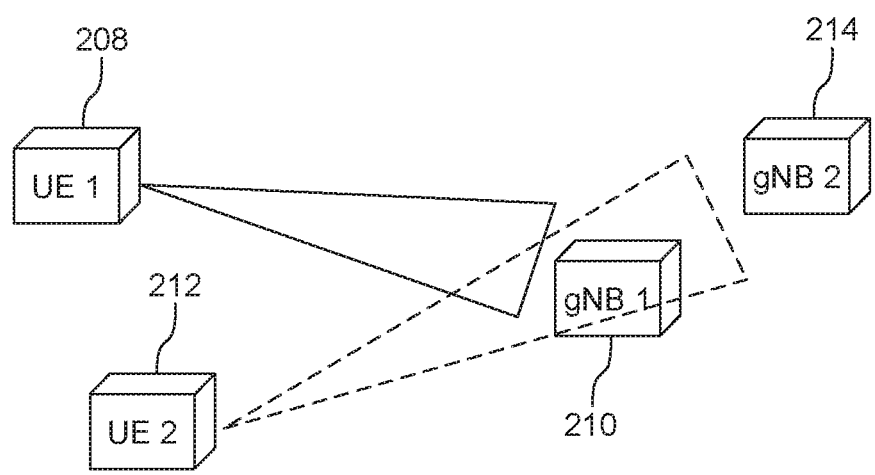
FIG. 2B illustrates an example of interference in beam-based systems using directional-based listen-before-talk (LBT) procedures with a NR-NR coexistence.

FIG. 2A illustrates an example of interference in beam-based systems using directional-based listen-before-talk (LBT) with a New Radio (NR)-WiGig coexistence. For example, as shown in FIG. 2A, a NR and/or WiGig nodes may be co-located. More specifically, a NR UE 200 and a WiGig station (STA) 202 may have packets to send to a NR gNB 204 and/or WiGig access point (AP) 206, respectively. The UE 200 may start its transmission to the gNB 204. The STA 202 may not sense UE's transmission to the gNB 204 (e.g., the directional hidden node problem). The STA 202 may find a channel clear and/or start its transmission to the AP 206. The transmission may interfere and/or collide with the UE's 200 transmission at the gNB 204. FIG. 2B illustrates an example of interference in beam-based systems using directional based listen-before-talk (LBT) procedures with a NR-NR coexistence. As seen in FIG. 2B, a similar situation may occur in the NR-NR coexistence, when there may not be coordination between two NR systems. In FIG. 2B, one NR system may include, e.g., a UE 208 (also denoted as "UE 1") and/or gNB 210 (also denoted as "gNB 1"), and another NR system may include, e.g., a UE 212 (also denoted as "UE 2") and/or a gNB 214 (also denoted as "gNB 2").

Figure 3A:
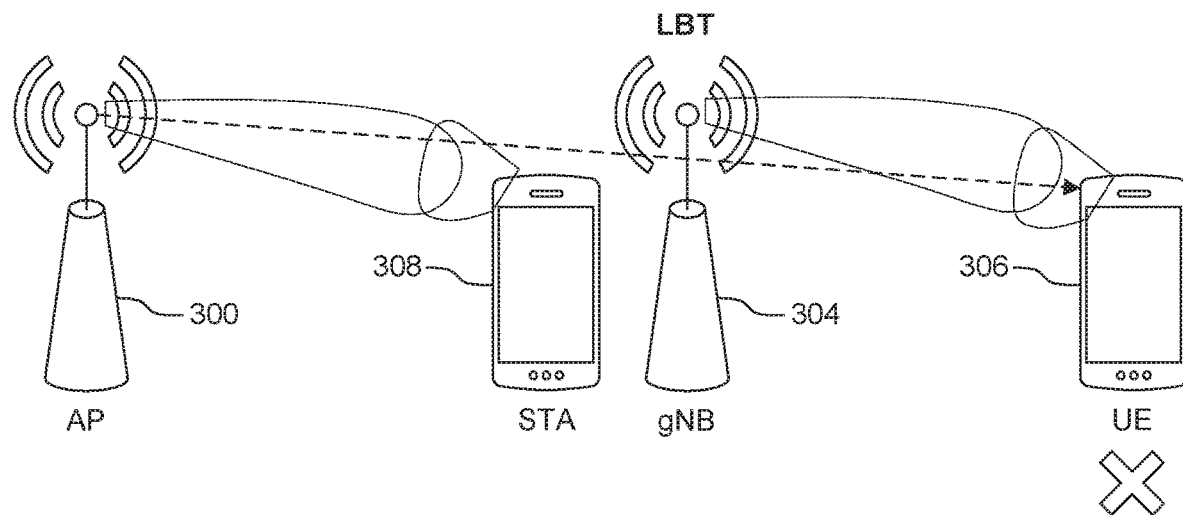
FIG. 3A illustrates an example of a carrier sense in a LBT with interference from an access point (AP) received at a user equipment (UE).
Figure 3B:
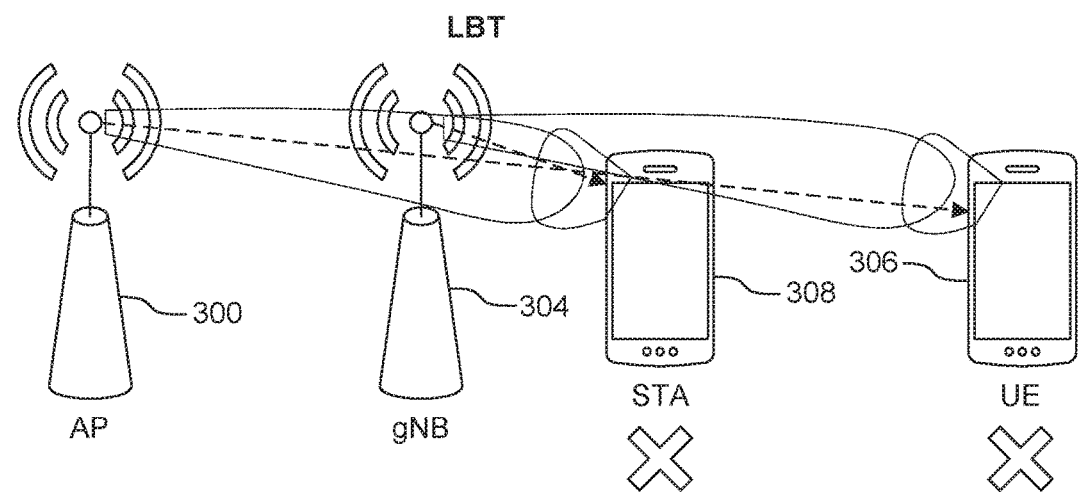
FIG. 3B illustrates an example of a carrier sense in a LBT with interference from a gNB at a station (STA) and/or from a AP at a UE.

FIGS. 3A and 3B illustrate other examples of hidden node problems. FIG. 3A illustrates an example of a carrier sense in a LBT with interference from an access point (AP) received at a user equipment (UE). FIG. 3B illustrates an example of a carrier sense in a LBT with interference from a gNB at a station (STA) and/or from an access point (AP) at a UE.

Referring to FIG. 3A, if a receiving node is in a coverage area of an AP 300, and/or even if a legacy LBT at a transmitting node senses a channel as idle towards a direction of the receiving node, the receiving node may be interfered by the AP 300. The interference may be due to a directional hidden node problem. This may occur when, for example, an AP transmission lies within an antenna boresight of a receive beam of the receiving node, but may not be detected by the directional LBT at the transmitting node. This may be seen in FIG. 3A by a dotted line 302. As seen in FIG. 3A, this may occur if, for example, a gNB 304 is the transmitting node and a UE 306 is the receiving node.

The AP 300 may transmit (e.g., in a directional manner) towards a STA 308. The transmitting node (e.g. the gNB 304 in FIG. 3A) may perform a LBT with a beam aligned towards the direction of a receiver (e.g. the UE 306 in FIG. 3A). This may occur before accessing an unlicensed channel. If, for example, the STA 308 is placed between the AP 300 and the transmitting node (e.g. FIG. 3A), the transmitting node may sense the channel as idle and may proceed with data transmission (e.g., towards the receiver). Interference may be received at the UE receiver from the AP 300, which may be due to a directional hidden node problem. If, for example, the STA 308 is placed between the gNB 304 as the transmitting node and the UE receiver, and/or the STA 308 is not sensed by legacy LBT (see, e.g., FIG. 3B), interference may be received at the STA 308.

FIGS. 3A and 3B illustrate examples of a carrier sense in, e.g., legacy LBT (e.g., a DL access, gNB to UE). The gNB 304 may perform a LBT with a beam aligned towards the UE 306. The gNB 304 may sense the channel as idle. This may occur if, for example, the AP 300 transmits data towards the STA 308, and the gNB 304 proceeds with data transmission towards the UE 306. As seen in FIG. 3A, interference from the AP 300 may be received at the UE 306. As seen in FIG. 3B, if the STA 308 is not heard at the gNB 304, interference may be received at the STA 308 from gNB 304 and/or at the UE 306 from the AP 300.

Figure 4A:
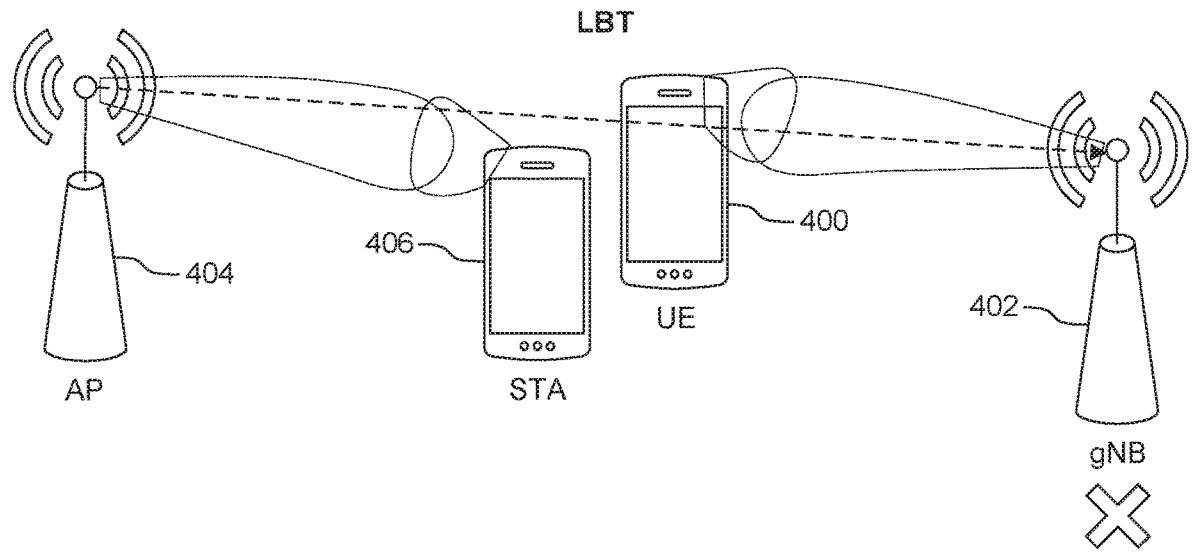
FIG. 4A illustrates an example of a carrier sense in a LBT with interference from an AP received at a gNB.
Figure 4B:
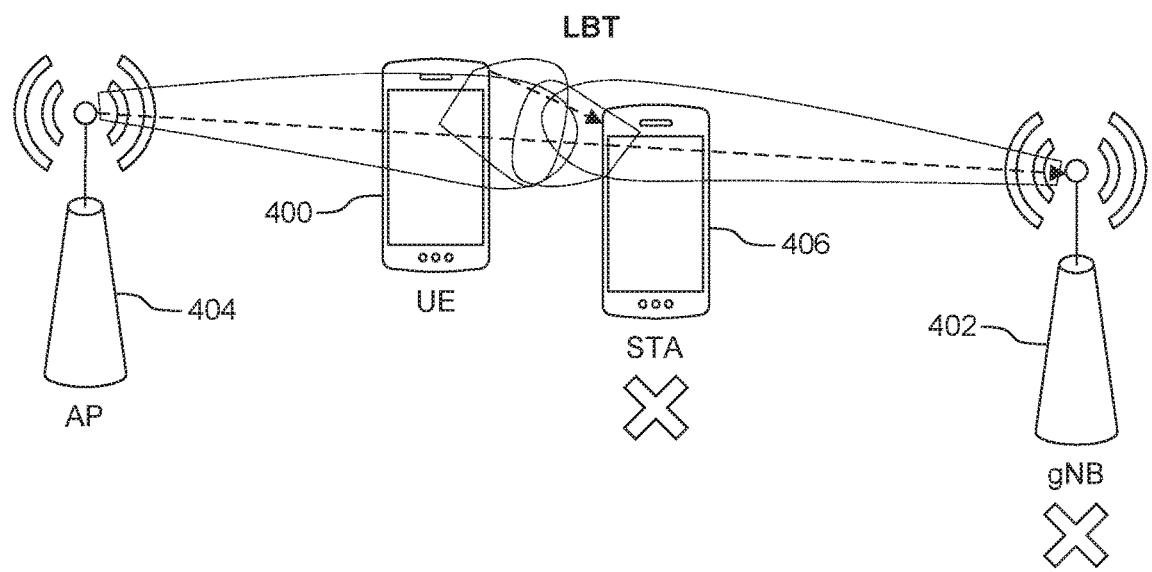
FIG. 4B illustrates an example of a carrier sense in a LBT with interference from a UE received at a STA and/or from an AP at a gNB.

In other examples, interference problems due to directional hidden nodes may arise when a transmitting node is, e.g., a UE and a receiving node is, e.g., a gNB. FIG. 4A illustrates an example of a carrier sense in a LBT with interference from an AP received at a gNB. FIG. 4B illustrates an example of a carrier sense in a LBT with interference from a UE received at a STA and/or from an AP at a gNB.

FIGS. 4A and 4B illustrate examples of a carrier sense in, e.g., a legacy LBT (UL access, UE to gNB), which may result in interference. A UE 400 may perform a LBT with a beam aligned towards a gNB 402, and may sense a channel as idle. That may occur, for example, if an AP 404 is transmitting data towards a STA 406. the Thus, the UE 400 may proceed with data transmission towards the gNB 402. As seen in FIG. 4A, interference from the AP 404 may be received at the gNB 402. As seen in FIG. 4B, the STA 406 may not be heard at the UE 400, and/or interference may be received at the STA 406 from the UE 400 and/or at the gNB 402 from the AP 404.

In some embodiments, implementations associated with coexistence of directional NR-NR systems in unlicensed bands may be provided.

A UE/gNB may perform CCA for a granted and/or scheduled resource with, for example, a (e.g., one or more) beam(s) and/or beam-pair link(s) (BPL(s)). In general, in some embodiments, as used herein, a "BPL" refers to a pair of beams (e.g., reciprocal beam (pair)) that establishes a communication link between a transmitting node and a receiving node. If, for example, a transmitting node (e.g., UE/gNB) performs CCA, a Rx (receive) beam may be used.

For example, the CCA may be determined based on the Rx beam the UE/gNB used for beam pairing.

In some embodiments, following a successful determination that a channel is clear based, e.g., on a CCA and/or LBT assessment of a channel, transmitting and receiving nodes may engage in a communication that involves an enhanced signaling or messages. In general, the enhanced signaling/messaging may facilitate or enable carrying out various functions described herein. In some embodiments, the enhanced signaling/messages may take the form of (i) an enhanced directional transmit request message configured, for example, to request a transmission on a (directional) channel by a transmitting node and/or configured for channel reservation purposes, and (2) an enhanced directional transmit confirmation message configured, for example, to confirm or acknowledge (e.g., by a receiving node) that the channel is clear for transmission (e.g., the transmission requested by the transmitting node) and/or configured for channel reservation purposes.

As will be described in more detail, in some illustrative embodiments, the enhanced directional transmit request message may be an enhanced Directional Request-to-Send (eDRTS) message, and the enhanced directional transmit confirmation message may be an enhanced Directional Clear-to-Send (eDCTS) message and/or an enhanced Directional Clear-to-Send-to-Self (eDCTS-to-Self) message.

Further, in general, any type or kind of an enhanced message described herein refers to a message that may, for example, have an enhanced message content to facilitate or enable various functionality described herein. The enhanced message content may be in the form of, e.g., one or more additional fields, providing information that enables or facilitates execution of various functions described herein. In some embodiments, the information may include, for instance, information regarding potentially interfering node(s) (e.g., interfering node(s) known to interfere or nodes that at least might interfere) with the transmission between the transmitting and receiving nodes, timing or scheduling information, interference directions, etc.

To illustrate, in some embodiments, if a UE/gNB determines a channel to be clear on a Rx beam, it may (e.g., first) transmit enhanced Directional Request-to-Send (eDRTS) to reserve the channel and/or get an acknowledgement from the receiving node (e.g., gNB/UE). The Rx beam may correspond to a Tx beam on which the UE/gNB may transmit. The transmitting node (e.g., UE/gNB) may not transmit if it determines the channel to not be clear. The transmission of eDRTS may be beam based. The receiving node may send an enhanced Directional Clear-to-Send (eDCTS) to the transmitter. The eDCTS may be sent after receiving the eDRTS (e.g., successfully receiving). The transmission of eDCTS may be beam(s)-based. After the eDRTS and/or eDCTS transmissions, further transmission between the transmitting node (e.g., gNB or UE) and the receiving node (e.g. UE or gNB) may be configured.

For example, the transmission may be configured so that other transmission(s) from other device(s), which may interfere with the transmission between the transmitting node and the receiving node may not be started. The configuration of such DL/UL switching may be done through eDRTS and/or eDCTS message(s). The transmitting node may not start its transmission if, for example, it does not receive the eDCTS from the receiving node (e.g., within a configurable amount of time). For example, upon transmitting the eDRTS, the transmitting node may start a timer. If, for example, it does not receive the eDCTS before expiration of the timer, the transmitting node may consider the CCA procedure unsuccessful.

Note that, as used herein, in some embodiments, a configuration of a DL/UL switching, or DL/UL switching configuration, generally refers to a configuration that may provide information regarding timing/scheduling of messages, types of signaling/messaging, etc. for uplink transmission, downlink transmission, and/or an exchange (switching) of the uplink and downlink transmissions within, for example, a maximum channel occupancy time (MCOT) allowed for a transmission.

Further, as a general matter, in a directional system, beams are normally used to define spatial domain resources. Generally, each beam has a respective identity (e.g., a beam ID, which may be implicit, or may be linked to other reference signal IDs) and respective spatial parameters (e.g., phase shift(s) to attain the beam's direction(s), a beam width, an antenna gain, etc.). These spatial parameters are normally applied to enable transmission/reception in a direction corresponding to that beam. Yet further, transmitting/receiving nodes that perform directional communication between one another may use beam-ID type of identification to perform directional transmissions (e.g., determine direction to be used for transmission). To illustrate, a NR (New Radio), for example, utilizes a beam management procedure through which UE may dynamically report to a gNB, e.g., the best transmit (Tx) beam/beam ID (e.g., from the perspective of the UE) for transmitting to that UE. The gNB may then use that Tx beam to transmit any data intended for the UE.

If the transmitting node (e.g., UE/gNB) performs successful CCA on the Rx beam, the Tx beam to transmit the eDRTS may be determined. One or more of the following may apply. The UE/gNB may send the eDRTS on a Tx beam corresponding to the Rx beam where CCA may be successful. The UE/gNB may send the eDRTS on a wider beam than the Tx beam corresponding to the Rx beam where CCA may be successful. The wider beam may be centered along the same beam direction as the Rx beam on which it does successful CCA. The UE/gNB may send the eDRTS on multiple adjacent beams around the Tx beam, which may correspond to the Rx beam where CCA may be successful. The multiple adjacent beams may be selected such that the center beam may be the Tx beam corresponding to the Rx beam on which the successful CCA may be done.

The transmitting node may transmit the eDRTS on a wider beam and/or on adjacent beam(s), for example, to reserve the channel in a larger area around the UE/gNB receiver. The transmission of eDRTS on a wider beam or on adjacent beam(s) may be enabled and/or disabled. For example, the transmission may be enabled and/or disabled based on QoS requirements, and/or the channel quality (e.g., SNR on the Rx beam on which the successful CCA is done). For example, if the SNR on the Rx beam on which successful CCA is done is below a certain (e.g., required) SNR quality (e.g., then adjacent beam(s) transmission may be enabled. The adjacent beam(s) transmission may be enabled if, for example, the QoS requirement(s) of the data transmitted may be high (e.g., above a threshold).

An eDRTS message on a Tx beam corresponding to a Rx beam (e.g., from the perspective of a transmitting node), on which the transmitting node may perform a successful CCA, may comprise one or more of the example information indications in Table 1, in accordance with some embodiments. With respect to the content of the eDRTS message shown in Table 1, in some embodiments, the "Transmitter Identification" and "Receiver Identification" fields may be used by other nodes to infer a direction of upcoming transmission(s) indirectly (e.g., the ID fields may map to such direction indirectly). Moreover, the Receiver Identification may be used by other node(s) to determine whether they are intended recipient(s) of a given transmission. If not, such node may know that the node is not supposed to reply to the eDRTS message with an eDCTS message.

TABLE 1

| Information | Description |
| --- | --- |
| DL/UL switching configuration | This configuration may be used after the successful channel reservation process (e.g., after the successful reception of eDCTS at the UE/gNB transmitter). This information may be included when the UE/gNB transmitter has the knowledge (e.g., complete knowledge) of the resource allocation for this transmission. For example, if a UE sends eDRTS when it does not have granted resources, it may not include the DL/UL switching configuration. The DL/UL switching configuration may also indicate a slot size to use for an upcoming transmission occasion. This may enable a UE/gNB receiver to determine a set of upcoming control channel monitoring occasions. |
| Remaining duration of the complete transmission | This information may be included when the transmitting node has the knowledge (e.g., complete knowledge) of the resource allocation for this transmission. For example, if a UE sends eDRTS when it does not have granted resources, it may not include the duration of the complete transmission. |
| Signal type | E.g., data or control. It may be the data type of the transmission following the eDCTS reception by the transmitting node. This information may be (e.g., only) included if, for example, the transmitting node has data to send to the receiving node. |
| Transmitter identification | An identification (e.g., unique identification) of the transmitting node with respect to the UE/gNB receiver (e.g., C-RNTI, PCI). |
| Receiver identification | An identification (e.g., unique identification) of the receiving node (e.g. UE/gNB) with respect to the UE/gNB transmitter, (e.g., C-RNTI, PCI). |
| eDCTS Flag | This may be set to '1' if, for example, the transmitting node requires the UE/gNB receiver to reply with eDCTS after the successful reception of eDRTS. The value of this flag may (e.g., otherwise) be set to '0'. |
| QoS | QoS of the data that may be transmitted after a successful channel reservation process. This information may be used by the UE/gNB receiver to derive the DL/UL configuration. |
| Buffer status | Buffer status at the UE/gNB transmitter. This information may be used by the UE/gNB receiver to derive the DL/UL configuration. |
| eDCTS-to-Self configuration | Number (and/or timing) of eDCTS-to-Self messages that the transmitter node may send after decoding the eDCTS. |

It will be understood that, as with other types of enhanced messages described herein, the information provided are examples of what an enhanced message may include in accordance with some embodiments. In the case of an eDRTS message, the eDRTS message may be configured, for example, with a subset (e.g., a different subset) of the example information in Table 1, in accordance with some embodiments. For example, if a UE sends eDRTS when it does not have granted resources, it may include the transmitter identification, receiver identification, eCTS flag, QoS, and/or the buffer status in the eDRTS.

An eDRTS message may be sent on adjacent beam(s) (e.g., to reserve the channel in a larger area around the receiving node). On the adjacent beam(s), eDRTS may include the duration of the complete transmission, e.g., if known, and/or the type of control signal transmission that may be sent from the transmitting node on those beams further during the transmission. The control signal transmission may be (e.g., at least one): a reference signal (RS), for example, cell specific reference signal (CRS); a sequence (e.g., a specific sequence) of bits; a discovery reference signal (DRS) that may include a (e.g., one or more) synchronization signal(s) and/or reference signal(s); a sequence; and/or system information.

An eDRTS may indicate a control channel resource set (CORESET) and/or a bandwidth part (BWP) of a channel. The indications may be implicit (e.g., related to the resources on which the eDRTS may be transmitted) or explicit (e.g., included as an information element in the eDRTS). This may enable a UE to determine where to look for control information, which may assign DL and/or UL resources for transmissions performed in an upcoming channel occupancy time.

After a decoding (e.g., successful decoding) of eDRTS, a receiving node may send beam-based eDCTS to a transmitting node, for example, if eDCTS flag is set. The Tx beam on which the eDCTS is sent may be selected. One or more of the following may apply. The receiving node may send eDCTS on a Tx beam corresponding to the Rx beam on which the eDRTS is received. The receiving node may send eDCTS on a wider beam compared to the Tx beam corresponding to the Rx beam where the eDRTS may be received. The wider beam may be centered along the same beam direction as the Rx beam on which it received eDRTS. The receiving node may send eDCTS on an adjacent beam(s) around the Tx beam corresponding to the Rx beam on which the eDRTS may be received. The multiple adjacent beams may be selected, for example, where the center beam may be the Tx beam corresponding to the Rx beam on which the eDRTS is received.

A node may transmit an eDCTS on a wider beam(s) and/or on an adjacent beam(s) (e.g., to reserve the channel in a larger area around the transmitting node). The transmission of eDCTS on the wider beam(s) and/or on adjacent beam(s) may be enabled and/or disabled based on the QoS requirements, and/or the channel quality (e.g., SNR on the Rx beam on which the eDRTS is received). For example, if the SNR on the Rx beam where the eDRTS is received is below a certain (e.g., required) SNR quality (e.g.), adjacent beam(s) transmission may be enabled. Adjacent beam(s) transmission may be enabled if the QoS requirement of the data transmitted may be high (e.g., above a threshold).

A receiving node may signal to a transmitting node, for example in the eDCTS message, a co-channel interference that may be measured while receiving eDRTS. This may occur, for example, when the background directional interference may be weak. For example, when the background direction interference may be overcome by adjusting transmission parameters by the transmitting node (e.g., gNB/UE). This may be indicated by an (e.g., one or more) alternate parameter(s). For example, the parameters may include: observed interference power, measured signal-to-noise plus interference power (SINR) on eDRTS reception, requested modulation coding scheme (MCS), and/or the like.

An eDCTS message on the Tx beam corresponding to the Rx beam (e.g., from the perspective of a receiving node) on which the eDRTS is received may include one or more of the example information of Table 2, in accordance with some embodiments.

TABLE 2

| Information | Description |
| --- | --- |
| DL/UL switching configuration | This configuration may be used after the successful channel reservation process (e.g., after the successful reception of eDCTS at the transmitting node. This information may be included by the receiving node in case when, for example, eDRTS may not have any DL/UL configuration. For example, if a UE sends eDRTS to a gNB when it does not have granted resources, it may not include the DL/UL switching configuration in eDRTS. The gNB may (e.g., in such a case) derive and/or send the DL/UL configuration in the eDCTS. The DL/UL switching configuration may also indicate a slot size to use for an upcoming transmission occasion. This may enable a receiving node to determine a set of upcoming control channel monitoring occasions. |
| Remaining duration of the complete transmission | The remaining duration of the complete transmission excluding the eDRTS duration. |
| Signal type | E.g., data and/or control. It may be the data type of the transmission following the eDCTS reception by the transmitting node. This information may (e.g., only) be included when the UE/gNB receiver has data to send to the transmitting node. |
| Transmitter identification | An identification (e.g., unique identification) of the eDCTS's transmitter with respect to the eDCTS's receiver (e.g., C-RNTI, PCI). |
| Receiver identification | An identification (e.g., unique identification) of the eDCTS's receiver with respect to the eDCTS's transmitter (e.g., C-RNTI, PCI). |
| Interference Measure | May include: observed background interference power, SINR on eDRTS reception, requested MCS, and/or the like. |
| eDCTS-to-Self configuration | Number (and/or timing) of eDCTS-to-Self messages that the receiver node may send (e.g., after) sending the eDCTS. |

It will be understood that, as with other types of enhanced messages described herein, the information provided are examples of what an enhanced message may include in accordance with some embodiments. In the case of an eDCTS message, the eDCTS message may be configured, for example, with a subset (e.g., different subset) of the example information in Table 2, in accordance with some embodiments. For example, if a UE sends eDCTS after receiving the eDRTS from the gNB with DL/UL switching configuration and/or signal type, the UE may include the remaining duration of the complete transmission, transmitter identification, and/or receiver identification in the eDCTS.

An eDCTS message may be sent on an adjacent beam(s) (e.g., to reserve the channel in a larger area around the UE/gNB transmitter). The adjacent beams' eDCTS may include the remaining duration of the complete transmission, and/or the type of control signal transmission that may be sent from the UE/gNB on the corresponding beams further during the transmission. The control signal transmission may be or include (e.g., may be or include at least one): a reference signal (RS), for example, cell specific reference signal (CRS); a sequence (e.g., a specific sequence) of bits; a discovery reference signal (DRS) that may include a (e.g., one or more) synchronization signals and/or reference signals; a sequence; and/or system information.

A node transmitting an eDCTS may perform (e.g., may first perform) LBT and/or CCA to determine whether the channel is free, for example, before transmitting the eDCTS. This may be a full LBT or a short LBT. Short LBT may be achieved by using, for example, a single energy detection (ED) measurement and/or a specific threshold. The node may perform (e.g., may be required to perform) LBT, CCA and/or ED on a (e.g., some and/or all) beam(s) for which it may intend to transmit eDCTS.

Non-reciprocal beams (and/or beam pair links) may be used for transmission and/or reception between a (e.g., a pair of) UE(s)/gNB(s). A first node may perform LBT, for example, to determine the availability of the BPL for a transmission from the first node to a second node. If, for example, LBT is successful, the first node may begin the eDRTS procedure towards a second node. The second node may transmit the eDCTS, for example, upon reception of the eDRTS transmission. The second node may begin a LBT procedure (e.g., a second LBT procedure) on a second BPL, for example, to enable the second node to transmit towards the first node. This may occur upon reception of the eDRTS transmission. The second node may transmit a second eDRTS using beam(s) relevant to the second BPL towards the first node, for example upon a successful LBT. The transmission of the second eDRTS may be simultaneous to the transmission of the first eDCTS. The first node may transmit a second eDCTS to the second node, for example, upon reception of the second eDRTS. After completion of the multiple concurrent eDRTS-eDCTS procedures, for example, the two BPLs may be considered useable. This may be performed, for example, using a short LBT to switch between the two BPLs.

A receiving node that receives an eDRTS from another node (e.g., gNB/UE) may respond with an enhanced directional deny-to-send (eDDTS), which may be based on one or more of the following. A receiving node detecting the presence of directional interference, e.g., while receiving an eDRTS. The signal strength of the directional interference may be insufficient, which may cause the UE/gNB to fail to correctly detect the eDRTS addressed to it. A gNB receiving an eDRTS from a UE may respond with an eDDTS if the requested transmission duration in the eDRTS overlaps with a previously scheduled transmission.

An eDDTS message on a Tx beam, which may correspond to a RX beam (e.g., from the perspective of a receiving node) on which the eDRTS is received, may include one or more of the example information in Table 3, in accordance with some embodiments.

TABLE 3

| Information | Description |
| --- | --- |
| Transmitter Identifier | Identifies the transmitter of the eDDTS. This may include UE's C-RNTI, gNB's cell ID, and/or the like. |
| Receiver Identifier | Identifies the receiver of the eDDTS. This may include UE's C-RNTI, gNB's cell ID, and/or the like. |
| Interfering Transmitter Identifier | Identifies the transmitter of the interfering signal. This may include UE's C-RNTI, gNB's cell ID, and/or the like. This information may be available to the UE/gNB if, for example, it successfully decodes an eDRTS/eDCTS exchange between interfering entities. |
| Interfering Receiver Identifier | Identifies the receiver of the interfering signal. This may include UE's C-RNTI, gNB's cell ID, and/or the like. This information may be available to the UE/gNB if it successfully decodes an eDRTS/eDCTS exchange between interfering entities. |
| Defer Duration | Specifies the amount of time for which the transmission may be deferred. If an eDDTS may be transmitted in response to reception of a (e.g., one or more) eDRTS and/or eDCTS exchange between another pair of UE and gNB, then this field may contain the transmission duration value obtained from the receiver eDRTS and/or eDCTS. If, for example, eDDTS may be transmitted by gNB due to potential overlap with a previously scheduled transmission, |

TABLE 3-continued

| Information | Description |
| --- | --- |
| | then this field may contain the combined duration of the scheduled transmission and/or any required ACK/NACK duration. If, for example, the UE transmitting the eDDTS may not know the duration of the interfering transmission, then it may include either the maximum channel occupancy time (MCOT)value and/or a pre-defined value, which may indicatean unknown duration. |

It will be understood that, as with other types of enhanced messages described herein, the information provided are examples of what an enhanced message may include in accordance with some embodiments. In the case of an eDDTS message, the eDDTS message may be configured with a subset (e.g., a different subset) of the example information in Table 3, in some embodiments. For example, when a UE/gNB sends eDDTS in response to observed directional interference but the interfering transmitter and/or receiver identifiers are not known, the eDDTS may include a (e.g., just a) transmitter identifier and/or receiver identifier field(s). For example, when the eDDTS is sent in response to an observed eDRTS and/or the eDCTS is transmitted between an interfering pair of directional devices, the eDDTS may comprise (e.g., all) the fields listed in Table 3.

A transmitting node (e.g., a gNB) or a receiving node (e.g., UE) may transmit an enhanced Directional Clear-to-Send (eDCTS) to self, or an enhanced Directional Clear-to-Send-to-Self (eDCTS-to-Self), for example, to reserve a directional channel for a (e.g., planned) directional transmission(s) with (e.g., one or more) respective receiving node(s) (e.g., UE(s)) or transmitting node(s) (e.g., gNB(s)). An eDCTS-to-Self transmission may and/or may not be preceded by an eDRTS transmission or reception. In some embodiments, the eDCTS-to-Self message may be an eDCTS message sent by, e.g., a receiving node to itself. In some embodiments, an eDCTS-to-Self message may be configured differently than an eDCTS message, e.g., with one or more different fields, formats, or information.

A transmitting node (e.g., a gNB) may select a Tx beam for eDCTS-to-Self transmission, for example, after successfully completing CCA on the beam that the transmitting node (e.g., a gNB) intends to use for data transmission to a receiving node (e.g., a UE). This may occur when the transmitting node (e.g., a gNB) sends an eDCTS-to-Self on the Tx beam that it has identified to use for a (e.g., subsequent) downlink data transmission to the receiving node (e.g., a UE). This may occur when the transmitting node (e.g., a gNB) transmits the eDCTS-to-Self on a wider beam than the Tx beam associated with subsequent downlink data transmission to the receiving node (e.g., a UE). The wider beam may be centered along the same beam direction as the Tx beam, which may be associated with the downlink data transmission to the receiving node (e.g., a UE). This may occur when the transmitting node (e.g., a gNB) may transmit the eDCTS-to-Self on adjacent beam(s). The adjacent beam(s) may be around the intended Tx beam for subsequent downlink data transmission. The adjacent beam(s) may be selected such that the center beam may be the Tx beam associated with subsequent downlink data transmission to the receiving node (e.g., a UE).

A node may transmit an eDCTS-to-Self on a wider beam(s) and/or on adjacent beam(s) (e.g., to reserve the channel in a larger area around the transmitter). The transmission of eDCTS-to-Self on wider beam(s) and/or on adjacent beam(s) may be enabled and/or disabled, for example, based on the QoS requirement(s), the channel quality, the historical directional interference information, and/or the like. For example, if a known potential interferer may be associated with an adjacent beam(s), then adjacent beam(s) transmission may be enabled. Adjacent beam(s) transmission may be enabled if the QoS requirement of the data transmitted is high (e.g., above a threshold). An eDCTS-to-Self message may comprise one or more of the example information in Table 4, in accordance with some embodiments.

TABLE 4

| Information | Description |
| --- | --- |
| Transmitter Identifier | Identifies the transmitter of the eDCTS-to-Self. This may include a UE's C-RNTI, gNB's cell ID, and/or the like. |
| Receiver Identifier | Identifies the receiver of the eDCTS-to-Self. This may include a UE's C-RNTI, gNB's cell ID, and/or the like. This field may be empty. |
| Defer Duration | Specifies the amount of time for which the transmission may be deferred. If, for example, an eDCTS-to-Self may be transmitted in response to reception of eDRTS, then this field may contain the transmission duration value obtained from the receiver eDRTS minus transmission time of eDCTS-to-Self. |

In some embodiments, a transmitter node (e.g. gNB) and/or a receiver node (e.g., UE) may set up a protected period for directional transmissions. This may be performed by exchanging an eDRTS and/or eDCTS. This exchange may be followed by, e.g., multiple eDCTS-to-Self transmissions on, e.g., multiple beams to achieve, for example, greater spatial interference protection.

Figure 5:
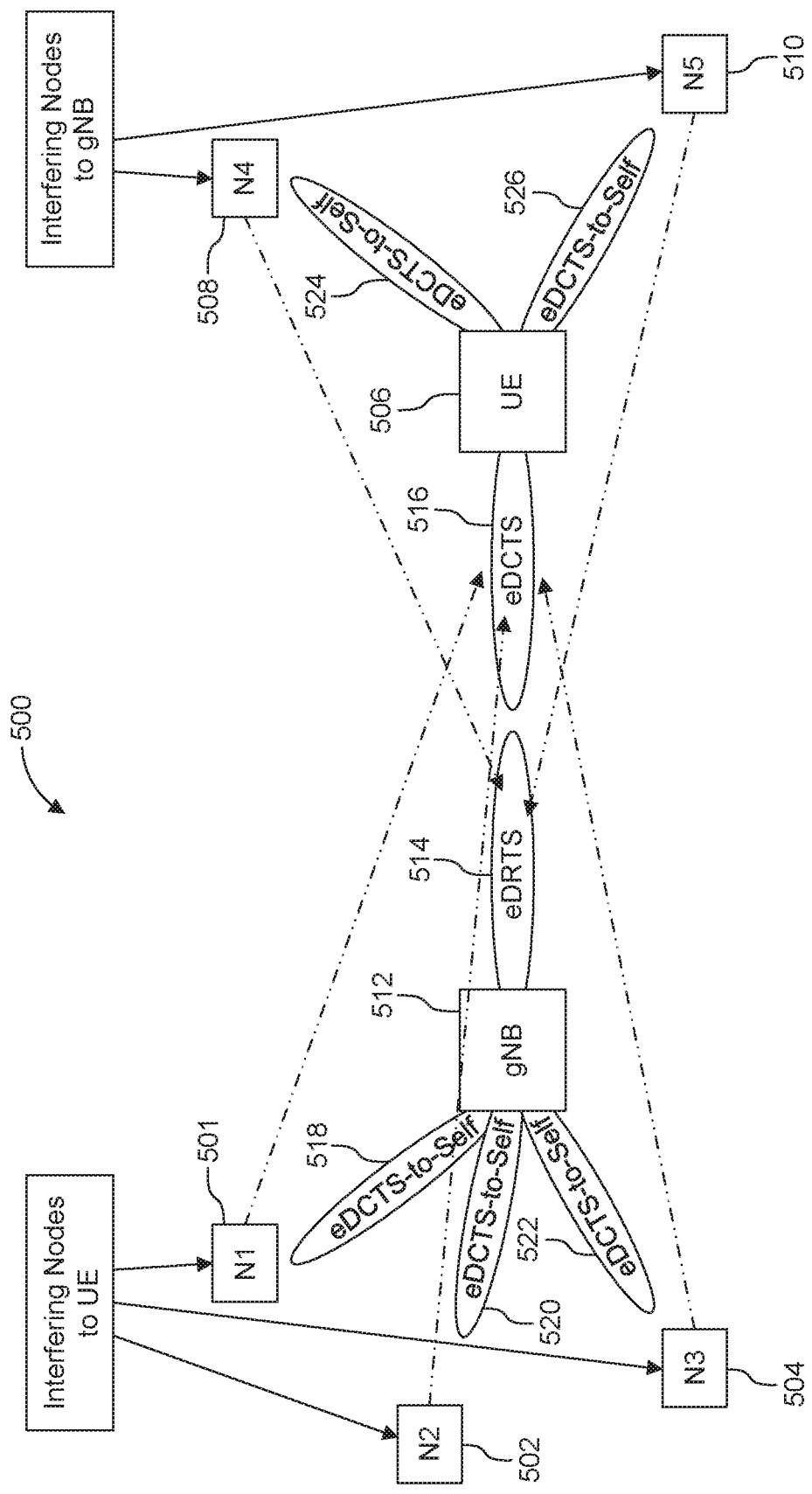
FIG. 5 illustrates an example interference scenario with an eDRTS, eDCTS, and multiple eDCTS-to-Self procedure to back off interferers, in accordance with some embodiments.

FIG. 5 illustrates an example interference scenario with an eDRTS, eDCTS, and multiple eDCTS-to-Self procedure 500 to back off interferers, in accordance with some embodiments. In the example of FIG. 5, nodes 501, 502, and 504 (also denoted as "N1, N2, and N3") may be, for instance, the nodes that may cause interference to a UE 506. The interference may be due to directional antenna patterns (e.g., highly directional antenna patterns). Nodes 508 and 510 (also denoted as "N4 and N5) may, for instance, cause interference to a gNB 512, which may be due to directional antenna patterns (e.g., highly directional antenna patterns). As shown in FIG. 5, the gNB 512 may transmit an eDRTS 514 to the UE 506. Subsequent to the receipt of the eDRTS 514, the UE 506 may send an eDCTS 516 to the gNB 512. In general, this exchange may be then followed by the gNB 512 transmitting multiple eDCTS-to-Self messages 518-522 on corresponding beams towards the interfering nodes 501-504, respectively, and the UE 506 transmitting multiple respective eDCTS-to-Self messages 524 and 526 on corresponding beams towards the interfering nodes 508 and 510, respectively, such as to create greater spatial interference.

Figure 6:
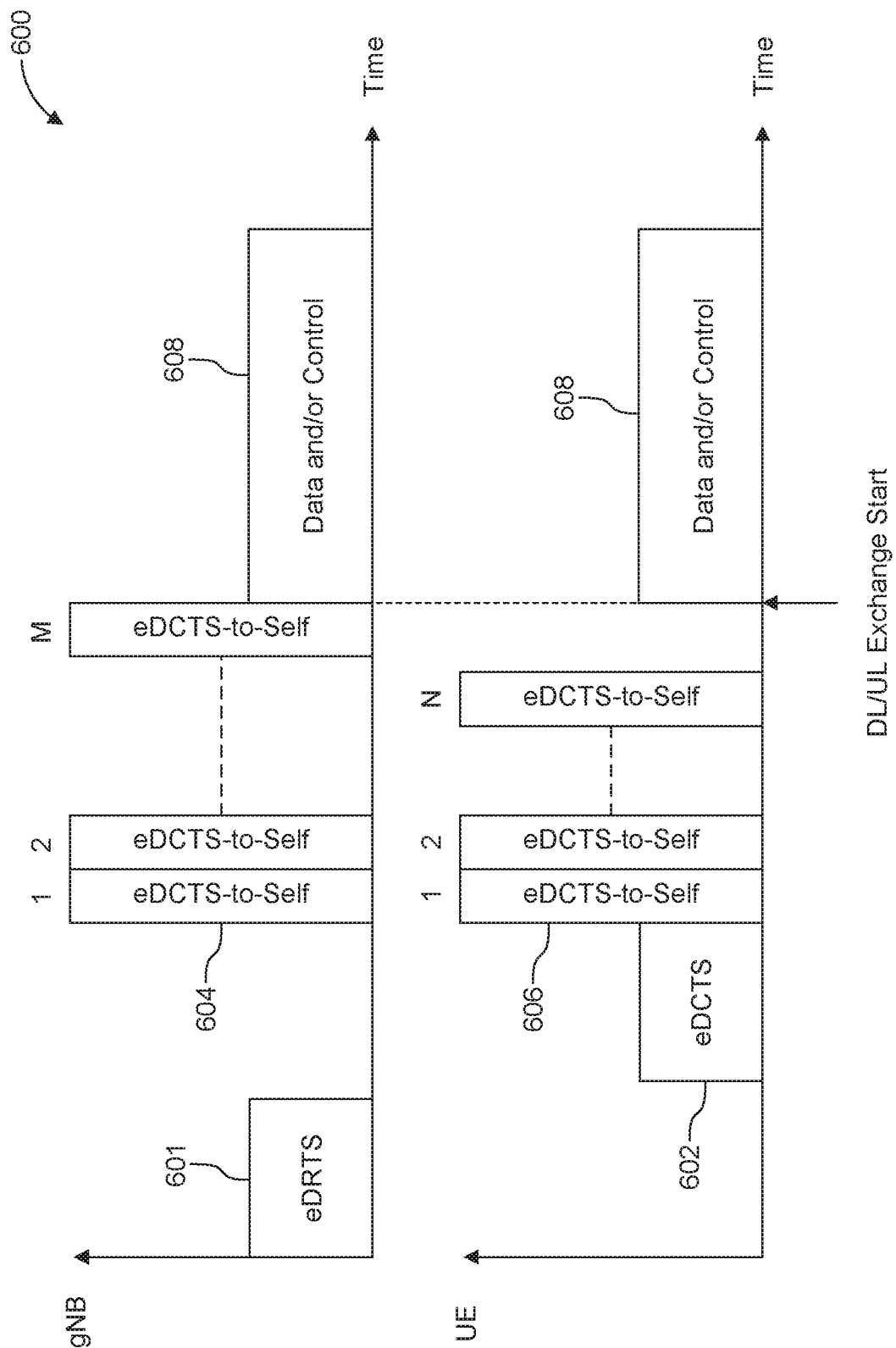
FIG. 6 illustrates an example protection period and/or region creation, in accordance with some embodiments.

FIG. 6 illustrates an example protection period and/or region creation 600, in accordance with some embodiments. In an example shown in FIG. 6, a transmitting node (e.g. a gNB) may transmit "M" eDCTS-to-Self message(s) 604 after a successful decoding of an eDCTS 602. This may be performed, for example, to create, e.g., a "protection zone" against nodes that may interfere with a receiving node (e.g., a UE). The transmitting node may signal in an eDRTS 601, the number "M" of eDCTS-to-Self message(s) 604, for example, to inform the receiving node that "M" eDCTS-to-Self message(s) may follow after a successful eDCTS decoding.

The receiving node (e.g., a UE) may transmit "N" eDCTS-to-Self message(s) 606 following the eDCTS message 602. This may be performed, for example, to create, e.g., a protection zone against the nodes interfering (or that may interfere) with the gNB. The receiving node may signal in the eDCTS 602 the number, "N", of eDCTS-to-Self message(s) that may follow its eDCTS message 602. This may be done, for example, to inform the transmitting node (gNB) of the number "N" of eDCTS-to-Self message(s) that may follow the eDCTS 602.

As shown in FIG. 6, control and/or data transfer 608 (DL and/or UL) between the transmitting node and the receiving node may start, for example, after the last eDCTS-to-Self message is sent by the transmitting and/or the receiving node.

The number of eDCTS-to-Self messages sent by the transmitter and the receiver nodes (M and N), may be optimized. For example, the optimization may be based, e.g., on a number of interferers, and/or power and/or width of beams used for transmission of the eDCTS-to-Self messages. This may cause interferers to back-off.

The timeline depicted in FIG. 6 may be updated to reflect device capability. For example, the gNB may have (e.g., two) simultaneous beam processing capabilities. The gNB may use one beam to receive an eDCTS message from the UE and may have already started sending an eDCTS-to-Self message with (e.g., simultaneously with) the eDRTS. The DL/UL exchange start may be moved to the N'th eDCTS-to-Self message. As shown in FIG. 6, the DL/UL exchange start may follow the last eDCTS-to-Self message, that may be sent by the transmitting and/or the receiving node.

In some embodiments, DL and/or UL transmission may be performed, for example, after the reception (e.g., successful reception) of an eDCTS at the transmitting node. The UE/gNB may preserve the channel in the DL and/or UL directions. This may occur, for example, so that other device(s), whose transmission(s) may interfere with an ongoing transmission, may not start packet transmissions. Other device(s) may find the channel busy (e.g., after sensing the channel with DL or/and UL transmission) and/or may not start their transmission.

A DL/UL switching configuration may be determined per BPL. For example, this determination may be made at a UE/gNB transmitter and/or at a UE/gNB receiver. For example, when a gNB has data to send to a UE, it may derive a DL/UL switching configuration and/or may send it in an eDRTS. If, for example, a UE does not have a (e.g., any) granted resources and/or may have data to send to a gNB, it may send (e.g., first send) an eDRTS to the gNB. This may be performed without any DL/UL switching configuration. The gNB may derive the DL/UL switching configuration and/or may send it to the UE in an eDCTS.

The DL/UL switching configuration may be derived based on the QoS requirement and/or a minimum LBT duration. For example, for a data transmission (e.g., a highly reliable data transmission), the transmission between a UE/gNB transmitter and a UE/gNB receiver in any direction may be sent within the minimum LBT duration. This may occur, for example, so that other device(s) may not find the channel free during the transmission.

Figure 7:
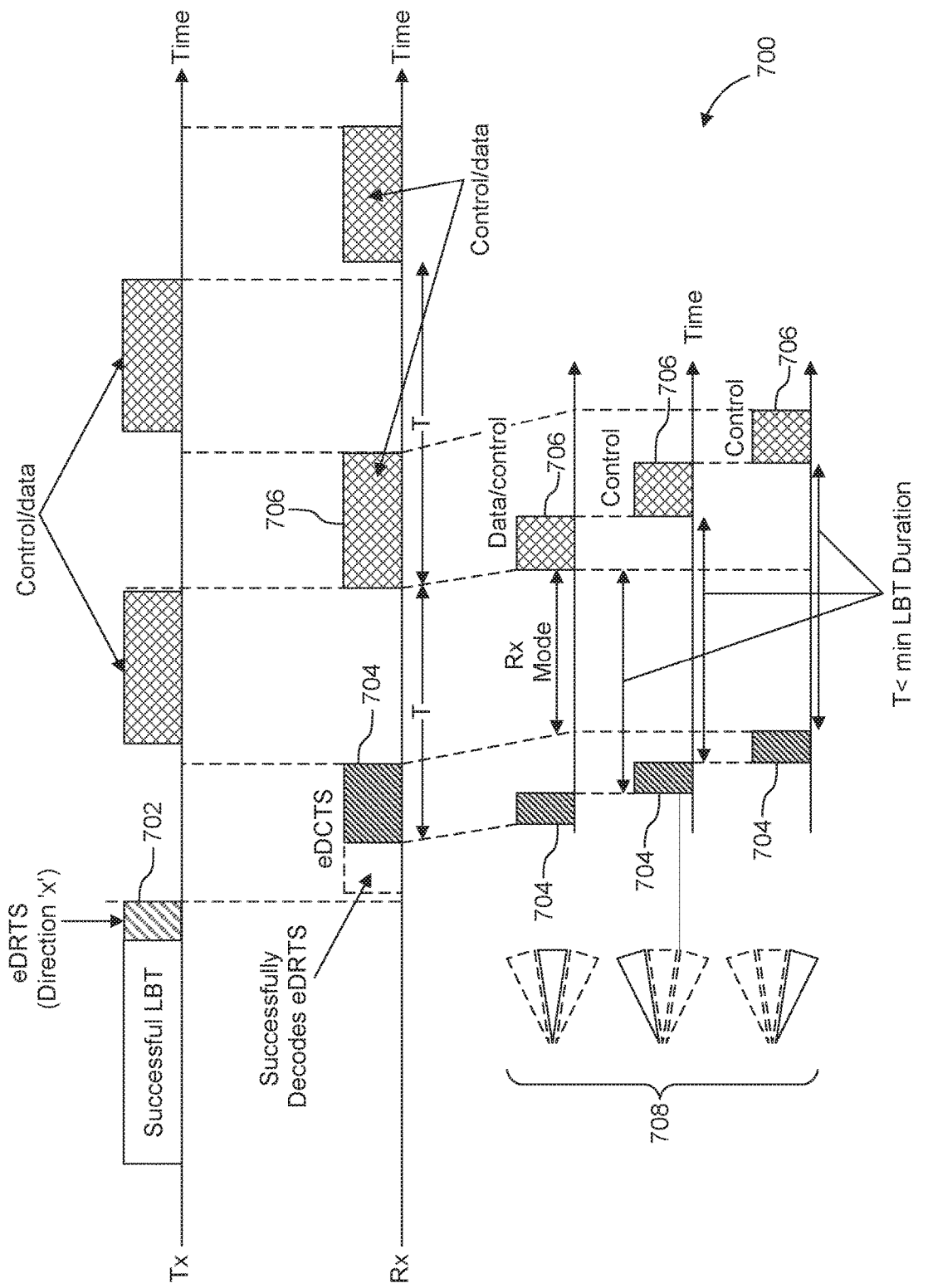
FIG. 7 illustrates an example downlink/uplink (DL/UL) switching configuration, in accordance with some embodiments.

FIG. 7 illustrates an example downlink/uplink (DL/UL) switching configuration 700, in accordance with some embodiments. As seen in FIG. 7, a transmitting node TX (e.g., a gNB) may send an eDRTS 702 on a beam (e.g., in a direction 'x'). This may occur, for example, after performing a successful CCA on a corresponding Rx beam. After a successful reception of the eDRTS 702, for example, a receiving node RX (e.g., a UE) may send eDCTSs 704 on, e.g., multiple beams. The beams may include the Tx beam corresponding to the Rx beam on which the eDRTS 702 was received. The transmitting node may include the DL/UL switching configuration in the eDRTS 702. This configuration may be designed such that reverse direction traffic 706 (e.g., from the receiving node to the transmitting node) may be repeated within, for example, a minimum LBT duration. As indicated in FIG. 7, the reverse direction traffic 706 may be sent, for example, using a multi-beam transmission 708 on different adjacent beams including, for example, a main/center beam on which the eDRTS/data/control was received. For instance, in some embodiments, the reverse direction traffic 706 may be sent on multiple beams, which may include the main/center Tx beam corresponding to the Rx beam on which the eDRTS 702 is received and/or the adjacent beam(s) around the main Tx beam. This may prevent device(s) (e.g., all devices) residing near the transmitting node from starting/receiving a transmission (e.g., any transmission).

Figure 8:
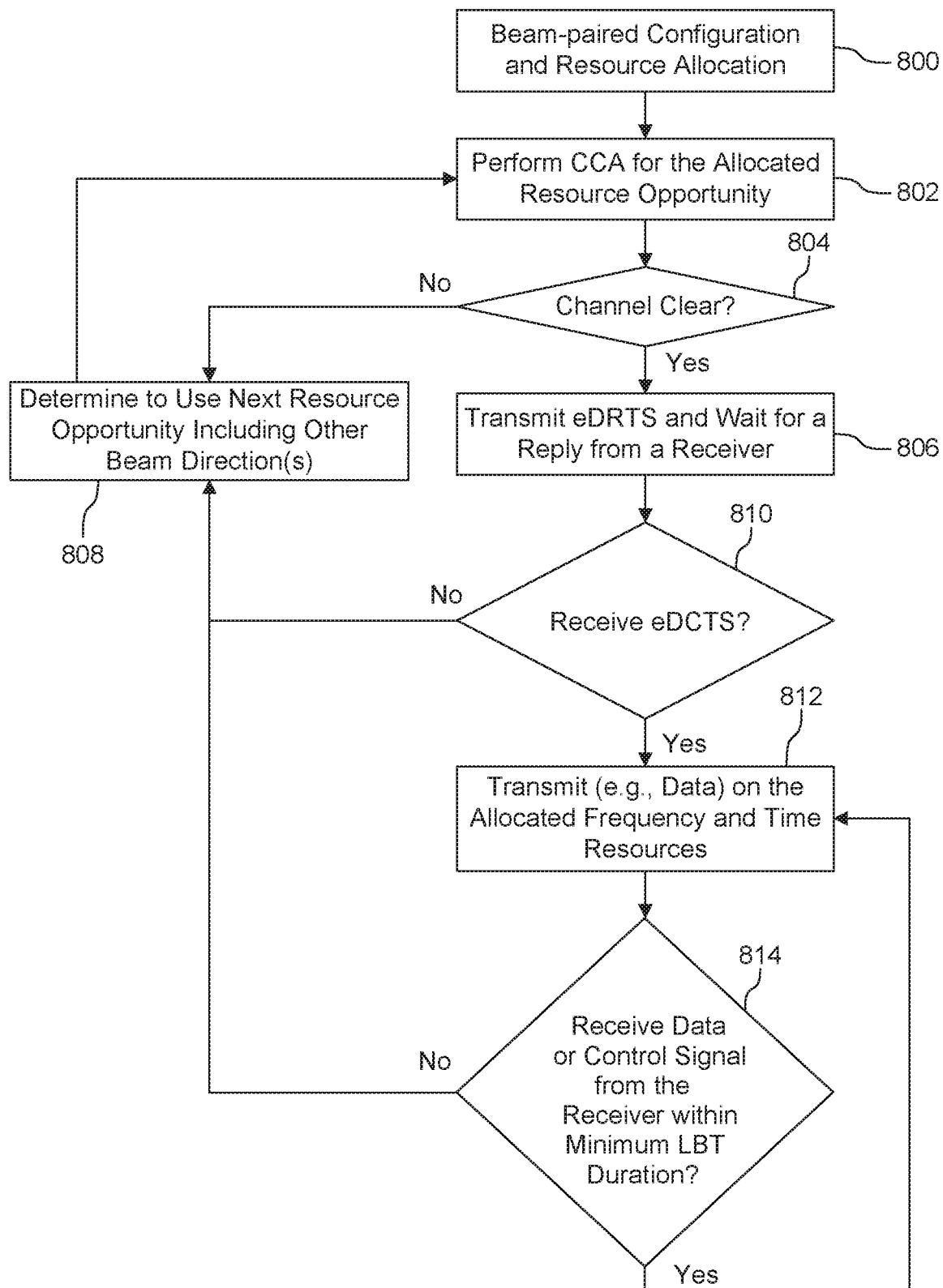
FIG. 8 is a flow chart illustrating an example of a transmission procedure, in accordance with some embodiments.

FIG. 8 is a flow chart illustrating an example of a transmission procedure, in accordance with some embodiments. The example of FIG. 8 may apply when, e.g., a transmitter, such as a gNB has data to transmit to a receiver, such as a UE. At step 800, a Tx and Rx beam pair is configured and a resource allocation occurs. At step, 802, the transmitter performs a CCA for the allocated resource opportunity. At step 804, the transmitter determines whether the channel is clear based on the CCA. If the channel is clear, the procedure proceeds to step 806 at which the transmitter transmits an eDRTS and waits for a reply from the receiver. If the channel is not clear, at step 808, the transmitter determines to use a next resource opportunity including other beam direction(s). At step 810, the transmitter determines whether an eDCTS has been received. If the eDCTS has been received, at step 812, the transmitter transmits (e.g., data) on the allocated frequency and time resources. If the eDCTS has not been received, the procedure returns to step 808. Then, at step 814, the transmitter determines whether a data or control signal has been received from the receiver within a minimum LBT duration. If so, the procedure returns to step 812, and if not, the procedure returns to step 808. If there is no more data to transmit, the procedure could end.

In some embodiments, there may be different UE behaviors, which may be based on an eDRTS transmission/reception, and/or an eDCTS transmission/reception. One or more of the following may apply. The UE, which sends an eDRTS waits for the eDCTS from the receiving node. If, for example, it receives the eDCTS within a pre-defined time interval, it may start its data transmission to the receiving node (e.g., gNB). This may be according to a received DL/UL switching configuration. If, for example, it does not receive eDCTS from the receiving node in the pre-defined time interval, it may find the channel busy and/or determine to use another resource opportunity (e.g., including the other beam directions) to perform CCA. A UE, that receives an eDRTS comprising the information of its own ID and/or an eCTS flag set to '1', may send an eDCTS to the eDRTS's transmitter. A UE, that receives an eDRTS comprising the information of its own ID and/or an eCTS Flag set to '0', may make a configuration to receive the downlink data/control signal on the resources assigned in the eDRTS. A UE, may not send a (e.g., any) eDRTS and/or may not receive an eDRTS/eDCTS comprising its own UE ID. If, for example, the UE receives an eDRTS and/or an eDCTS without its own UE ID, it may back-off and/or may not attempt to access the channel. This may be for a duration, which may be included in the eDRTS/eDCTS.

According to some embodiments, a dynamic DL/UL switching configuration per BPL (beam pair link) with periodic eDCTS-to-Self transmissions is further disclosed herein. In some example embodiments, in accordance with the disclosed configuration, another device that may cause interference may be prevented from transmission due to periodic eDCTS-to-Self transmissions. Further, in accordance with some embodiments, signaling and channel details to implement control messages as proposed (e.g., an eDRTS, an eDCTS, and an eDCTS-to-Self), are disclosed herein, both for downlink and uplink data transmissions.

In some embodiments, during a data transmission, a transmitter or a receiver or both may also send an eDCTS-to-Self to reserve a directional channel, and prevent (or at least mitigate) directional interference from neighboring devices. Other devices after receiving the eDCTS-to-Self transmission may determine that the channel may be occupied and may not initiate transmissions that may interfere with the transmissions protected by the eDCTS-to-Self transmissions.

In some embodiments, multiple eDCTS-to-Self transmissions may be made. The multiple transmissions may use antenna configurations or beams that may employ, by way of example, one or more of the following characteristics: (i) eDCTS-to-Self transmissions may use the same antenna configurations or beams as those for original eDRTS transmissions; (ii) eDCTS-to-Self transmissions are made using antenna configurations or beams that were not used for original eDRTS transmissions; and/or (iii) some eDCTS-to-Self transmissions may use antenna configurations or beams used for original eDRTS transmission, and other eDCTS-to-Self transmissions use different antenna configurations or beams than those used for the original eDRTS transmission.

In some embodiments, an eDCTS-to-Self configuration including eDCTS-to-Self count, i.e., a number of eDCTS-to-Self transmissions, and directions for the eDCTS-to-Self transmissions may be conveyed to a UE from the gNB in the eDRTS message in the case of downlink or in the eDCTS message in the case of uplink transmission.

In some embodiments, the number of eDCTS-to-Self transmissions, and the directions for the eDCTS-to-Self transmissions may be known to a UE or a gNB through measurements. For example, the UE or gNB may determine an absence or a presence of interfering links via measurements and eDCTS-to-Self transmissions may occur only in directions or antenna configurations or beams that are known to be interfere-prone. To illustrate, based on the UE's measurements for example, if the UE determines an interference in a direction of a beam on which the gNB will transmit, e.g., data (data beam) (or in directions of adjacent beams of the data beam) which may potentially interfere with the transmission from the gNB, the UE may decide to transmit control messages (eDCTS, eDCTS-to-Self) using the data beam and/or the adjacent beams to stop any interferers. In this regard, a node (e.g., the UE) may be configured accordingly (e.g., with suitable hardware/software) to map information regarding the interfering direction to configure those beam direction(s) accordingly for transmission of such control messages.

Alternatively, in some embodiments, a grant request for eDCTS-to-Self transmission may be included in an eDRTS/eDCTS message from the UE. If the UE sends the grant request in the eDRTS message, the UE may receive the grant for the eDCTS-to-Self from the gNB (or, generally, from a base station (BS)) in the eDCTS message. If the UE sends the grant request in the eDCTS message, the UE may receive the grant for the eDCTS-to-Self from the gNB (or, generally, from a BS)) followed by an eDCTS transmission from the UE.

The grant request for an eDCTS-to-Self may contain the following information, as shown by way of example in Table 5, in accordance with some embodiments.

TABLE 5

| Information | Description |
| --- | --- |
| Receiver Identifiers | Identifies receivers of an eDCTS-to-Self. This may include UE's C-RNTI, gNB's cell ID, etc. This field may be optionally left empty. |
| Tx Beam IDs | This field identifies an antenna configuration, e.g., beams intended for use during eDCTS-to-Self transmissions. |

In some embodiments, multiple back-to-back eDCTS-to-Self transmissions by a requesting node may have identical contents. The Defer duration field may contain the actual DL data transmission duration under this embodiment. In another embodiment, the requesting node may change the contents of multiple back-to-back eDCTS-to-Self transmissions. For example, the transmitting node may change the contents of the Defer Duration field in successive eDCTS-to-Self transmissions.

Note that one or more of the eDCTS-to-Self transmissions may occur simultaneously, e.g., coincide in time, with one or more eDCTS transmissions by a targeted UE.

FIG. 31 illustrates an example of downlink data transmission with an eDCTS-to-Self transmission 2650, in accordance with some embodiments. In the example of FIG. 31, a gNB sends an eDRTS message 2652 to a UE. As shown, the UE after successfully decoding the eDRTS message 2652, sends an eDCTS message 2654 to the gNB, and, following that, the UE also sends an eDCTS-to-Self message 2656 using different antenna configurations or beams to reserve a directional channel. In some embodiments, the directions for the eDCTS-to-Self transmission may have been configured by the gNB or determined by previous directional channel measurements. Further, in some embodiments, the eDCTS-to-Self transmission may be repeated once every T (or every given time period) (e.g., based on a minimum CCA duration) over the total duration of a transmission/communication exchange between the gNB and the UE (e.g., a MCOT).

Figure 32:
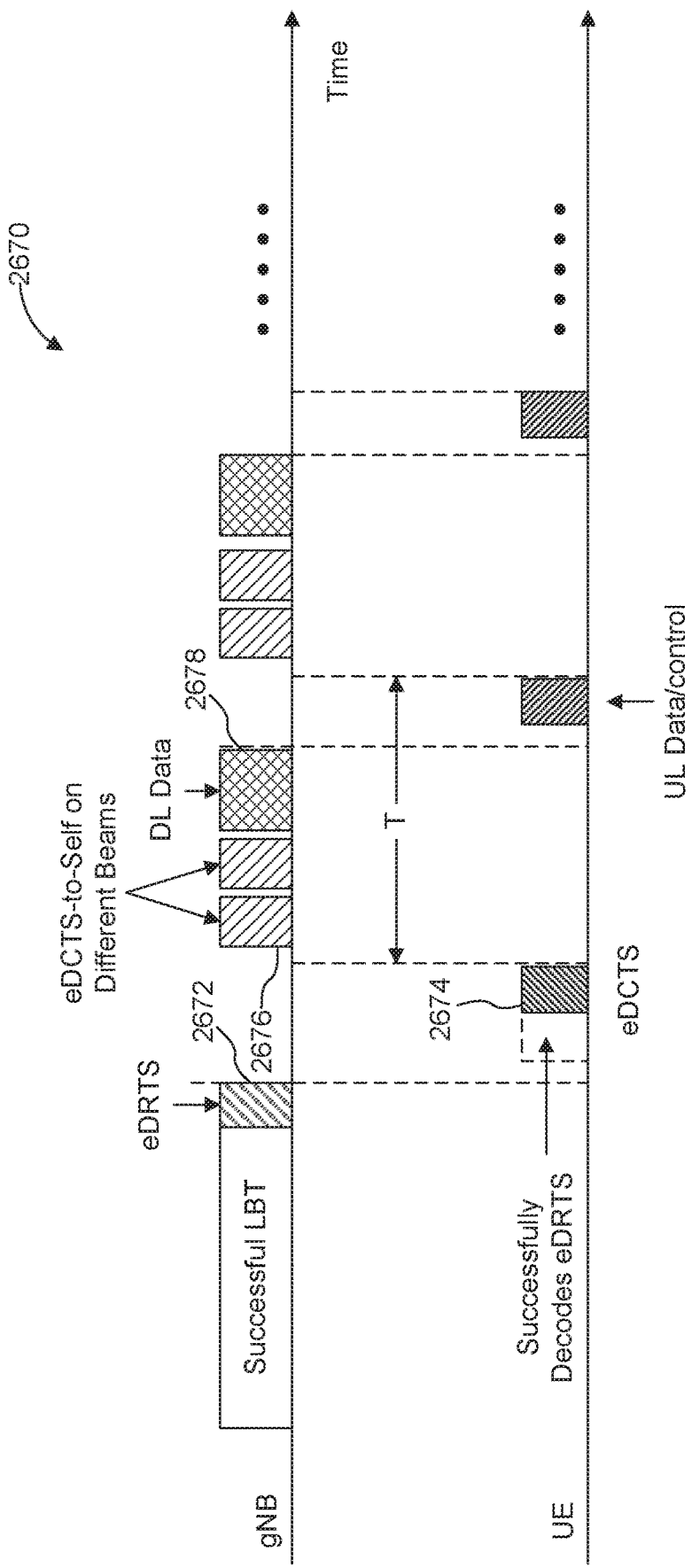
FIG. 32 illustrates another example of downlink data transmission with both eDCTS-to-Self and uplink transmission, in accordance with some embodiments.

FIG. 32 illustrates another example of downlink data transmission with both eDCTS-to-Self and uplink transmission 2670, in accordance with some embodiments. In another example, as shown in FIG. 32, a gNB may transmit multiple eDCTS-to-Self messages 2676 using different antenna configurations or beams following a successful eDRTS 2672, eDCTS 2674 exchange with a targeted UE, but before data transmission (e.g., transmission of DL data 2678) to the targeted UE. In one embodiment, a number of back-to-back eDCTS-to-Self transmissions may be configured by a network or determined by the gNB based on previous directional channel measurements. The number of back-to-back eDCTS-to-Self transmissions may be included in the eDRTS transmission to a targeted UE. In another embodiment, the UE may include a request for back-to-back eDCTS-to-Self transmissions by the gNB. This request may be included in the eDCTS transmitted in response to the eDRTS received from the gNB. The request may specify at least one of the number of back-to-back eDRTS-to-Self transmissions requested, and gNB antenna configurations or beams. In some embodiments, the back-to-back eDCTS-to-Self transmission may be repeated once every T (or every given time period) (e.g., based on a minimum CCA duration) over the total duration of a transmission/communication exchange between the gNB and the UE (e.g., a MCOT).

In some embodiments, an eDRTS, an eDCTS, and an eDCTS-to-Self transmission may occur using a downlink shared channel (e.g., a PDSCH).

In some embodiments, a gNB may transmit an eDRTS message to start a downlink transmission, or an eDCTS message in response to an eDRTS message received from one of its associated UE, or eDCTS-to-Self transmissions which may be transmitted in various ways as described hereinabove.

The eDRTS, eDCTS and eDCTS-to-Self transmission from the gNB may be sent on a downlink shared channel in multiple ways.

In some embodiments, the eDRTS/eDCTS from the gNB may, e.g., only be sent to a targeted UE. In the case of an eDRTS transmission, the targeted UE may be a downlink data receiving UE. In the case of an eDCTS transmission, the targeted UE may be a UE that transmitted an eDRTS. The eDRTS/eDCTS from the gNB may be sent using a paired Tx beam with the targeted UE. The UE may receive control channel transmission in a common channel (e.g. PDCCH). The control information may include Downlink Control Information (DCI) that includes a Cyclic Redundancy Check (CRC) sequence that is scrambled using UE's C-RNTI. The UE may be able to recover the DCI and verify it by unscrambling the CRC with the C-RNTI.

In the case of an eDCTS-to-Self message from the gNB, the DCI may include a CRC sequence that is scrambled using a scrambling code specific to an ID of a destination UE or a gNB/eNB for eDCTS-to-Self, e.g., C-RNTI, Cell ID, etc.

In some embodiments, the DCI may include new flags to indicate the transmission as an eDRTS, eDCTS, or eDCTS-to-Self message This may help a receiving node to distinguish eDRTS/eDCTS/eDCTS-to-Self messages from other gNB transmission(s) which use same RNTI to scramble a CRC sequence for the DCI.

In some other embodiments, the control information may include a DCI that includes a CRC sequence that is scrambled using a scrambling code that is common to more than one UE or more than one gNB. In the case of an eDRTS transmission from a gNB, a common RNTI, e.g., RTS-RNTI, may be defined to decode eDRTS messages. In the case of eDCTS transmission from the gNB, a common RNTI, e.g., CTS-RNTI may be defined to decode eDCTS messages. In the case of eDCTS-to-Self transmission from the gNB, a common RNTI, e.g., self CTS-RNTI, may be defined to decode eDCTS-to-Self messages. The receiving node may be able to recover the DCI and verify it by unscrambling the CRC with the corresponding RNTIs, e.g., RTS-RNTI, CTS-RNTI, and self CTS-RNTI.

In some embodiments, the UE or/and the gNB may be previously configured with the RTS-RNTI, CTS-RNTI, and self CTS-RNTI, e.g., via System Information or UE-specific signaling. The RTS-RNTI, CTS-RNTI, and self CTS-RNTI may be common throughout the network. Alternately, in some other embodiments, the RTS-RNTI, CTS-RNTI, and self CTS-RNTI may be common to a group of eNBs/gNBs and used locally. In some embodiments, the UE may perform a blind search in the UE-specific search space in the PDCCH using UE's C-RNTI and in the common search space in the PDCCH using one or more of the RTS-RNTIs, CTS-RNTIs, and self CTS-RNTIs, if they are configured.

In some embodiments, in the case of an eDRTS transmission, a new DCI format may be used to contain the control information for the eDRTS transmission in the DL and/or eDCTS transmission in the UL. In some embodiments, by way of example, the DCI may contain the following fields: a eDRTS flag (if the CRC sequence of the DCI is scrambled using a C-RNTI); a DL Resource block assignment (for a DL eDRTS transmission); a MCS (for DL); UL Resource block assignment (for UL eDCTS transmission by UE); a MCS (for UL); a TPC for PUSCH; and/or a Resource block assignment (for data transmission after eDRTS and eDCTS transmission)

However, it will be understood that, in other embodiments, the DCI may be configured differently (e.g., the DCI may contain one or more different fields, additional field(s), and/or less fields than disclosed herein).

In addition to the eDRTS message content given in Table 1, the eDRTS message may also contain a subset of the following information, as shown by way of example in Table 6, in accordance with some embodiments.

TABLE 6

| | |
|---|---|
| Start Time | Indicates a start time of DL data transmission. This field may be present when a transmission duration field, i.e., Remaining duration of the complete transmission indicates a duration for DL data transmission only. |
| eDCTS count | Indicates a number of eDCTS transmissions requested. |
| eDCTS order | Indicates an order of eDCTS transmission. As one option, the complete eDCTS transmission order may be specified, e.g., using a bitmap containing beam IDs corresponding to transmission slots. Alternately, a schedule of the eDCTS transmission to a requesting transmitter (e.g., eNB/gNB transmitting the original eDRTS) may be specified, e.g., via a single bit to represent whether eDCTS to the requesting transmitter is transmitted first or last within the scheduled resource allocation containing multiple eDCTS transmissions. |
| Tx Beam ID | This field identifies an antenna configuration, e.g., a beam intended for use during subsequent DL data transmission. |

In some embodiments, in the case of an eDCTS transmission from a gNB, a new DCI format may be used to include control information for the eDCTS transmission in the DL and/or data transmission in the UL. In some embodiments, by way of example, the DCI may contain the following fields: a eDCTS flag (if the CRC sequence of the DCI is scrambled using C-RNTI); a Resource block assignment (for a DL eDCTS transmission); a MCS (for DL); a Resource block assignment (for UL data transmission by UE); a MCS (for UL); and/or a TPC for PUSCH.

However, it will be understood that, in other embodiments, the DCI may be configured differently (e.g., the DCI may contain one or more different fields, additional field(s), and/or less fields than disclosed herein).

In addition to the eDCTS message content given in Table 2, the eDCTS message may also contain a subset of the following information, as shown by way of example in Table 7, in accordance with some embodiments.

TABLE 7

| | |
|---|---|
| Start Time | Indicates a start time of DL data transmission. This field may be present when a transmission duration field, i.e., Remaining duration of the complete transmission indicates a duration for DL data transmission only. |

TABLE 7-continued

| | |
|---|---|
| Remaining eDCTS count | Indicates a number of remaining eDCTS transmissions in a current sequence. This field may be present when a transmission Duration field indicates a duration for DL data transmission only. |
| Tx Beam ID | This field identifies an antenna configuration, e.g., a beam intended for use during subsequent DL data transmission by a requesting node, e.g., eNB/gNB. |

In some embodiments, in the case of an eDCTS-to-Self from a gNB, the DCI may contain a resource block assignment for the eDCTS-to-Self message and a flag, i.e., eDCTS-to-Self flag, if a CRC sequence of the DCI for the eDCTS-to-Self message is scrambled using a C-RNTI.

In addition to the eDCTS-to-Self message content given in Table 4, the eDCTS-to-Self message may also contain a subset of the following information, as shown by way of example in Table 8, in accordance with some embodiments.

TABLE 8

| | |
|---|---|
| Start Time | Indicates a start time of DL data transmission. This field may be present when a transmission duration field, e.g., a Defer Duration field indicates a duration for DL data transmission only. |
| Targeted Receiver ID | Identifies a receiver of the data transmission. |
| Tx Beam ID | This field identifies an antenna configuration, e.g., a beam intended for use during subsequent DL data transmission. |

In some embodiments, a UE may be able to receive more than one eDRTS/eDCTS transmission from a requesting gNB (in the case of eDRTS transmission) or a responding gNB (in the case of eDCTS transmission). This may occur when the requesting gNB (in the case of eDRTS transmission) or the responding gNB (in the case of eDCTS transmission) may repeat eDRTS/eDCTS transmissions using different antenna configurations, e.g., different beams. In one embodiment, the message contents in the repeated eDRTS/eDCTS transmissions may be identical. The eDRTS/eDCTS message may include a start time and transmission duration fields to indicate the actual DL data transmission schedule.

In some other embodiments, the contents of multiple eDRTS/eDCTS transmissions may differ from each other. For example, in some embodiments, a transmission duration field in each successive transmission of the eDRTS/eDCTS message may be decremented by an amount required for a single eDRTS/eDCTS message transmission. In one embodiment, a recipient (or addressed) UE may stop the reception process after successfully receiving one eDRTS/eDCTS transmission in the current allocation.

In some embodiments, the contents of the eDRTS/eDCTS/eDCTS-to-Self message may be scrambled using a sequence that is common to a group of cells, e.g., a Cell Group Sequence (CGS). In one embodiment, a common CGS may be used for the entire operator network. In another embodiment, a single CGS may be frequency channel or sub-band specific (e.g., all devices operating in a specified frequency channel or sub-band may support the same CGS).

In yet another embodiment, a UE may be configured with multiple CGSs. The UE may perform a blind decode on any eDRTS/eDCTS/eDCTS-to-Self transmission with each of the configured CGSs to read the message contents. Alternately, in some embodiments, the DCI may be linked to the eDRTS/eDCTS/eDCTS-to-Self message and may contain information about, e.g., a configuration for, the CGS used to scramble a subsequent eDRTS/eDCTS/eDCTS-to-Self message.

In some embodiments, in the case of an eDRTS transmission from a gNB, a UE attached to a different cell may configure the UE's receive antenna pattern, e.g., a beam pattern, for subsequent eDCTS reception, based on a CGS that resulted in a successful de-scrambling of the eDRTS message.

In some embodiments, a UE may be configured with CGS(s), e.g., by System Information or a higher layer control messaging, e.g., RRC messages.

In some embodiments, in the case when an eDRTS/eDCTS message may only be sent to a targeted UE, the eDRTS/eDCTS message may be scrambled using a sequence generated using a cell ID and a UE-Specific RNTI, e.g., a C-RNTI. The contents of an eDCTS-to-Self message may be scrambled using a sequence generated using a targeted receiver ID, e.g., C-RNTI, Cell ID.

Note that, in the contents of the eDCTS message, as shown, for example, in Table 2, a Receiver ID (field) may be the same as UE's C-RNTI. Alternatively, the Receiver ID may be a different ID that is configured using e.g., control channel signal(s), higher layer signaling, etc.

In some embodiments, an eDRTS, an eDCTS, and an eDCTS-to-Self transmission may occur using an uplink shared channel (e.g., a PUSCH).

In some embodiments, a UE may transmit an eDRTS message to request an uplink transmission, or a eDCTS message in response to a eDRTS message received from a BS (base station) associated with the UE, or eDCTS-to-Self transmissions which may be transmitted in various ways as described hereinabove.

The eDRTS, eDCTS and eDCTS-to-Self transmission from a UE may be sent on uplink shared channel in multiple ways.

In some embodiments, the UE may receive control channel transmission in a common channel (e.g. PDCCH). The received control information may include a DCI containing a grant for an uplink transmission in a shared channel, e.g. a Physical Uplink Shared Channel (PUSCH).

In some embodiments, the DCI may contain allocation for a single eDRTS/eDCTS/eDCTS-to-Self transmission by a UE to the associated BS, e.g., an eNB/gNB. The eDRTS/eDCTS may be sent using a paired Tx (transmit) beam with the associated BS.

In another embodiment, the DCI may contain an allocation for multiple, e.g., more than one, eDRTS/eDCTS/eDCTS-to-Self transmissions by the UE. In some embodiments, the UE may still determine a number of eDRTS/eDCTS/eDCTS-to-Self transmissions. For example, UE may transmit a single eDRTS/eDCTS/eDCTS-to-Self message in the allocation that may accommodate multiple, e.g., more than one, eDRTS/eDCTS/eDCTS-to-Self transmissions.

In some embodiments, an eDRTS/eDCTS message may include a field to indicate a number of eDRTS/eDCTS transmissions. In one embodiment, the number indicated in the field may refer to a total number of eDRTS/eDCTS transmissions in a current sequence. In another embodiment, that number may refer to a remaining number of eDRTS/eDCTS transmissions in a current sequence.

In some embodiments, the UE may transmit an eDRTS/eDCTS to the associated BS first in a sequence of multiple eDRTS/eDCTS transmissions. In other embodiments, the UE may transmit an eDRTS/eDCTS to the associated BS last in a sequence of multiple eDRTS/eDCTS transmissions.

In one embodiment, the UE may not include a field to indicate a total number of eDRTS/eDCTS transmissions in a current sequence. In yet another embodiment, the UE may transmit an eDRTS/eDCTS to the associated BS in a random location in the current sequence of multiple eDRTS/eDCTS transmissions.

In some embodiments, the UE may determine whether a channel may be free for transmission for a specified duration prior to a scheduled start of eDRTS/eDCTS transmission. In some embodiments, a monitoring duration may be previously configured at the UE or may be known to the UE. For example, the UE may perform a CCA (e.g., a LBT) for the monitoring duration. The determination (e.g., the CCA) may be performed before the time when the transmission may start.

In some embodiments, in the case of the eDCTS transmission, when the UE correctly receives a DL eDRTS message and determines that the channel may be available for the monitoring duration, the UE may transmit (e.g., begin transmitting) an eDCTS message in the assigned resources. When the UE correctly receives the DL eDRTS message and determines the channel may be busy, e.g., based on the CCA, the UE may not transmit the eDCTS message in the assigned resource. The UE may defer transmission, e.g., to a later time.

In some embodiments, in the case of the eDRTS transmission, when the UE determines that the channel may be available for the monitoring duration, the UE may transmit (e.g., begin transmitting) an eDRTS message in the assigned resources. When the UE determines the channel may be busy, e.g., based on the CCA, the UE may not transmit eDRTS message in the assigned resource. The UE may defer transmission, e.g., to a later time. In general, a transmission may be conditioned on whether the transmission fits within remaining time resources of the scheduled allocation.

In some embodiments, the UE may be configured to transmit multiple eDRTS/eDCTS messages. Successive eDRTS/eDCTS transmissions may use different antenna configurations, e.g., different beams.

In one embodiment, multiple eDRTS/eDCTS transmissions from the UE may have identical content. The eDRTS/eDCTS message may include start time and transmission duration fields to indicate the actual data transmission schedule.

In other embodiments, the UE may change the contents of the eDRTS/eDCTS message transmitted using different antenna configurations, e.g., different beams. In one embodiment, the UE may decrement a transmission duration field in each successive transmission of the eDRTS/eDCTS message by an amount required for a single eDRTS/eDCTS message transmission.

In some embodiments, the contents of the eDRTS/eDCTS/eDCTS-to-Self message may be scrambled using a sequence that is common to a group of cells, e.g., a CGS. In one embodiment, a common CGS may be used for the entire operator network. In another embodiment, a single CGS may be frequency channel or sub-band specific (e.g., all devices operating in a frequency channel sub-band may support the same CGS).

In yet another embodiment, the UE may be configured with multiple CGSs. The UE may use any of the configured CGSs, e.g., randomly. Alternately, in some other embodiments, the DCI may be linked to the eDRTS/eDCTS/eDCTS-to-Self message and may contain information about, e.g., a configuration for, the CGS to be used to scramble a subsequent eDRTS/eDCTS/eDCTS-to-Self message. In some embodiments, the UE may be configured with the CGS, e.g., via System Information or higher layer control messaging, e.g., a RRC message.

In some embodiments, eDRTS, eDCTS, and eDCTS-to-Self transmission may occur using an uplink common channel.

Note that, in some embodiments, a UE may not receive any specific UL resource grant in advance from an associated BS associated with the UE, e.g., an eNB/gNB, for the purpose of eDRTS/eDCTS/eDCTS-to-Self transmission. If the UE determines that no resource(s) were granted for the eDRTS/eDCTS/eDCTS-to-Self transmission, then, in some embodiments, the UE may transmit an eDCTS message using UL Grant-less resource(s).

In some embodiments, the UL Grant-less Channel may be, by way of example, designed in one or more of the following ways, as described, e.g., below.

The UL Grant-less Channel may be located in one or more subframes in each frame or certain frame(s), e.g., frame(s) with certain SFN number(s) or frame(s) with SFN(s) with certain properties. The subframes and/or frames and/or frame properties may be fixed or may be a function of a cell's physical ID (cell ID).

The UE may be previously configured with a location of the UL Grant-less Channel, e.g., via System Information, a downlink Broadcast Information, or UE-specific signaling. A sequence and/or identifier to be used for scrambling of the UL Grant-less Channel may be common to a group of cells, e.g., CGS. In one embodiment, a common CGS may be used for the entire operator network. In another embodiment, a single CGS may be frequency channel or sub-band specific (e.g., all devices operating in a frequency channel or sub-band support the same CGS. In yet another embodiment, a UE may be configured with multiple CGSs.

The UE may be configured with multiples CGSs, e.g., via System Information or higher layer control messaging, e.g., RRC messages.

The gNBs and/or UEs may be configured to listen and decode the UL Grant-less Channel.

Demodulation Reference Signal (DM-RS) based transmission may be used. The sequence to derive the DM-RS may be based on a common sequence, e.g., a CGS. In one embodiment, the sequence to derive DM-RS may be based on a UE-specific sequence. The position of the DM-RS in the dedicated resources may be fixed, known or configured.

In some embodiments, the UE may wait for a duration from the start of the UL Grant-less resources. The wait duration may be determined, e.g., randomly. After waiting, the UE may first determine if the channel may be free for transmission for a specified duration prior to any transmission. The monitoring duration may be previously configured at the UE or may be known to the UE. For example, the UE may perform a CCA (e.g., a LBT) for the monitoring duration. The determination (e.g., a CCA) may be performed before the time when the transmission may start. After the successful CCA, the UE transmits eDRTS/eDCTS/eDCTS-to-Self on the UL Grant-less resources.

In some embodiments in the case of an eDCTS-to-Self transmission, the UE may signal in the eDRTS message (in case of uplink) or in the eDCTS message (in case of downlink transmission), a number of eDCTS-to-Self messages, to inform the BS. In some embodiments, this information may be sent along with IDs of beams, e.g., beams intended for use during the eDCTS-to-Self transmissions.

In some embodiments, an eDRTS transmission may occur using dedicated resources on an uplink control channel (e.g., a PUCCH).

In some embodiments, a UE may be allocated dedicated resources on PUCCH to transmit an eDRTS in a variety of ways. The dedicated resources may be located in one or more subframes in each frame or certain frame(s), e.g., frame(s) with certain SFN number(s) or frame(s) with SFN(s) with certain properties. The subframes and/or frames and/or frame properties may be fixed or may be a function of a cell's physical ID (cell ID). The dedicated resources may be assigned in a set of symbols, a short TTI, a mini-slot, and/or the like. The dedicated resources may be assigned in a set of one or multiple subcarriers. Demodulation Reference Signal (DM-RS) based transmission may be used as well. In this regard, the position of the DM-RS in the dedicated resources may be fixed, known and/or configured.

In some embodiments, the eDRTS on the dedicated resources may be scrambled using UE-specific scrambling sequence.

The UE may be previously configured with dedicated resource allocation, and further configured with a UE-specific scrambling sequence, e.g., via higher layer signaling message, e.g., a RRC Connection Setup or via System Information.

In some embodiments, when the UE needs to transmit an eDRTS, it first performs CCA prior to the next available dedicated resource opportunity. After the successful CCA, UE transmits eDRTS on the dedicated resource.

Some embodiments disclose a non-targeted UE behavior and a neighboring gNB/eNB behavior upon receipt of an eDRTS/eDCTS/eDCTS-to-Self.

Namely, in some embodiments, a non-targeted UE or a neighboring BS that receives an eDRTS or/and eDCTS or/and eDCTS-to-Self transmission that includes another Cell'd ID or another UE's ID (e.g., a C-RNTI), may not transmit on a channel for transmission duration indicated in the message. The transmission duration may be specified for the entire message exchange including remaining eDRTS, eDCTS, eDCTS-to-Self transmissions and subsequent data transmission. Alternately, the transmission duration may be specified in terms of start time and a duration.

In other embodiments, a UE belonging to a neighboring cell or a neighboring BS that receives an eDRTS or/and an eDCTS or/and an eDCTS-to-Self transmissions that includes another Cell's ID or UE's ID (e.g., C-RNTI) may transmit on a frequency channel or sub-band if it determines that doing so will not cause interference to subsequent transmission associated with the received eDRTS/eDCTS/eDCTS-to-Self message.

In some embodiments, a receiving non-targeted UE or a neighboring BS may determine that its directional transmission may not cause interference to proposed directional data transmission between the eDRTS/eDCTS/eDCTS-to-Self transmitter and the corresponding receiver. In some embodiments, such determination may be made by first determining a direction of the proposed data transmission. In another embodiment, the proposed transmission direction may be determined from Targeted Receiver ID and Requesting Transmitter ID fields contained in the eDRTS/eDCTS/IeDCTS-to-Self message. This may be possible when the receiving non-targeted UE or neighboring BS knows the location and orientation of the transmitter and the receiver. In another embodiment, if possible, this determination may be based on the contents of the Requesting Transmitter ID and Tx Beam ID fields of the eDRTS/eDCTS/eDCTS-to-Self message.

Assuming that a non-targeted UE belonging to a neighboring cell or a neighboring BS may determine whether its directional transmission (e.g., UL or DL transmission) may not interfere with the directional transmission between the BS and targeted UE, following exchange of eDRTS, eDCTS, and eDCTS-to-Self (if any), then that UE or neighboring BS may perform concurrent (e.g., simultaneous) directional transmissions.

After the completion of a transmission duration, in some embodiments, the UE or the BS may first determine if the channel may be free for transmission for a specified duration prior to any subsequent transmissions. The monitoring duration may be previously configured or may be known to the UE or BS. For example, the UE may perform a CCA (e.g., a LBT) for the monitoring duration. The determination (e.g., the CCA) may be performed before the time when the transmission may start.

Figure 33:
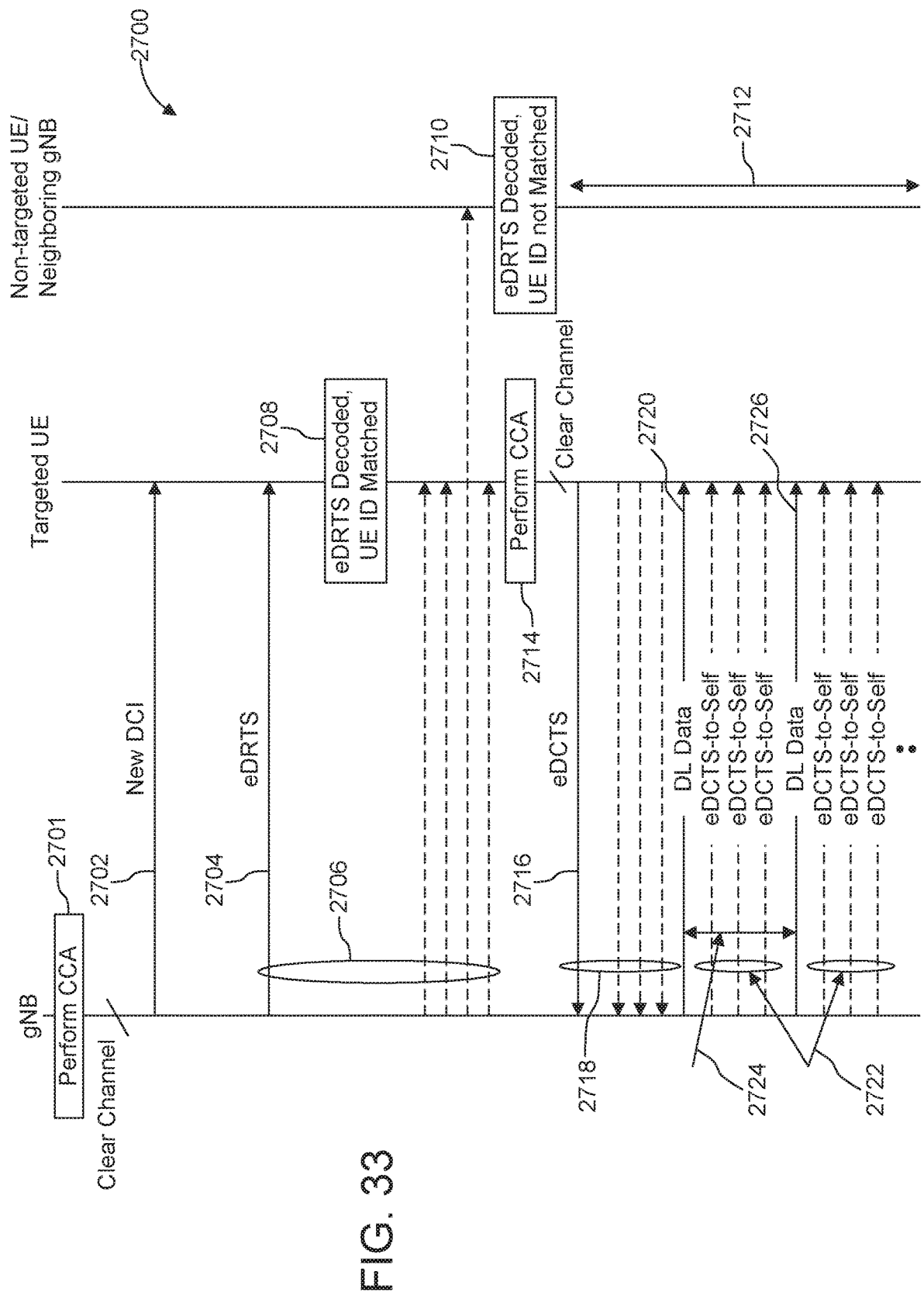
FIG. 33 illustrates an example of a transmission of an eDRTS, eDCTS, and eDCTS-to-Self, in accordance with some embodiments.

FIG. 33 illustrates an example of a transmission of an eDRTS, eDCTS, and eDCTS-to-Self 2700, in accordance with some embodiments. In this example, the eDRTS transmission may be sent using a downlink shared channel, such as, e.g., a PDSCH, and the eDCTS transmission may be sent using allocated resources on an uplink shared channel. Further, the downlink transmission uses the eDCTS-to-Self transmission to protect a current transmission.

As shown in FIG. 33, at 2701, a transmitting node, such as a gNB in FIG. 33, may first perform a CCA to determine if the channel is clear/free for transmission. Once the gNB determines that the channel is clear, at 2702, it may transmit a new DCI on a downlink common channel, such as a PDCCH, to a receiving node, which in FIG. 33, is a targeted UE. The DCI may be scrambled using a common RNTI. The common RNTI may be common to more than one UE or common throughout a network, such as, e.g., a SI-RNTI. Further, the DCI may contain DL and UP resource allocations for the eDRTS transmission and the eDCTS transmission, respectively. At 2704, the gNB may transmit multiple eDRTSs, including at least one eDRTS transmitted in a direction of the targeted UE and at least one eDRTS transmitted in a direction of a non-targeted UE and/or neighboring gNB, as shown in FIG. 33. For example, if configured, the gNB may perform repeated eDRTS transmissions 2706 in multiple directions, as shown in FIG. 33. The gNB may perform the eDRTS transmissions 2706 in the multiple directions to, for example, reserve the channel in a larger area around the receiving node, i.e., the targeted UE.

In some embodiments, each transmitted eDRTS may include a target UE ID, a requester (gNB) ID, a transmission duration (Tx duration), a start time, a Tx (transmit) beam ID, etc. Further, the eDRTS may be scrambled using a CGS that may be, e.g., common to a group of cells.

When the targeted UE receives the eDRTS from the gNB, at 2708, the targeted UE may decode the eDRTS and determine that the UE ID included in the eDRTS corresponds to an ID of the targeted UE. Similarly, when the non-targeted UE and/or the neighboring gNB receives the eDRTS from the gNB, at 2710, the non-targeted UE and/or the neighboring gNB may decode the eDRTS and determine that the UE ID included in the eDRTS does not match an ID of the targeted UE. Further, the non-targeted UE and/or the neighboring gNB may obtain from the decoded eDRTS the transmission duration (or at least an indication thereof). As such, as indicated by a time period 2712, the non-targeted UE and/or the neighboring gNB may not initiate transmission(s) for the Tx duration obtained from the received eDRTS. As a result, the non-targeted UE and/or the neighboring gNB may be prevented from interfering with the transmissions between the gNB and the targeted UE during at least that time period.

At 2714, the targeted UE may perform a CCA to check if the channel is clear. Once the targeted UE determines that the channel is clear, at 2716, the targeted UE may transmit one or more eDCTSs towards the gNB. For example, as shown in FIG. 33, the targeted UE may perform multiple repeated eDCTS transmissions 2718 in multiple directions if so configured. The eDCTS(s) 2718 may be transmitted on the allocated resources using the uplink shared channel, such as a PUSCH, and each eDCTS may be scrambled using the CGS. Following the receipt of the eDCTS transmission(s) from the targeted UE, at 2720, the gNB may start downlink (DL) data transmission. The DL data transmission may be followed by one or more eDCTS-to-Self transmissions during a period T (denoted by 2724 in FIG. 33) that may, for example, correspond to a minimum LBT duration. For example, as shown in FIG. 33, the gNB may perform multiple repeated eDCTS-to-Self transmissions 2722 in multiple directions, if so configured, during the period 2724. The eDCTS-to-Self transmission(s) may be performed to keep the (directional) channel between the gNB and the targeted UE reserved from access by potentially interfering node(s).

If the gNB has additional data to send, at 2726, it transmits the additional DL data to the targeted UE. As shown in FIG. 33, the DL data transmission may be again followed by one or more eDCTS-to-Self transmissions from the gNB. For example, as shown in FIG. 33, the gNB may perform multiple repeated eDCTS-to-Self transmissions 2722 in multiple directions (if so configured).

Figure 34:
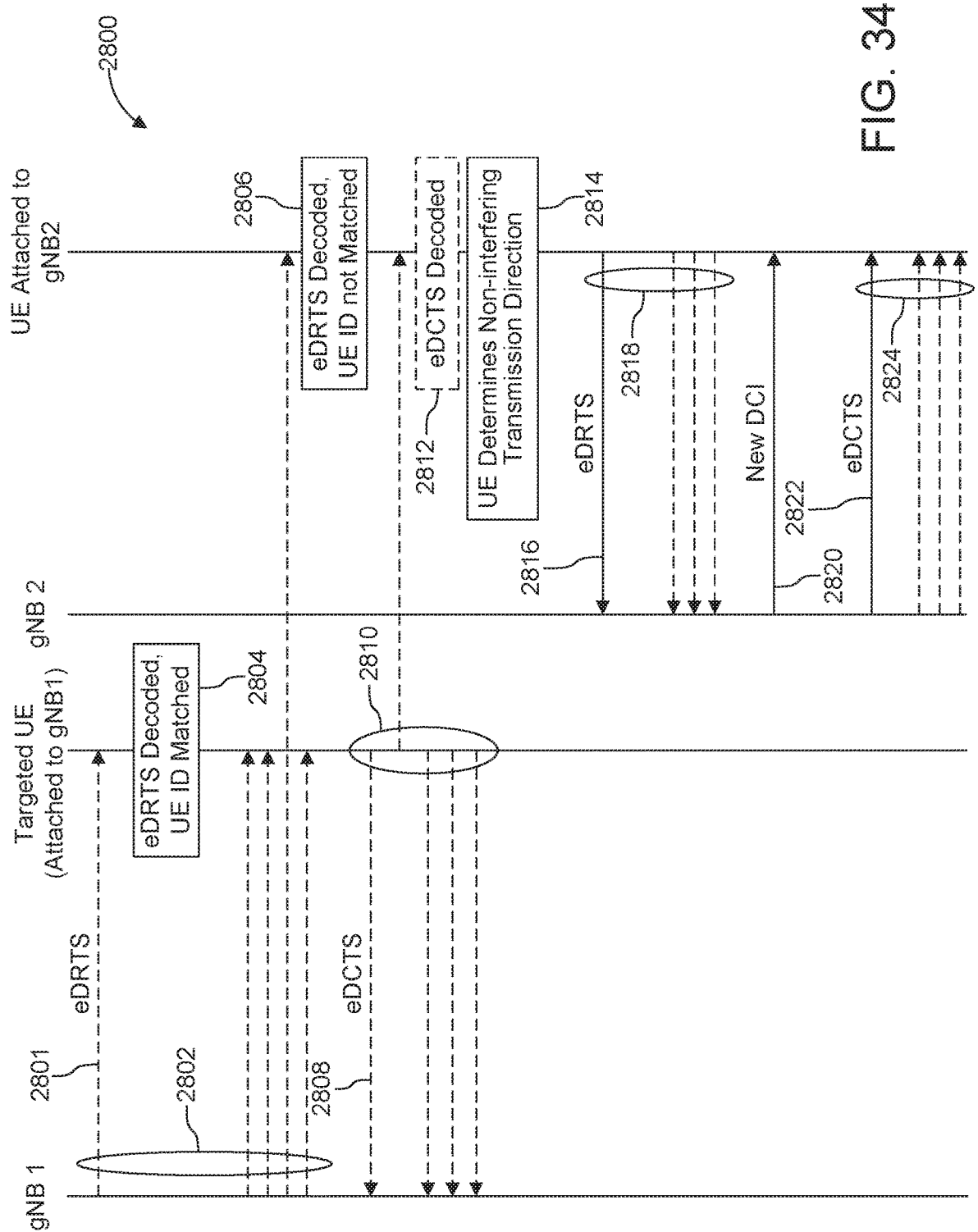
FIG. 34 illustrates an example of a UE behavior at a non-targeted UE after receiving an eDRTS and an eDCTS from another cell, in accordance with some embodiments.

FIG. 34 illustrates an example of a behavior at a non-targeted UE 2800 after receiving an eDRTS and an eDCTS from another cell, in accordance with some embodiments. In this example, as shown in FIG. 34, after receiving the eDRTS and the eDCTS from another cell, the non-targeted UE determines a non-interfering transmission direction and sends an eDRTS using an uplink common channel to a BS associated with the UE to start an uplink transmission.

More specifically, as shown in FIG. 34, at 2801, a transmitting node, such as a gNB1 in FIG. 34, may transmit on a downlink shared channel, such as a PDSCH, multiple eDRTSs, including at least one eDRTS transmitted in a direction of a receiving node, e.g., a targeted UE associated with the gNB1, and at least one eDRTS transmitted in a direction of a non-targeted UE associated, e.g., with a neighboring gNB (gNB2), as shown in FIG. 34. For example, if configured, the gNB1 may perform repeated eDRTS transmissions 2802 in multiple directions, as shown in FIG. 34. In some embodiments, each transmitted eDRTS may be scrambled using a CGS and include a target UE ID, a requestor (gNB 1) ID, a transmission duration (Tx duration), a start time, a Tx (transmit) beam ID, etc. The CGS may be common to a group of cells. When the targeted UE receives the eDRTS from the gNB 1, at 2804, the targeted UE may decode the eDRTS and determine that the UE ID included in the eDRTS corresponds to an ID of the targeted UE. Similarly, when the non-targeted UE receives the eDRTS from the gNB, at 2806, the non-targeted UE may decode the eDRTS and determine that the UE ID included in the eDRTS does not match an ID of the non-targeted UE.

As further shown in FIG. 34, at 2808, the targeted UE may transmit one or more eDCTSs. For example, as shown in FIG. 34, the targeted UE may perform multiple repeated eDCTS transmissions 2810 in multiple directions if so configured. The eDCTS(s) may be transmitted on earlier allocated resources (e.g., resources allocated by the gNB1) using an uplink shared channel, such as a PUSCH, and each eDCTS may be scrambled using the CGS. As FIG. 34 illustrates, the multiple repeated eDCTS transmissions 2810 may include at least one eDCTS transmission in a direction of the non-targeted UE. As such, the non-targeted UE may receive one of or both of the eDRTS and eDCTS. If the non-targeted UE receives the eDCTS, at 2812, it may decode the eDCTS. At 2814, the non-targeted UE may determine a non-interfering transmission direction, or a direction of transmission that would not interfere with transmission(s) between the gNB1 and the targeted UE. In some embodiments, for example, the non-targeted UE may determine the non-interfering transmission direction based on a knowledge of a respective location and orientation of a transmitter and a receiver (e.g., the gNB1 and the targeted UE, as in the case in FIG. 34). In this regard, the respective location and orientation of the transmitter/receiver can be used to identify a beam that the non-targeted UE may use for a transmission that will not, e.g., interfere with a reception at the targeted UE. In other embodiments, the non-targeted UE may have historical measurements from which the non-targeted UE can extract information regarding the non-interfering transmission direction.

Following the determination of the non-interfering transmission direction, at 2816, the non-targeted UE may perform one or more eDRTS transmissions directed towards the gNB2 associated with that UE. For example, as shown in FIG. 34, the non-targeted UE may perform multiple repeated eDRTS transmissions 2818 in multiple directions if so configured. Each eDRTS transmitted by the non-targeted UE may be scrambled using an associated CGS and sent on a common or grant-less uplink channel. Following the eDRTS transmission(s) from the non-targeted UE, at 2820, the gNB2 may transmit a new DCI on a downlink common channel, such as a PDCCH, to the non-targeted UE. The DCI may contain resource allocation information of an eDCTS. The DCI may be scrambled using a common RNTI. The common RNTI may be common to more than one UE or common throughout a network, such as, e.g., a SI-RNTI. As indicated in the DCI transmission, at 2822, the gNB2 may transmit one or more eDCTSs to the non-targeted UE on a downlink shared channel (e.g., a PDSCH). For example, if configured, the gNB2 may perform repeated eDCTS transmissions 2824 in multiple directions, as shown in FIG. 34. Each of the eDRTS(s) may be scrambled using the CGS and transmitted by the gNB2 on a downlink shared channel, such as a PDSCH.

According to some embodiments, implementations associated with a coexistence of directional NR-WiGig systems in unlicensed bands may be also provided.

A WiGig device may use a detection threshold (e.g., higher detection threshold) against a non-WiGig system transmission(s), which may not have a (e.g., special) preamble when processing CCA. The WiGig device may back-off if, for example, it senses a higher interference from non-WiGig devices than it senses from WiGig devices. A NR transmission may use short periodic transmissions (e.g., minislot duration) in a reverse direction (e.g., opposite to the intended communication direction). This may cause WiGig devices to back off.

If, for example, there is NR-WiGig coexistence, NR device(s) (e.g., gNB and/or UE) may use a (e.g., the same) channel CCA and/or a (e.g., the same) channel reservation procedure as described in relation to the NR-NR coexistence scenario, with one or more of the following changes applied. Namely, the NR device may use a (e.g., single) block transmission from a receiving node for a (e.g., each) minimum contention window. The NR device may use a multiple block transmission from the receiving node for a (e.g., per each) minimum contention window. The NR device may use increased power block transmission from the receiving node for a (e.g., per each) minimum contention window.

In some embodiments, one or more of the following may apply, e.g., in relation to using a (e.g., single) block transmission from a receiving node for a (e.g., each) minimum contention window.

Figure 9:
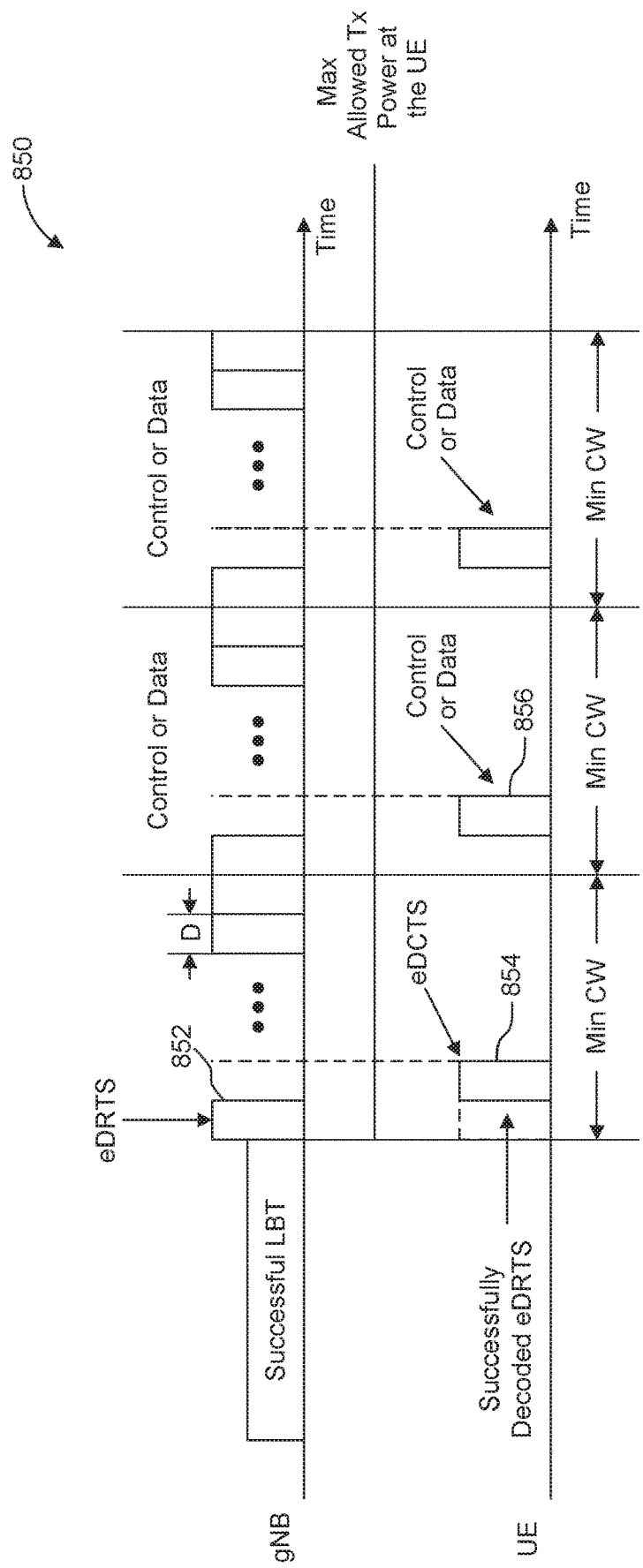
FIG. 9 illustrates an example DL/UL switching configuration for NR-WiGig coexistence scenario, in accordance with some embodiments.

The DL/UL switching configuration transmission for a NR transmission may be determined based on a (e.g., minimum) distributed inter frame spacing (DIFS) duration of the WiGig system. FIG. 9 illustrates an example DL/UL switching configuration 850 for a NR-WiGig coexistence scenario, in accordance with some embodiments. For example, as shown in FIG. 9, a reverse direction transmission from a UE to a gNB on a beam corresponding to a Rx beam on which forward transmission from the gNB was received, may be repeated within a minimum contention window (min CW) (e.g., after a successful LBT and successfully decoded eDRTS 852, followed by an eDCTS 854, as shown in FIG. 9). The min CW may be set to a minimum distributed inter frame spacing (DIFS) duration of a WiGig system. As seen in FIG. 9, 'D' may be defined as a minimum data or control block interval, which may carry a meaningful data packet (e.g., a symbol, minislot, and/or the like). The reverse direction may be defined as a direction from a receiving node to a transmitting node.

The example DL/UL switching configuration 850 shown in FIG. 9 may use, e.g., a single reverse power controlled mini-slot transmission, for example, to back-off WiGig devices. As shown in FIG. 9, power controlled burst transmissions 856 (e.g., burst transmissions below a maximum (max) allowed Tx power at the UE, as shown in FIG. 9) in the reverse direction may be able to back-off a device(s). The device(s) may reside within range, which may be relatively short.

Figure 10:
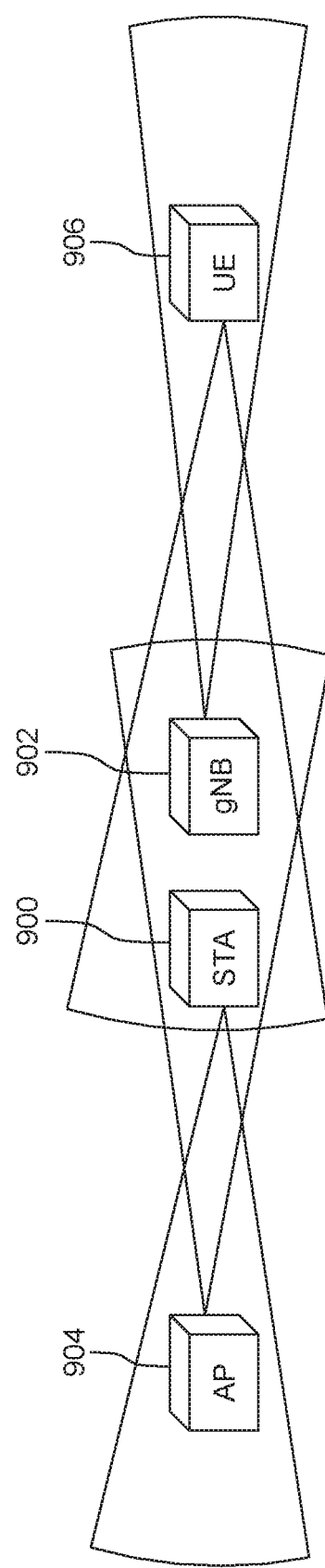
FIG. 10 illustrates an example of a beam coverage of forward and/or reverse links for a non-interfering scenario with NR-WiGig coexistence, in accordance with some embodiments.

The example of FIG. 9 may be suitable for non-interfering NR-WiGig coexistence, which is illustrated by an example in FIG. 10. More specifically, FIG. 10 illustrates an example of a beam coverage of forward and/or reverse links for a non-interfering scenario with NR-WiGig coexistence, in accordance with some embodiments. As seen in FIG. 10, a STA 900 and a gNB 902 may not interfere with each other. This may be due to directional transmissions (e.g., DL directional transmissions from the gNB 902 to a UE 906 may not interfere with the STA 900, and/or UL directional transmissions from the STA 900 to an AP 904 may not interfere with the gNB 902). A distance between the AP 904 and the UE 906 may be large. The coexistence scenario shown in FIG. 10 may be referred to as non-interfering because, for example, the DL AP transmissions may create interference (e.g., limited interference) to the UE 906. The interference may be negligible. The interference may be due to the distance and/or a propagation loss. The UL UE transmissions may create interference to the AP 904, which may be due to the distance (and/or the corresponding propagation loss). The distance may be large. The interference may be limited and/or negligible.

In some embodiments, one or more of the following may apply, e.g., in relation to using a multiple block transmission from a receiving node for a (e.g., per each) minimum contention window.

Figure 11:
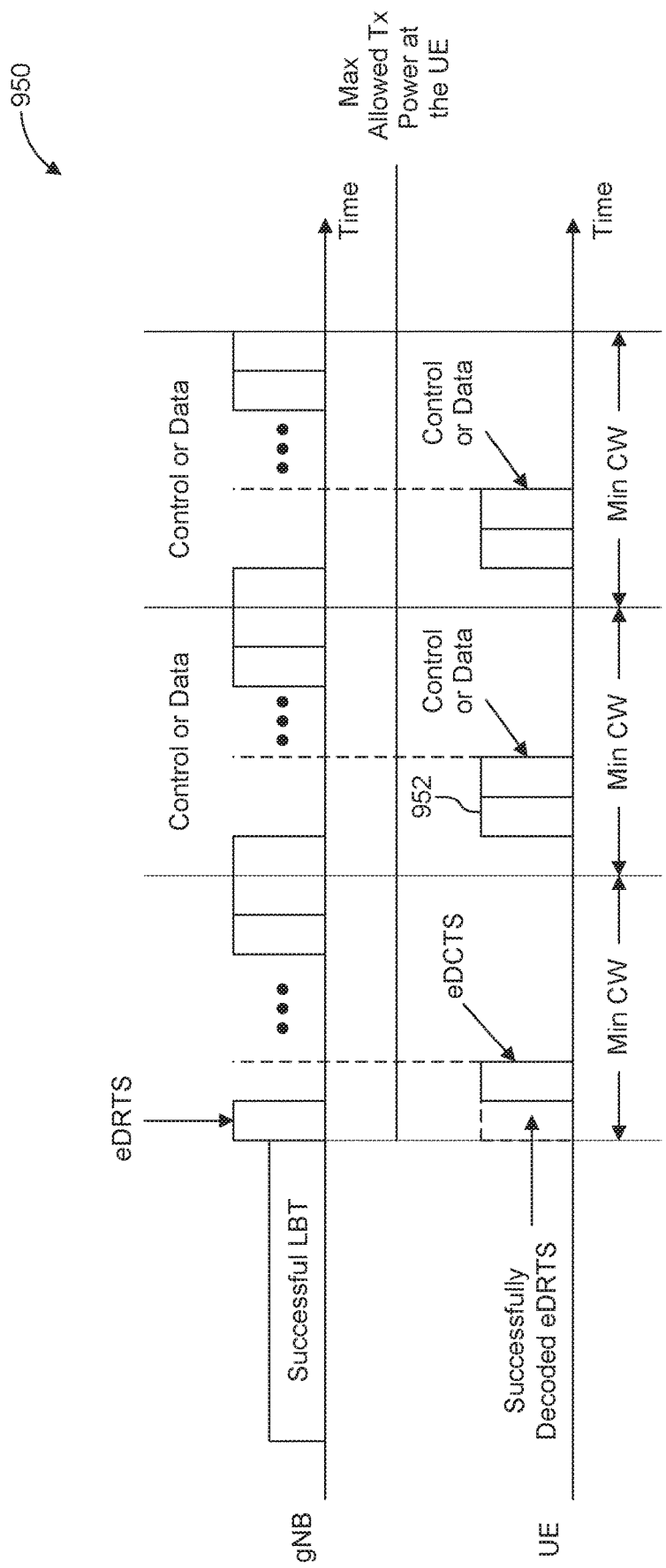
FIG. 11 illustrates another example of a DL/UL switching configuration for NR-WiGig coexistence scenario, in accordance with some embodiments.
Figure 12:
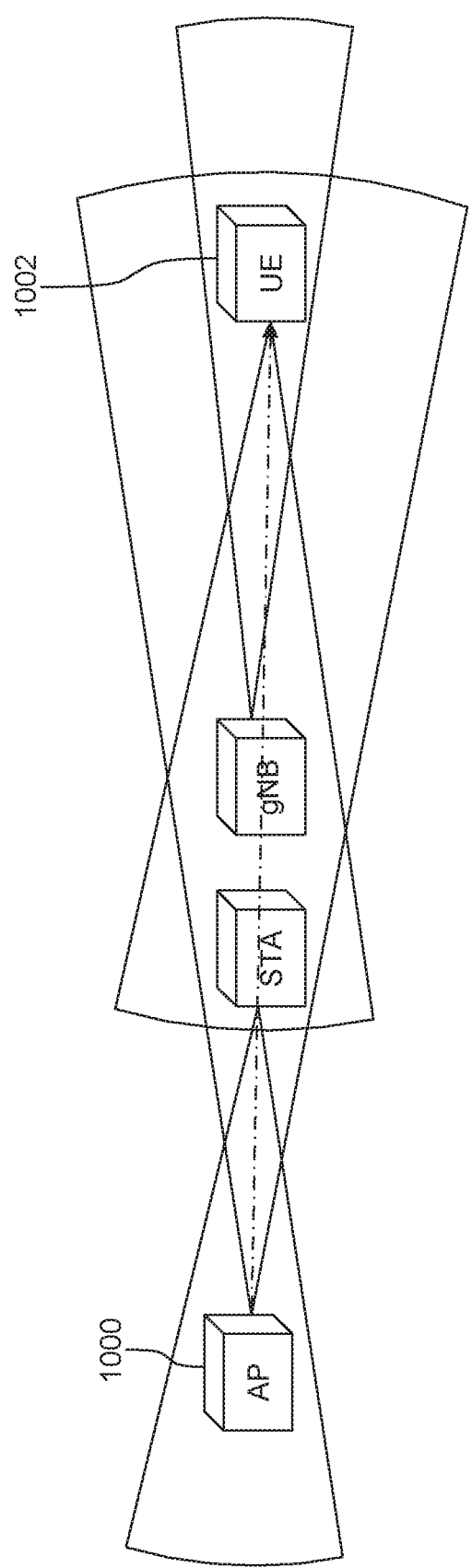
FIG. 12 illustrates an example of a beam coverage of forward and/or reverse links for an AP to UE interference scenario in a NR-WiGig coexistence, in accordance with some embodiments.

A receiving node may transmit multiple blocks ('D' size blocks) in a direction of a transmitting node. This may, for example, increase an interference range (e.g., to increase the chance of causing potential interfering WiGig AP node(s), as shown in FIG. 12, to back-off). FIG. 12 illustrates an example of a beam coverage of forward and/or reverse links for an AP to UE interference scenario in a NR-WiGig coexistence, in accordance with some embodiments. In the example of FIG. 12, reverse transmission may not able to back-off a WiGig AP 1000. Multiple 'D' block transmissions in a reverse direction (e.g., in a direction of a transmitting node) are shown in FIG. 11. More specifically, FIG. 11 illustrates another example of a DL/UL switching configuration 950 for NR-WiGig coexistence scenario, in accordance with some embodiments.

Referring to FIG. 11, there may be a limit, which may be defined in a reverse link, to indicate a number of D blocks 952 (M) (e.g., an allowable number of D blocks) used at a given power. The value of M may be determined based on the QoS and/or mapped to a finite integer number. The same DL/UL switching configuration method may be, for example, applied for all type(s) of QoS(s) and/or mapping(s). The transmission of the multiple blocks 952 in the reverse direction may also be used in a NR-NR coexistence scenario.

The example configuration shown in FIG. 11 may use, for example, a transmission of multiple reverse mini-slots to back-off WiGig devices. This may be used, for example, for the interference scenario illustrated in FIG. 12. As seen in FIG. 12, the AP 1000 may interfere (e.g., significantly interfere) with a UE 1002. This may be due to a smaller distance between the AP 1000 and the UE 1002. As seen in FIG. 12, the AP to UE interference is highlighted as a dashed and dotted line.

In some embodiments, one or more of the following may apply, e.g., in relation to using increased power block transmission from a receiving node for a minimum contention window, such as, e.g., per each minimum contention window.

Figure 13:
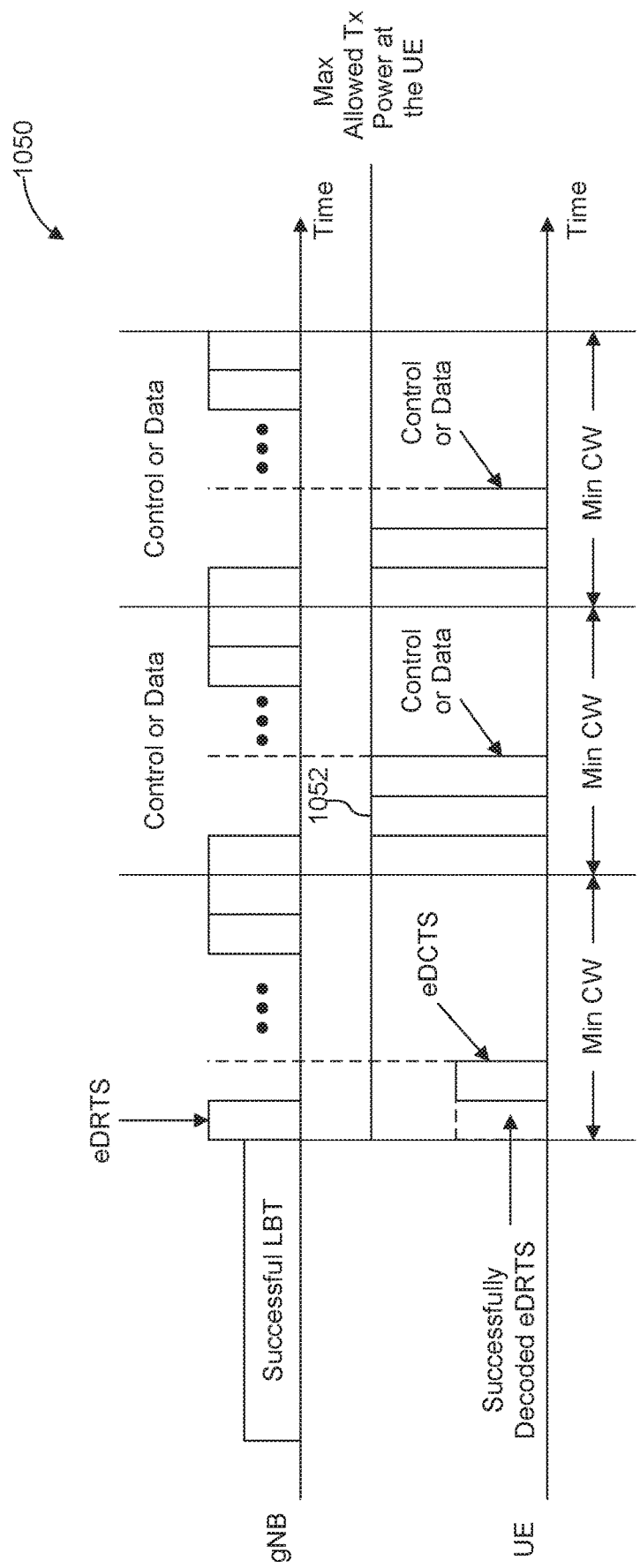
FIG. 13 illustrates an example of a DL/UL switching configuration for NR-WiGig coexistence scenario using higher power and multiple reverse mini-slots transmission to back-off WiGig devices, in accordance with some embodiments.
Figure 14:
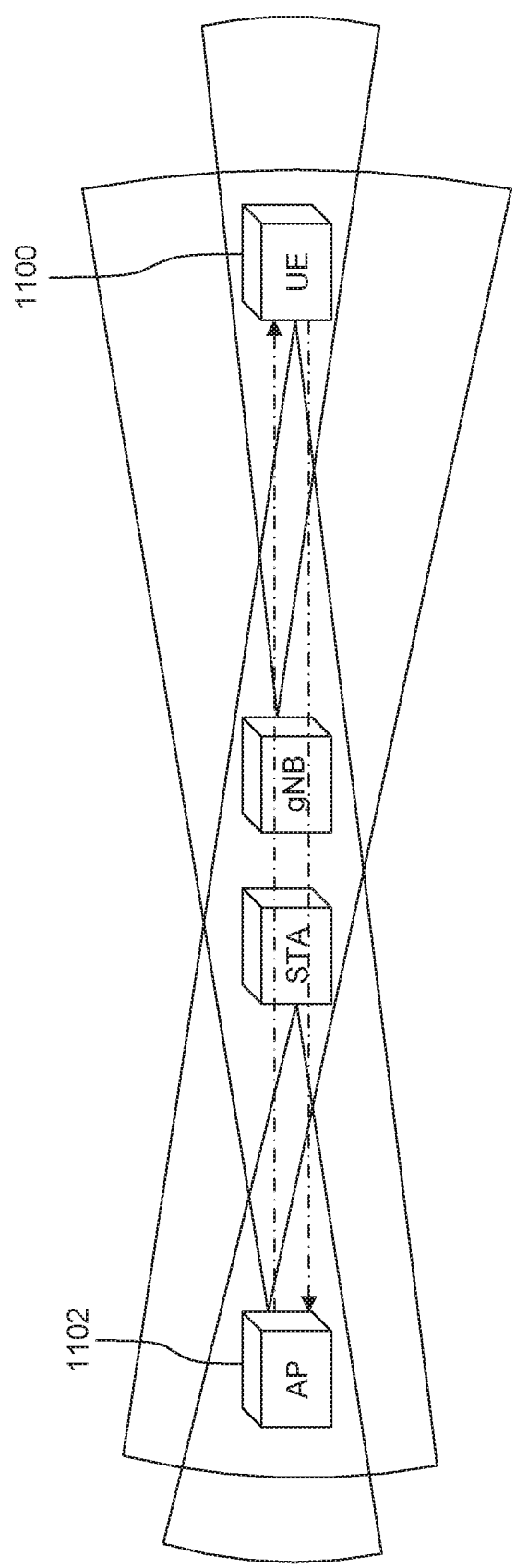
FIG. 14 illustrates an example of a beam coverage of forward and/or reverse links for interference scenario in NR-WiGig coexistence, in accordance with some embodiments.

A reverse link (e.g., receiving node transmissions in a direction of a transmitting node) may use higher power. This may occur, for example, to increase the chance of causing a back-off of an interfering transmission. This may be seen in FIG. 13, and/or may be used, for example, for an interference scenario illustrated in FIG. 14. Namely, FIG. 13 illustrates an example of a DL/UL switching configuration 1050 for NR-WiGig coexistence scenario using higher power and multiple reverse mini-slots transmission to back-off WiGig devices, in accordance with some embodiments. FIG. 14 illustrates an example of a beam coverage of forward and/or reverse links for interference scenario in NR-WiGig coexistence, in accordance with some embodiments. In the example of FIG. 14, AP DL transmission(s) may cause interference to a UE 1100 and/or UE UL transmission(s) may cause interference to an AP 1102. This may be due to the distance between the nodes.

For example, in FIG. 13, during a (e.g., initial) recursive process where a UL/DL link quality may be established, the reverse link may (e.g., only) start with, e.g., a single power controlled block (D length) transmission towards a gNB, as shown in FIG. 9. A UE may determine the presence of an interferer, for example, based on a measured SIR and/or it may decide to transmit a (e.g., single) D block at, e.g., the max Tx power allowable power. If, for example, the UE still receives interference, it may increase a number of D blocks 1052 in the reverse link at an (e.g., max) allowable power. This may continue until, for example, the UE utilizes M number of the D blocks 1052 (M may be predetermined based on QoS mapping for a useful forward link from the gNB to the UE and/or the UE to the gNB). If, for example, the UE still receives interference, it may still use the link with a (e.g., lower) MCS index selection, which may be suitable for a (e.g., measured) SIR.

In some embodiments, a transmission using higher power in the reverse direction, as described hereinabove, may be used for a NR-NR coexistence scenario as well.

In FIG. 14, the scheme for the reverse direction transmission (e.g., a transmission of the UE 1100) discussed herein in connection with FIG. 13, for instance, may be able to back-off the interfering node and/or mitigate interference. For example, the reverse transmission of the UE 1100 may be able to back-off the WiGig AP 1102.

The reverse direction transmission using higher power, as discussed, may be sent on a wider beam than the Rx beam on which the forward transmission is received. The wider beam may be centered along the same beam direction as the Rx beam on which the forward transmission is received. Alternatively, the reverse direction transmission may be sent on multiple adjacent beams around the Rx beam on which the forward transmission is received. If, for example, the direction of the interferer is known by the receiver, the reverse direction transmission may be sent only on the beams which are directed towards the interferer(s). The level of the transmit power and the number of D blocks on any beam may be decided by the same procedure described above.

In some embodiments, implementations relating to a paired LBT may be provided.

A directional LBT assessment may be done towards the direction of the receiving node (as in legacy LBT, or in WiGig), and/or its opposite direction(s). For example, this may avoid the interference situation illustrated in FIGS. 3A and/or 3B or 4A and/or 4B. If the transmitting node performs LBT aligned towards the receiving node direction "dir", LBT may be done in an (e.g., opposite) direction(s) dir+X°. The direction(s) may denote: a single direction (e.g., dir, dir+180°, the supplementary direction) and/or a set of directions (e.g., dir+180°, dir+160°, dir+200°). This may depend on whether the beam(s) for LBT may be reconfigurable and/or may be predefined (e.g., based on a set of previously configured beams). This may be referred to as "paired LBT". Paired LBT may involve LBT on "paired-directions," which may denote a direction towards the receiving node, an opposite direction(s), and/or a direction(s) towards anticipated interferer(s). For the paired LBT, a backoff and/or a contention window status may be maintained per paired-directions. This may, for example, reduce (e.g., by a factor 2) the memory that may be employed to keep track of the backoff processes per beam, as compared to per beam contention window.

In the example shown in FIGS. 3A and/or 3B, a transmitting node may be the gNB, and a receiving node may be the UE. If the gNB performs paired LBT (e.g. to assess the channel availability), the AP transmission may be detected at the gNB and/or the gNB transmission may be deferred. This may avoid the interference from the AP to the UE (as seen in FIGS. 3A and/or 3B), and/or may avoid the interference from gNB to the STA (as seen in FIG. 3B).

In the example shown in FIGS. 4A and/or 4B, the transmitting node may be a UE, and the receiving node may be a gNB. If the UE performs paired LBT (e.g., to assess the channel availability), the UE may detect the channel busy, which may be due to an AP transmission, and/or the UE transmission may be deferred. This may avoid interference from the AP to the gNB (as seen in FIGS. 4A and/or 4B), and may avoid the interference from the UE to the STA (as seen in FIG. 4B).

Paired LBT towards the direction of a receiving node and/or towards the opposite direction(s) may be done (e.g., simultaneously). This may occur when (e.g., every time) a transmitting node wants to transmit to a receiving node (e.g., by using multiple radiofrequency (RF) chains and/or a single RF chain with advanced sampling techniques). A (e.g., all) LBT energy detection (ED) stage(s) may sense the channel to be idle for a duration of a known period (e.g., at least DIFS plus a backoff time) to proceed with a data transmission.

Paired LBT may allow successful access to a medium under coexistence of a (e.g., different) RAT(s) with directional transmissions/receptions and/or may minimize the hidden node problem. Paired LBT may be used as the spectrum sharing technique within a (e.g., single) RAT (e.g. NR or WiGig), e.g., when coordination between nodes of a RAT may, e.g., not be possible. As an example, such coordination may not be possible if operators use, e.g., the same unlicensed band and decide not to coordinate respective networks.

In relation to paired LBT, e.g., as described herein, transmit and/or receive directional antenna patterns may described by one or more of the following parameters. The transmit directional antenna pattern may include: a mainlobe of gain $G_{Tx,m}$ with a beamwidth $\theta_{Tx}$ and/or a sidelobe of gain $G_{Tx,s}$ with a beamwidth $2\pi-\theta_{Tx}$. The receive directional antenna pattern may include: a mainlobe of gain $G_{Rx,m}$ with a beamwidth $\theta_{Rx}$ and/or a sidelobe of gain $G_{Rx,s}$ with a beamwidth $2\pi-\theta_{Rx}$.

Figure 15A:
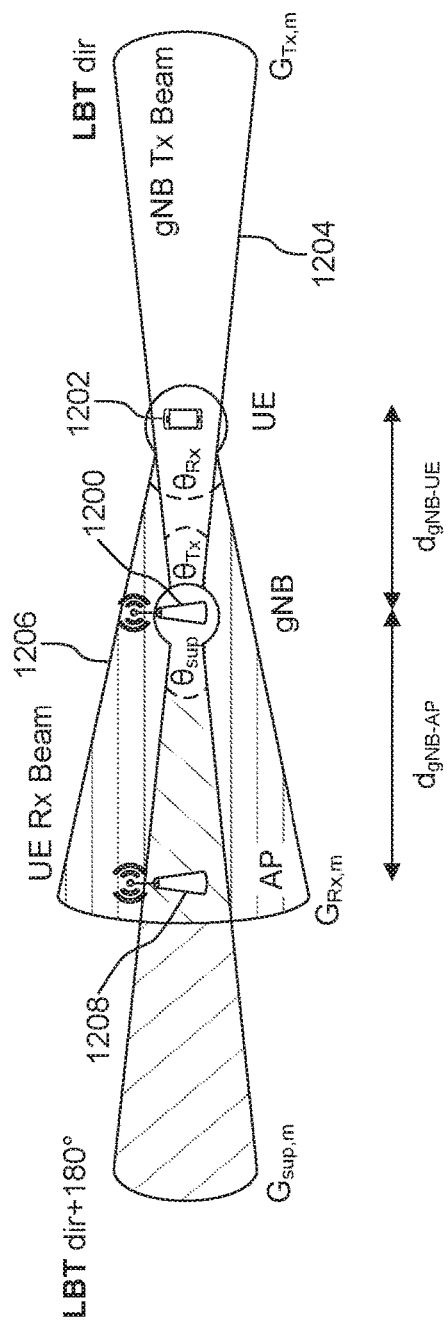
FIG. 15A illustrates an example of a paired listen-before-talk (LBT) in a single opposite direction, in accordance with some embodiments.
Figure 15B:
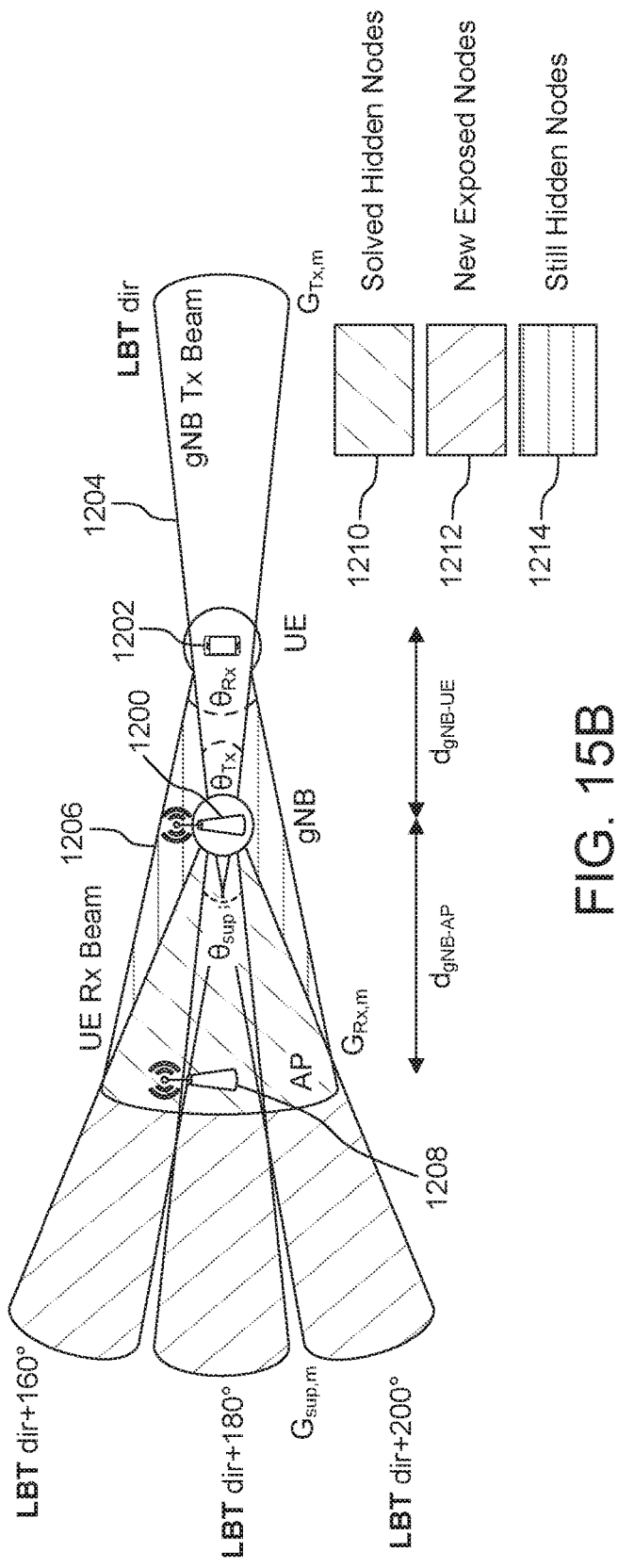
FIG. 15B illustrates an example of a paired LBT in multiple opposite directions, in accordance with some embodiments.

FIG. 15A illustrates an example of a paired LBT in a single opposite direction, in accordance with some embodiments. FIG. 15B illustrates an example of a paired LBT in multiple opposite directions, in accordance with some embodiments. Communication may be carried out between a transmitting node and/or a receiving node. FIGS. 15A and 15B illustrate a DL communication (where, e.g., a gNB 1200 may be the transmitting node and a UE 1202 may be the receiving node). However, in other embodiments, in FIGS. 15A and 15B, a communication may be carried out in a reverse direction (e.g., UL communication (UE to gNB)), by, for example, reverting gNB and UE positions.

FIGS. 15A and 15B illustrate situations assuming beam modelling. The transmitting node (the gNB 1200) may perform a LBT on a Tx beam direction (e.g., the beam that the transmitting node may use for data transmission towards the receiving node) aligned towards the receiving node direction "dir" and a beamwidth $\theta_{Tx}$ (LBT$_{dir}$). The transmitting node may (e.g., simultaneously) perform: a LBT in a single opposite direction (e.g., LBT$_{dir}$+1800) with a beam aligned towards an opposite direction dir+180°, mainlobe beamwidth $\theta_{sup}$, and/or a mainlobe gain $G_{sup,m}$ (as seen in FIG. 15A); and/or multiple LBT(s) in multiple opposite directions (e.g., LBT$_{dir+180°}$, LBT$_{dir+160°}$, LBT$_{dir+210°}$). The multiple LBT(s) may each have a beam aligned towards the opposite directions dir+X° (e.g., X=160°, 180°, 200°), a mainlobe beamwidth $\theta_{sup}$, and/or mainlobe gain $G_{sup,m}$ (as seen in FIG. 15B).

A beam used for LBT in the opposite direction(s) may have the shape of a Tx beam 1204 of the transmitting node (e.g., $\theta_{sup}=\theta_{Tx}$, as seen in FIGS. 15A and 15B) and/or a different pattern (as described in more detail below).

To illustrate hidden node(s), a Rx beam 1206 of the receiving node is illustrated in FIGS. 15A and 15B. An AP 1208 may be a hidden node for a legacy LBT if, for example, its transmission lies within a Rx antenna's boresight of a receiving node. Paired LBT procedure, e.g., as described herein, may mitigate a (e.g., some) hidden node problem(s) (as seen in a solved hidden nodes region 1210 in FIGS. 15a and 15B). AP(s) (e.g., all AP(s)) whose position may be within the solved hidden node region 1210 may be detected at the transmitting node (e.g., at the gNB 1200 for DL traffic) by a paired LBT. This may not be detected by anon-paired legacy LBT at the transmitting node (e.g., at the gNB 1200 for DL traffic). A region 1212 may be an exposed region where an exposed node problem may occur. A region 1214 in FIGS. 15A and 15B may show a remaining/still hidden node area, which may be smaller than a hidden node area of, e.g., a legacy LBT.

FIG. 15B includes a legend that may be used with reference to, e.g., FIGS. 15A, 15B, 16, 17A, and 17B.

In some embodiments, paired LBT in a direction of a receiving node and opposite direction(s) may be done with different beam patterns and/or different ED thresholds, e.g., to maximize the number of hidden node terminals detected. Multiple beams may be used for LBT in opposite direction(s), e.g., if the beam patterns may not be adjustable but predefined at a transmitting node. The adjustment of the beam pattern, the number of beams, and/or the ED threshold for LBT in opposite direction(s) may be done at the transmitting node. This may occur if information of a Rx beam of a Receiving node and/or system configuration is available. If, the information and/or system configuration is not available, adjustments may be dynamically based on feedback messages from the receiving node (e.g., HARQ feedback, and/or other messages related to interference and/or signal level reports).

Optimization of a beam ($\theta_{sup}$, $G_{sup,m}$) may be used at transmitting node for LBT in an opposite direction. A beam pattern (e.g. the mainlobe beamwidth and/or mainlobe gain) to be used at a transmitting node for LBT in opposite (e.g., supplementary paired) direction(s) may be set as a function of a system parameter(s) and/or report(s) from a Receiving node, e.g., when a single opposite direction may be used.

Figure 16:
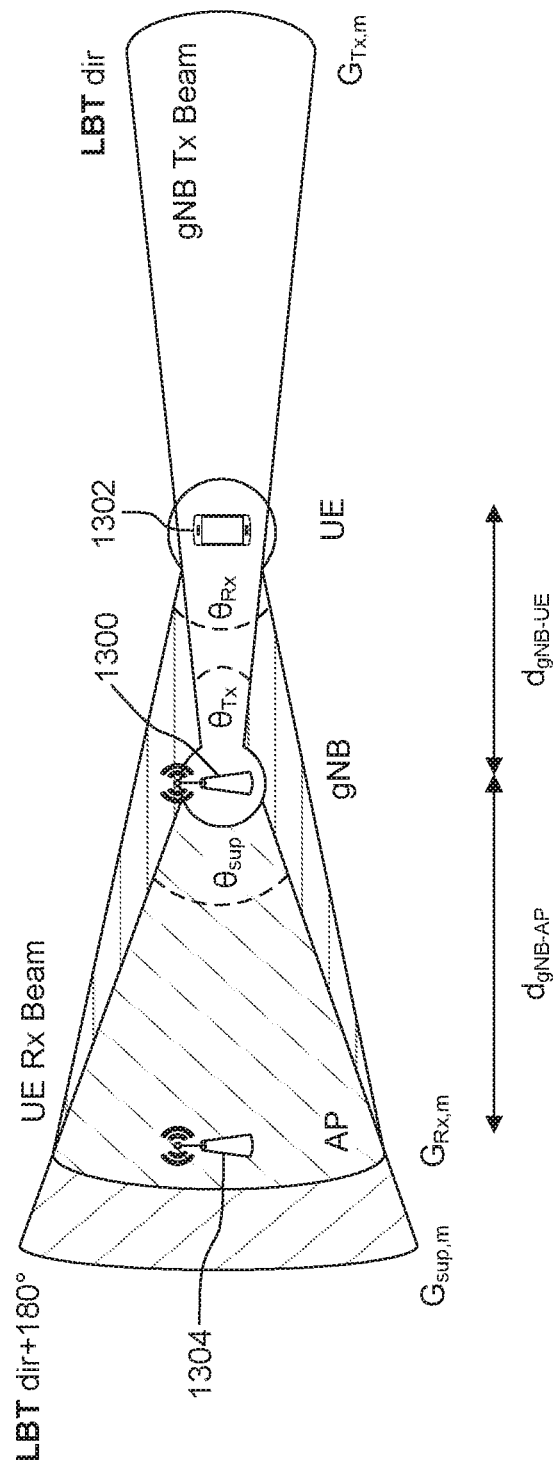
FIG. 16 illustrates an example of an effect of beam optimization used at a transmitting node for a LBT in a single opposite direction, in accordance with some embodiments.

FIG. 16 illustrates an example of an effect of beam optimization used at a transmitting node for a LBT in a single opposite direction, in accordance with some embodiments. In the example of FIG. 16, the single opposite direction may be a DL access direction, from a gNB 1300 towards a UE 1302. If a single opposite (e.g., supplementary paired) direction is used and/or the beam is configurable, the objective may be to maximize the number of solved hidden nodes while the number of exposed regions remains limited (as illustrated in FIG. 16). This may be achieved by using a larger mainlobe beamwidth than the one used for LBT in a receiving node direction and for data transmission (e.g., $\theta_{sup}>\theta_{Tx}$). This may occur if the Rx beamwidth of a receiving node is larger than the Tx beamwidth of the transmitting node ($\theta_{Rx}>\theta_{Tx}$). If the Rx beamwidth of a receiving node is not larger than the Tx beamwidth ($\theta_{Rx}<\theta_{Tx}$), this may be achieved by using a smaller mainlobe beamwidth than the one used for LBT in a receiving node direction and for data transmission (e.g., $\theta_{sup}<\theta_{Tx}$). The design (e.g., optimal design) may depend on the characteristics of the Rx beam of a receiving node ($\theta_{Rx}$, $G_{Rx,m}$), the transmitter-receiver distance, the propagation characteristics (e.g., the pathloss exponent and/or the carrier frequency), the noise power, and/or the product of a transmit power of an AP 1304 and AP mainlobe gain. To find the value (e.g., optimal value), the transmitting node may use a receiving node's antenna pattern characteristics (e.g. $\theta_{Rx}$, $G_{Rx,m}$) and/or the transmitter-receiver distance, which may be estimated based on measurement reports from the receiving node (e.g. as an outcome of the initial discovery procedure or continuing neighbor beam measurements).

If $\theta_{sup}$ is increased (e.g., increased excessively), then a new area of exposure to a transmitting node may appear above and/or below the Rx beam of the receiving node. The transmitting node may detect interferers that may normally not be detected. There may be a trade-off for the optimization of the beamwidth of the mainlobe ($\theta_{sup}$).

In some embodiments, a (e.g., optimal) value of the mainlobe beamwidth may be provided and will be described in more detail herein.

In some embodiments, a number of beams to be used at a transmitting node for a LBT in opposite directions may be determined, e.g., optimized.

A number of beams to be used at a transmitting node for LBT in opposite (e.g., supplementary paired) directions may be set as a function of system parameters and/or reports from the receiving node. This may occur if multiple opposite (e.g., supplementary paired) directions are used (e.g., when the set of beams at a transmitter is predefined and may not be dynamically modified). An example of this is illustrated in FIG. 15B. As seen in FIG. 15B, (wherein three beams are shown as an example), the number of beams for LBT in opposite (e.g., supplementary paired) directions may be set, to maximize the number of solved hidden nodes while the number of exposed nodes remains limited.

The parameters (e.g., the same parameters) of the techniques discussed herein (optimization of the beam parameters) may be used to find the optimal number of beams to be used for LBT in opposite directions.

In some embodiments, a determination (e.g., optimization) of an ED threshold to be used at a transmitting node for a LBT in the opposite direction(s) may be provided.

An ED threshold used at a transmitting node for LBT in opposite direction(s) may be set as a function of the system parameters and/or reports from the receiving node (e.g., HARQ feedback and/or other messages). The ED threshold may be adjusted as a function of the parameters and/or measurement reports from the receiving node. The ED threshold may be adjusted for a paired LBT with a single opposite direction, and for a paired LBT with multiple opposite directions.

Optimizations may minimize the number of exposed nodes, while the region of avoided hidden nodes may be maintained. The ED threshold may be selected such that the (e.g., only the) interfering APs, lying in the Rx beam region of the receiving node, are detected. In FIGS. 15A and 15B, increasing an ED threshold may avoid exposed nodes in the new exposed nodes region 1212.

FIGS. 17A and 17B illustrate examples of an effect of increasing an ED threshold for a LBT in opposite direction(s). FIG. 17A illustrates an example of an effect of increasing an ED threshold for a LBT in a single opposite direction with an optimized beam shape, in accordance with some embodiments. FIG. 17B illustrates an example of an effect of increasing an ED threshold for a LBT in multiple opposite directions with predefined beams, in accordance with some embodiments.

A (e.g., optimal) result is depicted in FIGS. 17A and 17B for the case of performing: (a) a single LBT in opposite (e.g., supplementary paired) direction (e.g., 180°, see FIG. 17A), or (b) multiple LBTs in multiple opposite (e.g., supplementary paired) directions (e.g., 160°, 180°, 200°, see FIG. 17B).

Referring to FIGS. 17A and 17B, an ED threshold design (e.g., optimal ED threshold design) may depend on characteristics of a Rx beam (e.g., $\theta_{Rx}$, $G_{Rx,m}$) of a receiving node (e.g., a UE 1400), a transmitter-receiver distance, propagation characteristic(s) (e.g., a path loss exponent and/or carrier frequency), noise power, and/or the product of a transmit power of an AP 1402 and a mainlobe gain of the AP 1402. Assume, for example, that $TH_{leg}$ denotes an ED threshold of a LBT in a receiving node direction (which may be −72 dBm in LTE-LAA for a bandwidth of 20 MHz), and that $TH_{sup}$ denotes an ED threshold of the opposite (e.g., supplementary paired) direction(s) (e.g., $LBT_{dir+180}$). For example, the farther the receiving node is from a transmitting node (e.g., as the transmitter-receiver distance increases) the more $TH_{sup}$ may be increased. The (e.g., optimal) value for $TH_{sup}$ may be obtained when a positive detection region of the LBT in opposite direction(s) (e.g., $LBT_{dir+180}$) overlaps with a solved node region 1404 (as seen in FIGS. 17A and 17B). In general, in some embodiments, a positive detection region refers to a region in which a signal level is high enough such that a detection may, e.g., be guaranteed. An analytical expression for the $TH_{sup}$ will be described in more detail below.

In one example, an ED threshold for a LBT in opposite direction(s) may be configured to be larger than the one used for a LBT in a receiving node direction (e.g., $TH_{sup} > TH_{leg}$). This may occur if the receiving node's information is not available at a transmitting node.

Figure 18:
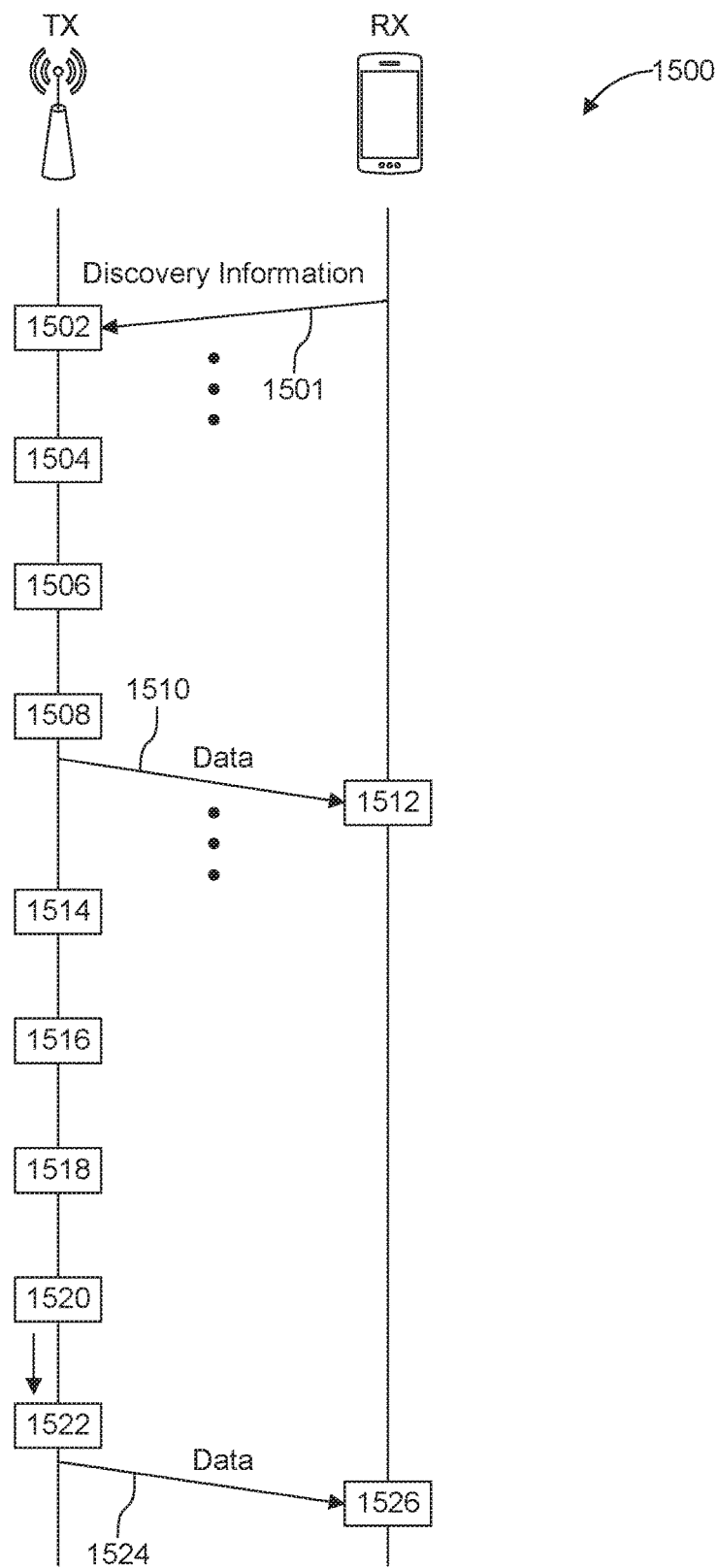
FIG. 18 is an example flow diagram for adjusting parameters associated with a LBT in opposite direction(s), in accordance with some embodiments.

FIG. 18 is an example flow diagram 1500 for adjusting parameters associated with a LBT in opposite direction(s), in accordance with some embodiments. The flow diagram 1500 illustrated in FIG. 18, may apply in the case in which parameters for a LBT in opposite direction(s) are adjusted (e.g., optimally adjusted) based on information from a receiving node and/or system configuration. In this case, discovery information may include, e.g., characteristics of an Rx beam of the receiving node.

Referring to FIG. 18, in some embodiments, once a connection is established between a transmitting node (denoted as "TX") and a receiving node (denoted as "RX"), at 1501, discovery information may be sent from the receiving to the transmitting node. The discovery information may include parameters that are established during a discovery procedure or based on continuing neighboring measurements. The parameters may include, e.g., a mainlobe beamwidth and mainlobe gain of an Rx beam of the receiving node. Upon receipt at the transmitting node, at 1502, the transmitting node may adjust parameters for a LBT in opposite direction(s) when, for example, it receives from the receiving node a discovery procedure related measurements or measurements based on continuing neighboring measurements, an estimated transmitter-receiver distance, and a knowledge of the system configuration (e.g., noise power, propagation characteristics, and/or the like). The LBT parameter adjustment may include adjustment of a beam pattern and/or a number of beams and/or an ED threshold for the opposite direction(s). The adjustment may be performed per receiving node, and may be used for, e.g., all LBT associated with transmissions towards, e.g., a specific receiving node, such as the RX receiving node as in FIG. 18. The transmitting node may use different parameter settings for the LBT in the opposite direction for different receiving nodes.

When, at 1504, data is available for transmission at the transmitting node, at 1506, the transmitting node may perform the LBT in paired directions, such as in a direction of the receiving node and opposite direction(s), with the adjustment of LBT in the opposite (e.g., supplementary paired) direction(s)). If, at 1508, the LBT in the paired directions indicates that a channel is clear, the transmitting node may proceed, at 1510, with data transmission towards the receiving node. At 1512, the receiving node may receive the transmitted data and decode it. When, at 1514, data is again available for transmission at the transmitting node, at 1516, the transmitting node may repeat the LBT procedure carried out at 1506 prior to data transmission to determine if the channel is clear. If, at 1518, the LBT in the paired directions indicates that the channel is busy, at 1520, the transmitting node may defer the data transmission and wait for a DIFS plus backoff time before the next channel access attempt. Subsequently, the transmitting node may attempt to access the channel again and when, at 1522, the LBT in the paired directions indicates that the channel is clear, the transmitting node may proceed with the data transmission at 1524. At 1526, the receiving node may receive the transmitted data and decode it.

In some embodiments, parameters of a paired LBT (e.g., an ED threshold, a beam pattern, and/or a number of beams to be used for a LBT in opposite (e.g., supplementary paired) direction(s)) may be dynamically adapted based on a receiver feedback. For example, the parameters may be dynamically updated when Rx beam information of a receiving node and/or a transmitter-receiver distance are not known at a transmitting node.

In an example, the adaptation of the LBT parameters for the opposite (e.g., supplementary paired) direction may be done based on the HARQ feedback from a receiving node. In this case, for example, adaptation may be based on statistics for the number of HARQ NACKs received. The transmitting node may determine that the receiver node is in an interference-limited scenario and it may: increase the mainlobe beamwidth ($\theta_{sup}$) in the opposite (e.g., supplementary paired) direction; use more beams for LBT in opposite direction(s); and/or decrease the ED threshold ($TH_{sup}$) for LBT in opposite direction(s), for example to increase the region of detected hidden nodes.

This may improve the transmitter-receiver link performance, e.g., by reducing the interference-limited situations and the backoff time.

Signals and/or measurement reports from a receiving node may be used by a transmitter node to adapt the LBT parameters for the opposite (e.g., supplementary paired) direction. This may include, but are not limited to: a reference signal received power (RSRP), a reference signal received quality (RSRQ), channel state information (CSI), interference measurement (IM), reference signals (CRS, DM-RS) and/or the like.

Figure 19:
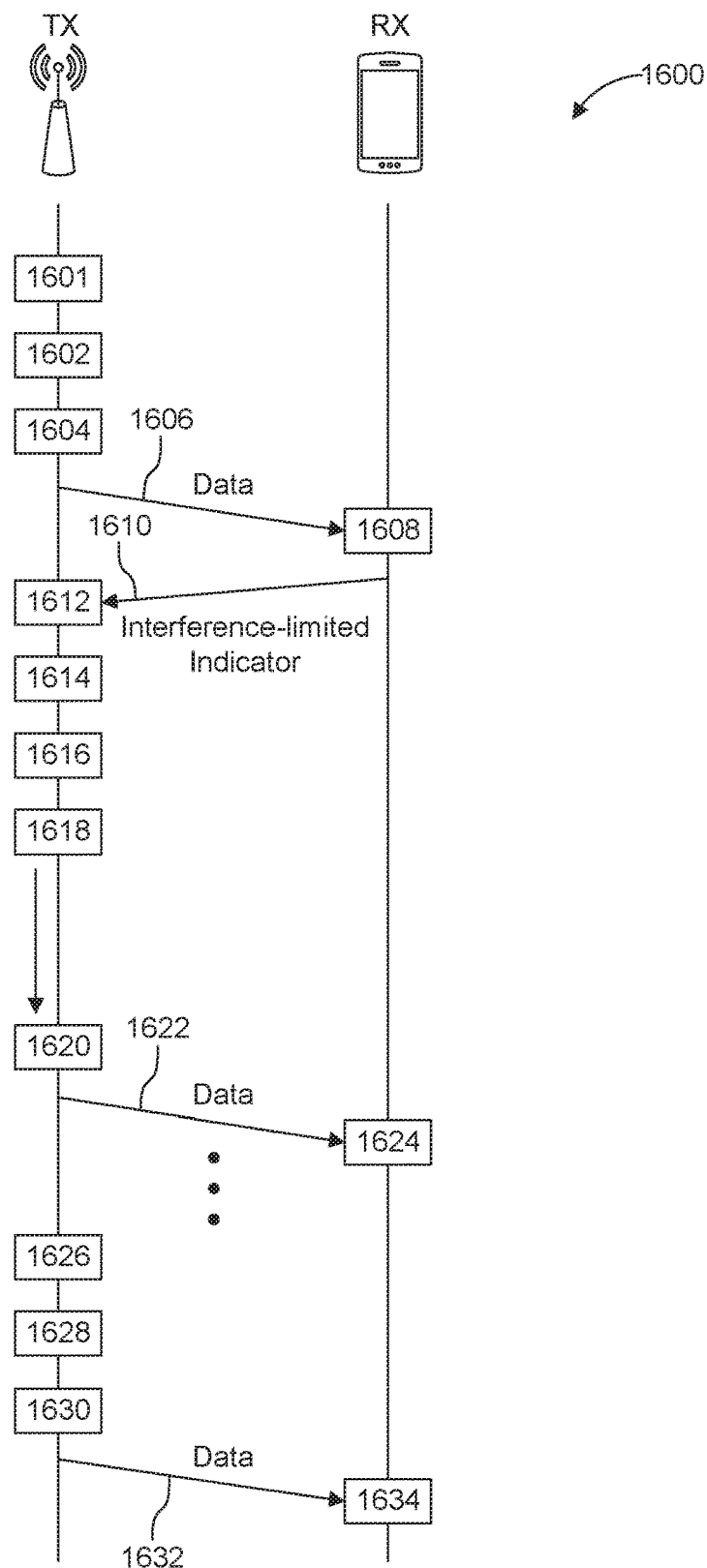
FIG. 19 is an example flow diagram for dynamically adjusting parameters for a LBT in opposite direction(s), in accordance with some embodiments.

FIG. 19 is an example flow diagram 1600 for dynamically adjusting parameters for a LBT in opposite direction(s), in accordance with some embodiments. In the example of FIG. 19, the parameters may be dynamically adjusted based on reports from a receiving node that may indicate an interference-limited situation. For instance, as shown in FIG. 19, an indicator of interference-limited situation (e.g. NACK message) may be used. In general, in some embodiments, different messages indicative of interference-limited situation may be used by a receiving node (denoted as "RX"), including: a NACK message that may indicate an interference-limited situation, an explicit message that may indicate interference-limited situation, and/or, e.g., any other useful message that allows a transmitting node (denoted as "TX") to determine that decoding may have been unsuccessful due to interference (e.g., a RSRP, a RSRQ, a CSI, IM reports, and/or the like).

Referring to FIG. 19, when, at 1601, data is available for transmission at the transmitting node, at 1602, the transmitting node may perform a LBT in paired directions, such as in a direction of the receiving node and opposite direction(s). If, at 1604, the LBT in the paired directions indicates that a channel is clear, at 1606, the transmitting node may proceed with the data transmission towards the receiving node. If, at 1608, the receiving node determines that a decoding is unsuccessful because interference is received, at 1610, the receiving node may send, for example, a message (denoted as "interference-limited indicator") indicating the interference (e.g., NACK message). The transmitting node, at 1612, on reception of the message related to an interference-limited situation or on a determination of an interference-limited situation based on signal-quality messages from the receiving node, may adjust the parameters for the LBT in the opposite direction(s). The adjustment of parameters may include: increasing a beam pattern, increasing a number of beams, and/or reducing an ED threshold. The adjustment may be updated in real time, dynamically, based on reports from the receiving node, and may be used for a LBT associated with a subsequent transmission.

As further shown in FIG. 19, given the interference, at 1614, the transmitting node may attempt the next LBT in the paired directions (the LBT with the adjustment performed at 1612). At 1616, the result of the LBT in the paired directions may indicate that the channel is busy. As such, at 1618, the transmitting node may defer the data transmission and wait for a DIFS plus backoff time before the next channel access attempt. At 1620, the transmitting node may attempt to access the channel again (by performing the LBT) and sense the channel as being clear. At 1622, the transmitting node may proceed with the data transmission. At 1624, the receiving node may receive the transmitted data and decode it. When, at 1626, data is again available for transmission at the transmitting node, the transmitting node may again, at 1628, perform the LBT with the adjusted parameters prior to data transmission to determine if the channel is clear. If, at 1630, the adjusted LBT in the paired directions indicates that the channel is clear, at 1632, the transmitting node may proceed with the data transmission. At 1634, the receiving node may receive the transmitted data and decode it.

As noted above, an "interference-limited indicator" message may be a NACK, any other message that may be related to an interference-limited situation experienced at the receiving node, or any other message that may allow a transmitting node to determine that an interference-limited situation occurred.

In some embodiments, a transmitting node may use information (e.g., sensed power/energy) captured during a LBT in opposite (e.g., supplementary paired) direction(s), such as, for example, to optimize a transmit/receive strategy. For example, the transmitting node may use a multi-threshold ED procedure for a LBT in opposite direction(s), perform an adaptive MCS selection, and/or implement a power control mechanism that may be adjusted as a function of the sensed power during LBT in opposite (e.g., supplementary paired) direction(s).

The power sensed during LBT in opposite (e.g., supplementary paired) direction(s) may be used to adjust the transmit/receive strategies. The strategy adjustments may include: adopting a multi-level ED threshold procedure for LBT in opposite direction(s) such that, e.g., only transmission towards a receiving node may be allowed, but not the transmissions from the receiving node towards the transmitting node (reverse direction); choosing the modulation and coding scheme (MCS) at a transmitting node per the sensed power during LBT in opposite/supplementary direction(s); and/or adjusting the power control at a transmitting node based on the sensed power during LBT in opposite direction(s).

A transmitting node may use a two-threshold ED procedure for LBT in opposite direction(s) where the two ED thresholds are $TH_1$ and $TH_2$, where $TH_1 > TH_2$. If the power detected in the LBT in opposite (e.g., supplementary paired) direction(s) exceeds $TH_1$, then transmission of Transmitting node may be deferred. If the power detected in the LBT in opposite (e.g., supplementary paired) direction(s) exceeds $TH_2$ but not $TH_1$, then transmission of the transmitting node may be allowed but transmissions from the receiving node (reverse direction) may not be allowed.

The two-threshold ED procedure for LBT in opposite direction(s) may be used to allow (e.g., still allow) transmissions from the transmitting node to the receiving node while the reverse link transmissions may not be allowed. This may be due to a perceived opposite direction interference measurement. For example, in a double threshold scheme, if a measured interference level is above the higher threshold for the opposite direction, the target receiving node may not be allowed to send uplink traffic. A receiving node may be allowed to receive data at a low transmission rate (it may have a low signal-to-interference-plus-noise ratio (SINR) due to the received interference from the interfering node in opposite direction). Transmission from the receiving node to the transmitting node (reverse direction) may be prevented, except, for example, to send an ACK/NACK. This may avoid interference generation onto the AP and/or the STA. An ED threshold may indicate the power control for a transmission from the receiving node towards the transmitting node.

A transmitting node may implement an adaptive MCS selection that may depend on the power level sensed in the LBT ED towards the opposite direction(s). For example, if LBT in opposite direction(s) denotes a channel as busy, then, even if channel conditions in transmitter-receiver link are favorable, the transmitting node may transmit at a lower MCS that may be adapted based on the sensed power at LBT in opposite (i.e. supplementary paired) direction(s). This may be performed in a way such that decoding may be possible at a receiving node, even if the receiving node is interfered. Transmission from the transmitting node may be allowed since the transmitting node may not interfering the AP/STA.

A transmitting node may use the sensed power level in LBT in opposite direction(s) to adjust the transmitted power (e.g., power control). If LBT in opposite direction(s) denotes the channel as busy, then the transmitting node knows that there may be interference at the receiving node, and the transmitted power of the transmitting node may be increased (e.g., if feasible).

Figure 20:
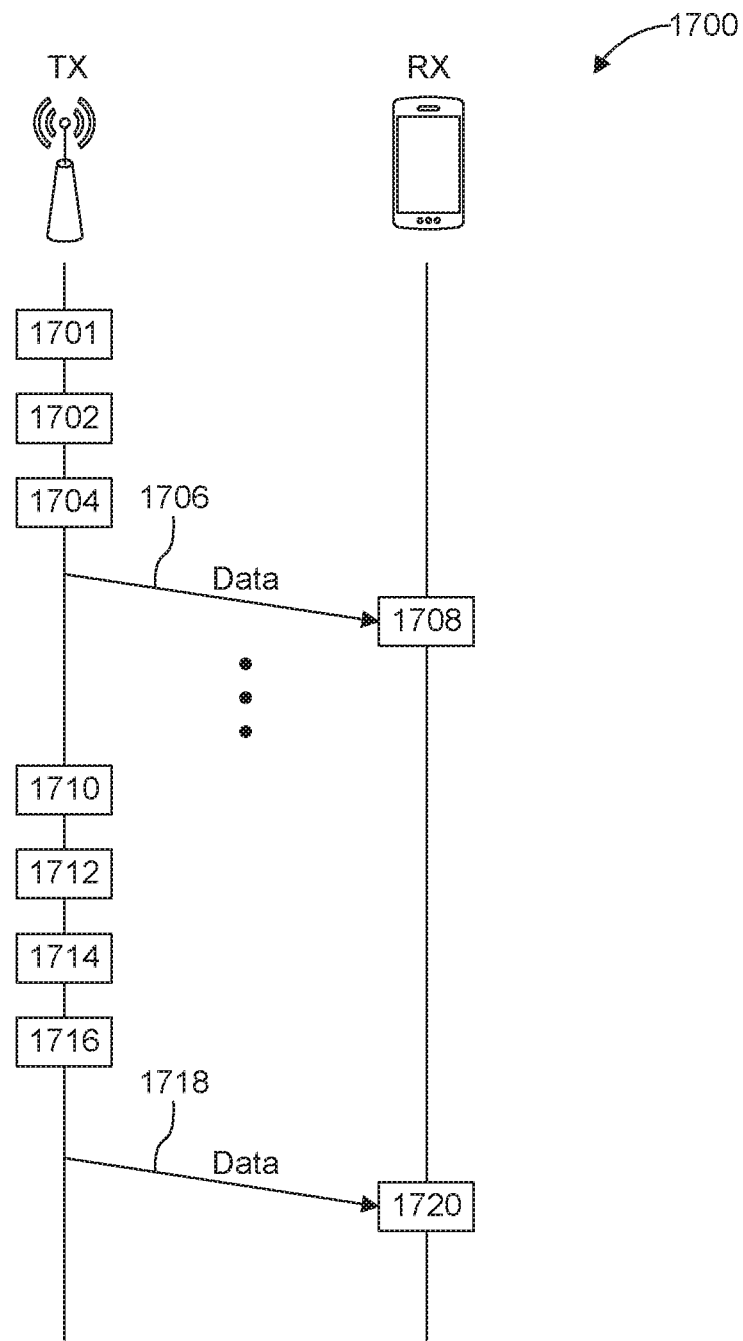
FIG. 20 is an example flow diagram for adjusting a transmit strategy based on a LBT in opposite direction(s), in accordance with some embodiments.

FIG. 20 is an example flow diagram 1700 for adjusting a transmit strategy based on a LBT in opposite direction(s), in accordance with some embodiments. FIG. 20 illustrates features associated with the case in which, after a channel is sensed to be busy with a LBT in opposite direction(s), a transmit strategy at a transmitting node is adjusted based on a power/energy that has been sensed during the LBT in the opposite direction(s). In some embodiments, the transmitting node may adjust a MCS or a transmitted power accordingly, which may allow a successful decoding at a receiving node.

Referring to FIG. 20, at 1701, when data is available for transmission at the transmitting node, at 1702, the transmitting node may perform a LBT in paired directions, such as in a direction of the receiving node and opposite direction(s). If, at 1704, the LBT in the paired directions indicates that a channel is clear, the transmitting node may proceed, at 1706, with data transmission towards the receiving node. At 1708, the receiving node may receive the transmitted data and decode it. When, at 1710, data is again available for transmission at the transmitting node, at 1712, the transmitting node may again perform the LBT in the paired directions, and as a result, determine, at 1714, that the channel is busy.

At 1716, the transmitting node may adjust a transmit strategy (e.g., adjust a MSC and/or transmit power) based on the sensed power in the opposite directions(s). Subsequently, at 1718, the transmitting node may proceed with the data transmission. At 1720, the receiving node may receive the transmitted data and decode it.

In some embodiments, the techniques described herein may be combined. For example, adaptive MCS may be combined with a multi-threshold ED procedure. The ED thresholds may be, $TH_1 > TH_2 > TH_3$. If the power detected in the LBT in opposite direction(s) exceeds $TH_1$, then the transmission of a transmitting node may be deferred. If the power detected in the LBT in opposite direction(s) exceeds $TH_2$ but not $TH_1$, then transmission of transmitting node may be allowed with an adapted MCS, according to the sensed energy. Transmissions from the receiving node may not be allowed. If the power detected in the LBT in opposite direction(s) exceeds $TH_3$ but not $TH_2$, then transmission of transmitting node may be allowed with an adapted MCS, according to the sensed energy. Transmissions from the Receiving node may be allowed with mandatory power control. If interference in an opposite direction to the intended LBT direction becomes higher than a (e.g., highest) threshold, the receiving node, in reverse direction, may be allowed to send an ACK/NACK messages since the duration of these messages may not be significant and may cause minimal impact to the interfering nodes. In this case, regular reverse link transmissions may not be allowed.

DL/UL MCS selection may be adapted to the measured interference and/or expected impact at the receiving nodes, e.g., as described herein. The information exchanged between transmitting and receiving nodes may be fulfilled via short messaging or a-priori established defaults, which may be known to the transmitting node and the receiving node.

ED thresholds may be determined using one or more of the following. TH1 may determine the lowest measurable power level. This level may be set as the CCA threshold level as defined in the WiGig domain or based on the receiver's sensitivity. The highest threshold may be set as the high threshold in WiGig domain when WiGig devices measure interference from non-WiGig waveforms. If a CCA indicates a channel is busy, then the WiGig devices may back off transmission of their packets. The highest threshold level may be mapped to the minimum perceived SIR at the target (receiving) node. For example, in FIG. 17A, a gNB measures the AP's power level and predicts the corresponding highest interference level at the UE, which may be caused by the AP's packet transmission in a forward direction. Interference may be limited at the UE, and the SIR at the UE may be minimal. The highest threshold may be defined as a threshold that maps to a (e.g., minimum) MCS index selection, which may be referenced to the predicted SIR at the UE that may allow sustainable DL traffic from gNB to UE. It may be expected that the SIR at the UE may (e.g., always) be positive due to the distance between the interferer (e.g., AP) and the transmitting node (e.g., gNB) as depicted in FIG. 17A. Interim thresholds may be set to reflect a MCS selections based on a (e.g., estimated) SIR variation at the target receiving nodes.

Figure 21:
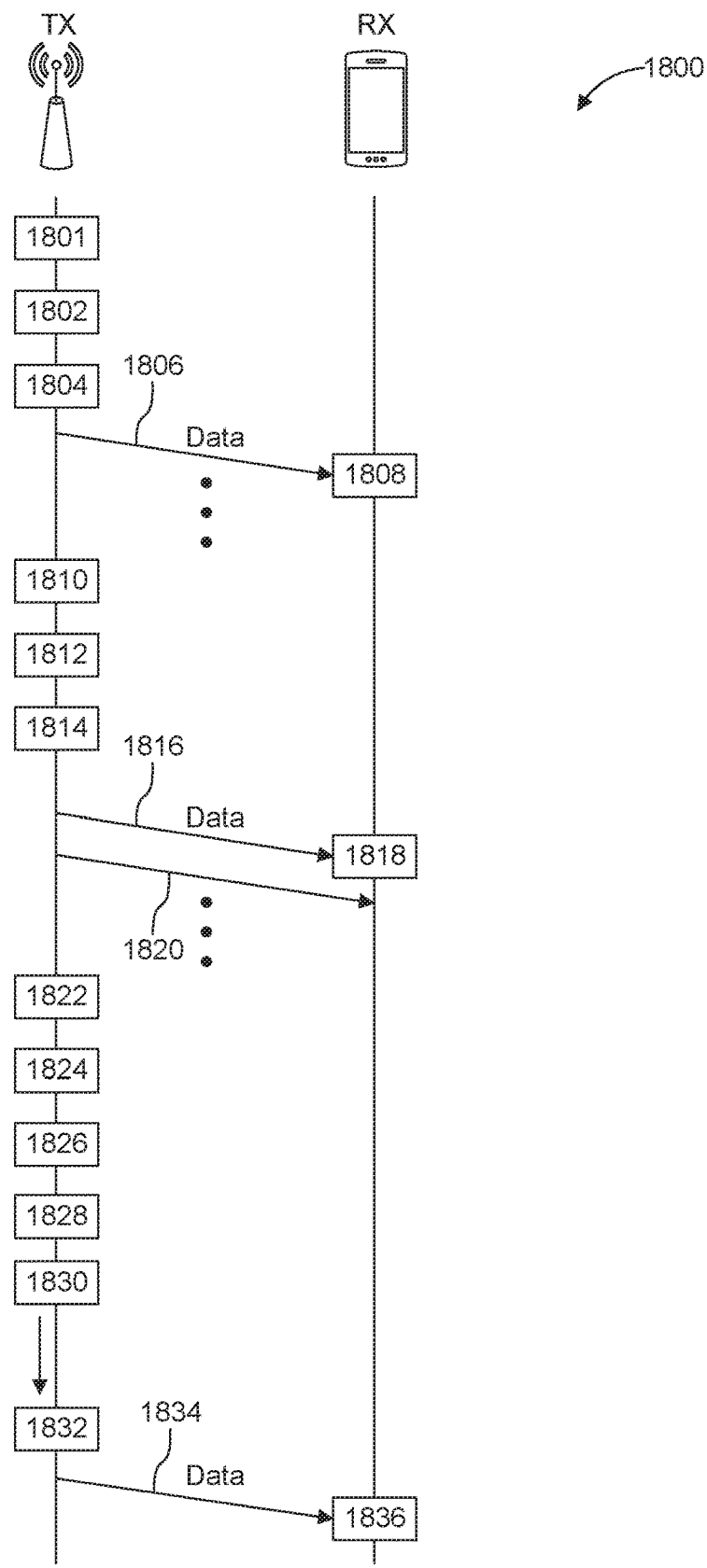
FIG. 21 is an example flow diagram associated with a multi-ED threshold implementation, in accordance with some embodiments.

FIG. 21 is an example flow diagram 1800 associated with a multi-ED threshold implementation, in accordance with some embodiments. FIG. 21 illustrates a two-ED threshold procedure, in which transmitter-to-receiver and receiver-to-transmitter transmission permission/prohibition may be determined based on a sensed power during a LBT in opposite (e.g., supplementary paired) direction(s) and their relation to two predefined ED thresholds. FIG. 21 illustrates features associated with the multi-ED threshold implementation, in which a transmission from a transmitting node to a receiver may be allowed but a transmission from the receiver to the transmitting node may be not be allowed, which may be based on a sensed power during LBT in opposite direction(s). In a multi-ED threshold procedure, signaling may be used to indicate when transmission in the reverse direction (receiver-to-transmitter) may not be allowed.

Referring to FIG. 21, at 1801, when data is available for transmission at the transmitting node, at 1802, the transmitting node may perform a LBT in paired directions, such as in a direction of the receiving node and opposite direction(s). If, at 1804, based on the performed LBT, the transmitting node senses that power in the opposite direction(s) is lower than an ED threshold 2 (referred to hereinafter as "ED $TH_2$"), the transmitting node may proceed, at 1806, with data transmission towards the receiving node. At 1808, the receiving node may receive the transmitted data and decode it. When, at 1810, data is again available for transmission at the transmitting node, at 1812, the transmitting node may again perform the LBT in the paired directions, and sense, at 1814, that power in the opposite directions(s) exceeds the ED $TH_2$ but does not exceed an ED threshold 1 (referred to hereinafter as "ED $TH_1$"). At 1816, the transmitting node may proceed with data transmission, and at 1818, the receiving node may receive the transmitted data and decode it. Thereafter or substantially concurrently with the data transmission, at 1820, the transmitting node may transmit to the receiving node an indicator that a transmission from the receiving node to the transmitting node (RX to TX) may not be allowed.

At 1822, when data is again available for transmission at the transmitting node, at 1824, the transmitting node may repeat the LBT in the paired directions, and, at 1826, sense that that power in the opposite directions(s) exceeds the ED $TH_1$. As a result, at 1828, the transmitting node may defer the data transmission and wait for a DIFS plus backoff time before the next channel access attempt. At 1830, the transmitting node may perform another LBT in the paired directions and, at 1832, sense that that power in the opposite directions(s) is now lower than the ED $TH_2$. Accordingly, at 1834, the transmitting node may proceed with the data transmission. At 1836, the receiving node may receive the transmitted data and decode it.

In accordance with some embodiments, ED threshold adjustments may be based on an angle of arrival (AoA) of an interfering signal. A transmitting node may set an ED threshold for a LBT in an opposite direction as a function of the AoA of the interfering signal, for example when the transmitting node is a UE, a receiving node is a gNB, and when the LBT beamwidth in the opposite direction may not be reduced to match the gNB beamwidth (e.g., due to hardware limitations at the UE).

Figure 22:
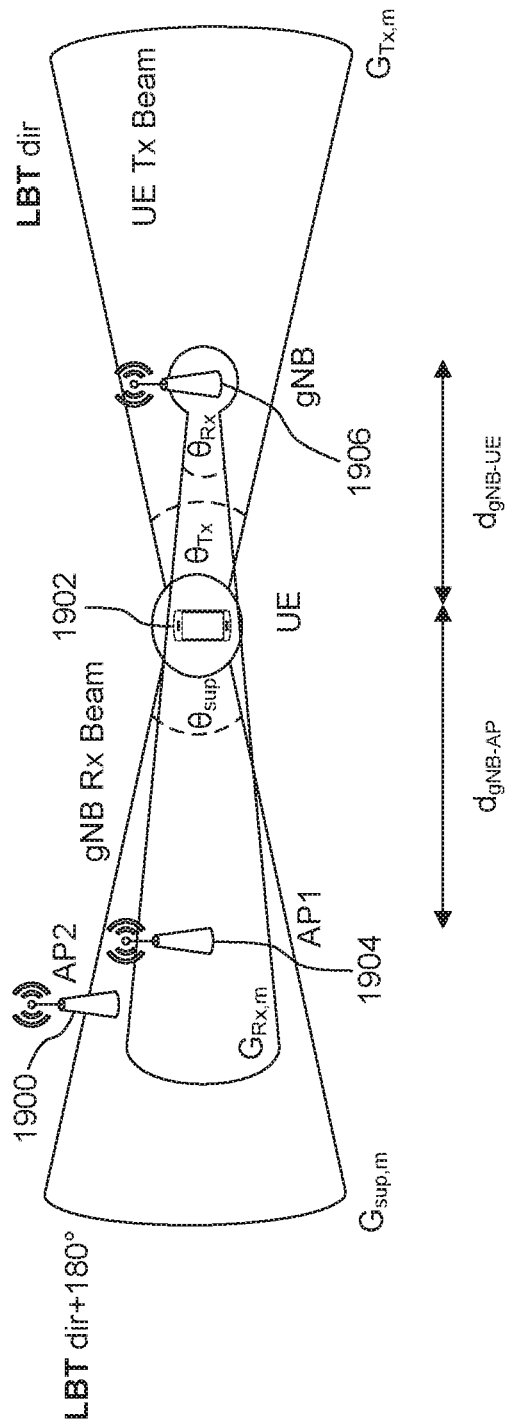
FIG. 22 illustrates an example of a usage of angle-of-arrival estimation and varying an ED threshold for a LBT in an opposite direction, in accordance with some embodiments.

FIG. 22 illustrates an example of a usage of angle-of-arrival estimation and varying an ED threshold for a LBT in an opposite direction, in accordance with some embodiments. For example, in FIG. 22, a signal from an AP 1900 (also denoted as "AP2") arrives at a UE 1902 with an AoA (AoA2) that may be different from an AoA for a signal from an AP 1904 (also denoted as "AP1") (AoA1). The AP 1904 may lie within an Rx beam boresight of a gNB 1906, while the AP 1900 may not. In this situation, an ED threshold for a signal arriving from the AoA2 may be larger than an ED threshold for a signal arriving from the AoA1. The paired LBT at the UE 1902 may prevent transmission under the presence of the AP 1904 but may not under the presence of the AP 1900.

In some embodiments, a LBT may receive assistance from a receiving node. The receiving node may assist a transmitting node to determine if transmission is allowed or not, for example, if the transmitting node does not have a capability to perform simultaneous LBT in the receiving node direction and one or more opposite (e.g., supplementary paired) direction(s). For example, if the transmitting node is a UE and the receiving node is a gNB (such as in the configuration shown in FIG. 22), the UE may not be able to perform multi-directional simultaneous LBT and the gNB may aid the UE.

In accordance with some embodiments, a receiving node (e.g., a gNB) may perform a LBT in a direction of a transmitting node (e.g., a UE), and the transmitting node (the UE) may perform LBT in a direction of the receiving node (the gNB). The gNB may cover a carrier sense in the opposite direction, and the coordination may comprise both nodes (e.g., the gNB and UE) to sense a channel to be idle in order to allow proceeding with data transmission from the UE to the gNB.

Figure 23:
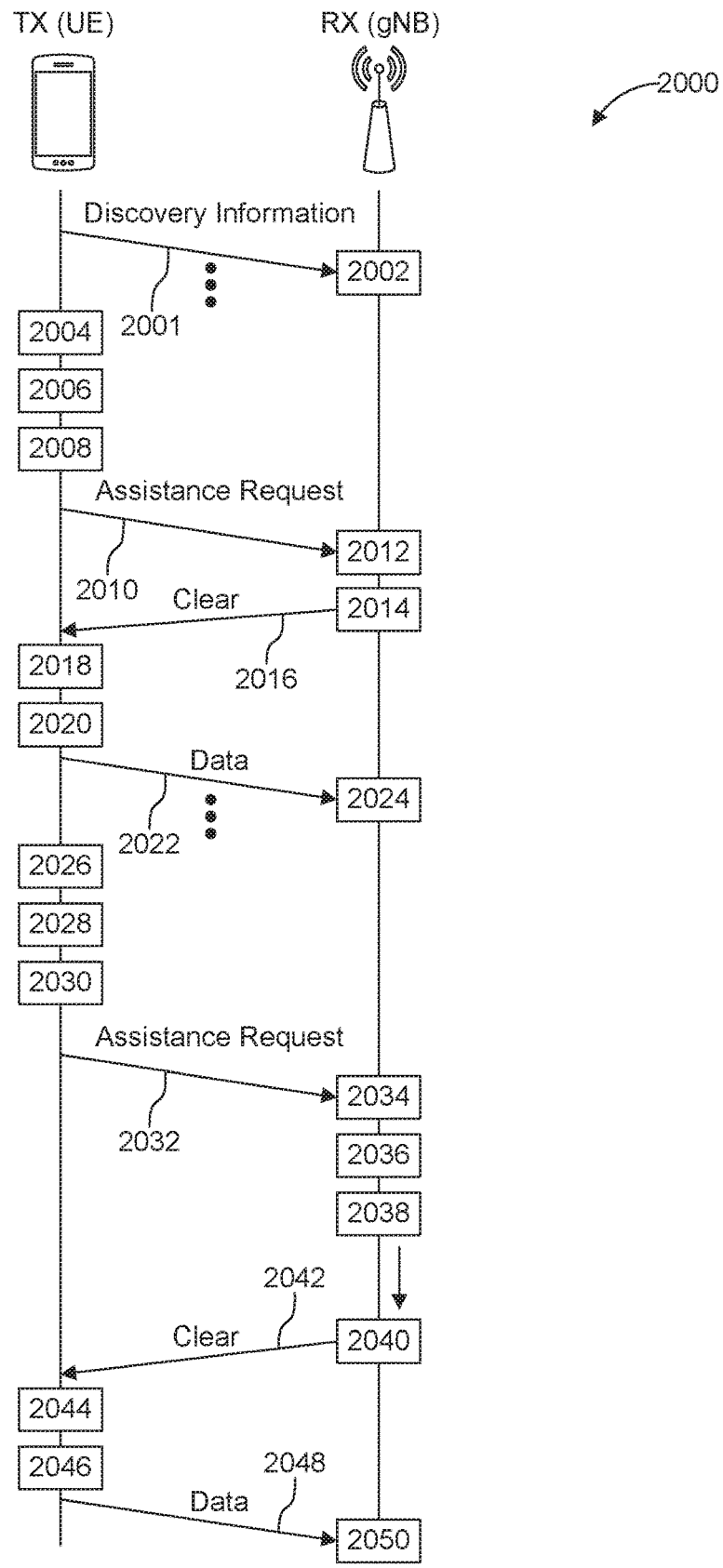
FIG. 23 is an example flow diagram illustrating a LBT assistance from a receiving node, in accordance with some embodiments.

FIG. 23 is an example flow diagram 2000 illustrating a LBT assistance from a receiving node, in accordance with some embodiments. FIG. 23 illustrates features, whereby a receiving node (a gNB) may provide LBT assistance to a transmitting node (a UE).

In FIG. 23, the UE, after sensing a clear channel towards the gNB direction, may request gNB assistance. More specifically, at 2001, the UE may transmit discovery information to the gNB. The discovery information may include an indication of whether or not the UE is capable of performing a simultaneous multi-directional LBT. If the UE is not capable of performing the simultaneous multi-directional LBT, at 2002, an assistance from the gNB is activated (at the gNB). When data is available for transmission at the UE, at 2004, the UE may perform, at 2006, a LBT in a direction of the receiving node (in a direction of the gNB). If, at 2008, the LBT in the receive (RX) direction indicates that a channel is clear, at 2010, the UE transmits an assistance request to the gNB. The assistance request may be in the form of any suitable message indicative of a request for LBT assistance from the receiving node. Upon receipt of the assistance request from the UE, at 2012, the gNB may implement a LBT in a direction of the transmitting node (in a direction of the UE), which may cover opposite direction(s) of the transmitting node (the UE). If, at 2014, the gNB finds the channel clear in the transmit (TX) direction, at 2016, the gNB may send to the UE an indication of the clear channel in that direction (e.g., using any suitable message). At 2018, the UE may repeat the LBT in the RX direction, and if, at 2020, the UE senses the channel to be clear, the UE proceeds with data transmission at 2022. At 2024, the gNB may receive the transmitted data and decode it.

When, at 2026, data is again available for transmission at the UE, at 2028, the UE may perform another LBT in the RX direction. If, at 2030, the LBT in the RX direction indicates that the channel is clear, at 2032, the UE transmits another assistance request to the gNB. In response, at 2034, the gNB performs another LBT in the TX direction to cover the opposite direction(s) of the UE. If, at 2036, the LBT in the TX direction indicates that the channel is busy, at 2038, the gNB may defer any transmission to the UE and wait for a DIFS plus backoff time before the next channel access attempt. Once, at 2040, the LBT in the TX direction indicates that the channel is clear, at 2042, the gNB may proceed to send to the UE an indication of the clear channel in that direction. At 2044, the UE may repeat the LBT in the RX direction, and if as a result, at 2046, the UE senses the channel to be clear, the UE proceeds with data transmission at 2048. At 2050, the gNB may receive the transmitted data and decode it.

In some embodiments, features associated with optimization of a transmitting node's parameters for a LBT in opposite direction(s) may be provided.

More specifically, in some embodiments, features may be provided to optimize parameters of a transmitting node for a proposed paired LBT, in case a single beam is used in a single opposite direction, e.g. dir+180°. The following example is described for a DL communication, gNB (transmitting node) to UE (receiver), but may be applicable to an UL communication as well. The gNB beam parameters for LBT in opposite direction may be optimized trying to maximize the number of solved hidden nodes while avoiding excess of exposed nodes. The ED threshold at the gNB for LBT in an opposite (e.g., supplementary paired) direction may be optimized so that the positive detection region for LBT in opposite direction may overlap with the region of solved hidden nodes. The path loss (PL) may be modelled by:

$$PL = \frac{k}{d^\alpha}, k \sim \left(\frac{\lambda}{4\pi}\right)^2 = \left(\frac{c}{4\pi f_c}\right)^2$$

where α is the pathloss exponent that may take a value between 2 to 6, $f_c$ may be the carrier frequency, c may be the speed of light, and d may be the distance between two nodes in meters. Considering signal dispersion over distance, the average received signal power at node i from node j may be:

$$P_R(i) = \frac{k}{d^\alpha} G_T(j) P_T(j) G_R(i)$$

where $G_T(j)$, $P_T(j)$, $G_R(i)$ may denote the transmit antenna gain at node j, the transmit power at node j, and the receive antenna gain at node i, respectively. The UE Rx beam region may be given by a sector of radius r and angle $\theta_{Rx}$ pointed towards the gNB. The radius may be calculated as follows:

$$r = \left(\frac{kG_{Tx,AP,m}P_{Tx,AP}G_{Rx,m}}{N_o W}\right)^{\frac{1}{\alpha}}$$

where $N_o \cdot W$ may denote the noise power, $G_{Tx,AP,m}$ may be the AP mainlobe gain, and $P_{Tx,AP}$ refers to the AP transmit power. An AP located within the beamwidth of the UE, $\theta_{Rx}$, may be (e.g., at least) r meters away from the UE in order not to interfere to it.

Figure 24:
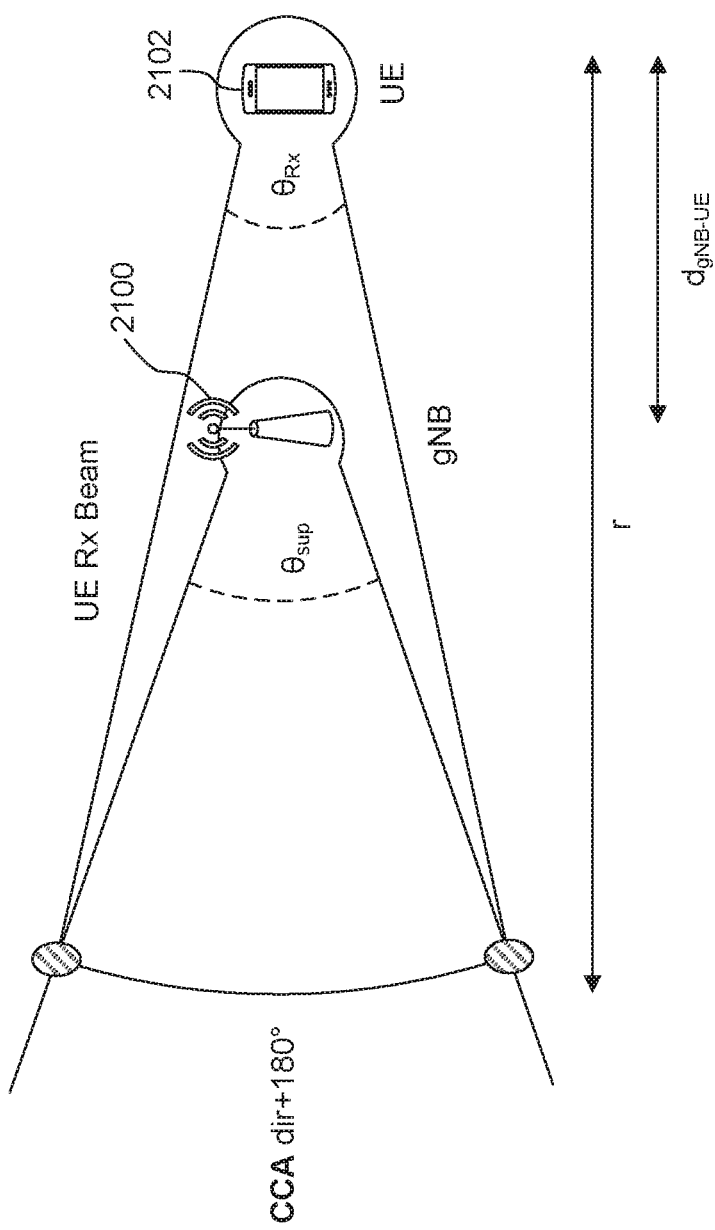
FIG. 24 illustrates an example of a beamwidth adjustment for a LBT in an opposite direction, in accordance with some embodiments.

In some embodiments, optimization of the beam ($\theta_{sup}$, $G_{sup,m}$) for a LBT in an opposite direction may be performed. FIG. 24 illustrates an example of a beamwidth adjustment for a LBT in an opposite direction, in accordance with some embodiments. This may maximize the number of solved hidden nodes and may avoid generation of new exposed nodes. This may be performed by adjusting the mainlobe beamwidth for the LBT in the opposite direction so that it covers a Rx beam region of a UE 2102, as shown in FIG. 24. The angle of the sector of a gNB 2100 may be such that it allows covering the border of the UE Rx beam region. The antenna gain may be obtained from the beamwidth adjustment.

A closed-form expression for the mainlobe beamwidth to be used for the LBT in the opposite direction may be:

$$\theta_{sup} = 2\tan^{-1}\left(\frac{r\tan\left(\frac{\theta_{Rx}}{2}\right)}{r - d_{gNB-UE}}\right)$$

where $d_{gNB-UE}$ may be the gNB-to-UE distance, as shown in FIG. 24.

As discussed herein, the beamwidth and the antenna gain of the mainlobe may be directly related. An antenna pattern with the same beamwidth in the azimuth domain and the elevation domain may be described as:

$$G_{sup,m} = \frac{C}{\theta_{sup}\theta_{sup}}$$

where C may be a constant that depends on the type of 3D antenna pattern (e.g., elliptical, rectangular). $G_{sup,m}$ may have a maximum value that depends on the number of antenna elements at the gNB. The value of $\theta_{Tx}$ (gNB) may be lower than the value of $\theta_{Rx}$ (UE), and an adjustment may provide $\theta_{sup} > \theta_{Tx}$ (i.e., a feasible mainlobe beamwidth).

If multiple predefined beams are used in multiple opposite directions (as shown in FIG. 15B), then the gNB may choose the number of beams that maximizes the area of solved hidden nodes. There may not be an excess of exposed nodes.

Given a fixed value of $\theta_{sup}$ and $G_{sup,m}$ (for example, obtained using the techniques discussed herein), a transmitting node (gNB) may adjust an ED threshold for LBT in opposite direction so that the positive detection region for LBT in an opposite (e.g., supplementary paired) direction may overlap with the region of solved hidden nodes (see FIG. 17A). This may be obtained by considering a threshold power for LBT in opposite direction of:

$$P_{th} = \frac{kG_{Tx,AP,m}P_{Tx,AP}G_{sup,m}}{(r - d_{gNB-UE})^\alpha}$$

This equation, which may be used to adjust the ED threshold for LBT in an opposite direction, may be applied if multiple beams with predefined beam patterns are used in multiple opposite (e.g., supplementary paired) directions (as, e.g., shown in FIG. 17B).

Various embodiments have been described above, including embodiments directed to, for example, mitigating directional hidden node problems that may occur when operating in unlicensed bands with highly directional systems. However, those embodiments are not exhaustive and, in other embodiments, additional variations, implementations, configurations, procedures, etc. are possible within the scope of the present disclosure.

According to some embodiments, methods, systems, and signaling are disclosed herein for a coordinated LBT mechanism that enables a spatial reuse in multiple unlicensed bands, such, for example, in sub 6 GHz and/or mmWave unlicensed bands. In some embodiments, the methods disclosed herein provide coordinating procedures for use among nodes that are, for example, associated with the same or related RAT (radio access technology) and/or with one more operator(s) (e.g., cellular/wireless carrier(s)) to prevent (e.g., avoid) (or at least reduce a likelihood of) an intra-RAT LBT blocking, while, e.g., complying with or meeting LBT requirement(s) or regulation(s) in one or more unlicensed bands.

Uncoordinated LBT mechanism among different nodes of, e.g., the same RAT that can generally implement transmit coordination (or coordination of transmissions between nodes) may result in an unnecessary LBT blocking. It may further result in a poor channel utilization. Cellular networks are typically designed to allow a reuse (e.g., a reuse of radio resource(s) (e.g., frequency, time, etc.)), for example, one full reuse, by utilizing a number of interference management techniques (e.g., an adaptive rate control, a power control, a coordinated multi-point (CoMP), an enhanced inter-cell interference coordination (eICIC), etc.) to mitigate an inter-cell interference within the nodes of, e.g., a single RAT (e.g., NR from a specific operator/wireless carrier).

Therefore, generally, there may be no need to block a transmission due to a LBT among devices of the same RAT that may be coordinated for transmission in unlicensed spectrum (e.g., nodes of the same RAT and, likely, of the same operator). However, 5 GHz and the 60 GHz unlicensed band regulations, for example, require implementation of a LBT.

Figure 25:
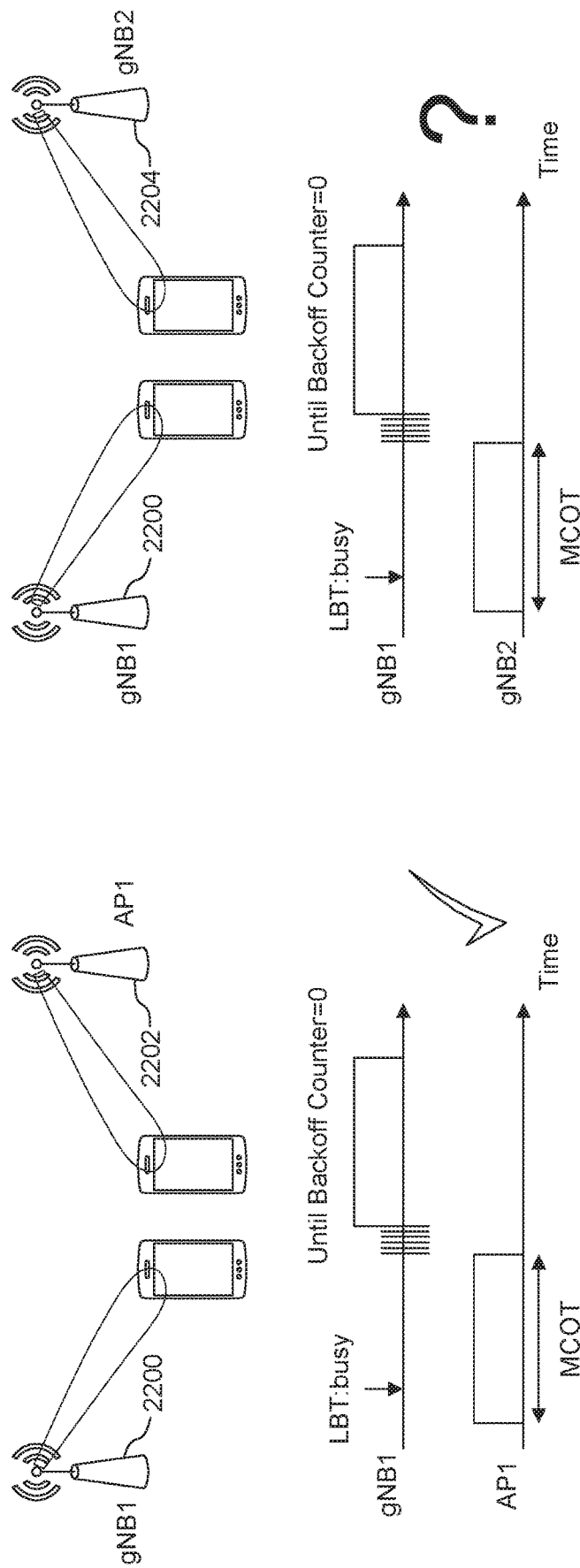
FIG. 25A illustrates an example of LBT blocking for nodes of different radio access technologies (RATs), in accordance with some embodiments.
FIG. 25B illustrates an example of LBT blocking for nodes of the same RAT, in accordance with some embodiments.

FIGS. 25A and 25B illustrate, respectively, examples of LBT blocking for (A) nodes of different RATs and (B) nodes of the same RAT, in accordance with some embodiments.

In the example of FIG. 25A, an AP 2200 (also denoted as "AP1") has accessed a channel and then, during a MCOT, blocks a transmission of a gNB 2202 (also denoted as "gNB1") because the gNB 2202 senses the channel as busy with a LBT. Hence, the gNB 2202 has to wait until a transmission of the AP 2200 is finished to complete a backoff procedure, as shown in FIG. 25A. Subsequently, when the channel is clear, the gNB 2202 can finally access the channel. This is, e.g., a typical procedure.

However, in FIG. 25B, a gNB 2204 (also denoted as "gNB2"), which may be a node of the same RAT and, e.g., same operator as that of the gNB 2202, has accessed the channel and is blocking the transmission of the gNB 2202 due to aligned transmissions and LBT carrier sense. In this case, the gNB 2202 has to defer the transmission, as shown in FIG. 25B, when, under what may be a typical cellular operation, cellular networks may normally allow a full reuse, accompanied by effective coordination strategies that can manage interference (e.g., at least in between nodes of the same RAT and operator). In the example of FIG. 25B, LBT blocking may have negative effects as it, for example, prevents a spatial reuse. Generally, in some embodiments, a spatial reuse refers to enabling time and frequency resource utilization in different locations. In this regard, for example, interfering beams may hinder (e.g., due to collisions) a spatial reuse of radio resources.

To avoid the problem of LBT blocking of a transmission within nodes of the same RAT, a solution has been proposed to group neighbor TRPs, and self-defer them for a joint channel access, so that they do not block each other, either through the use of reservation signals or the transmission itself. See, e.g., Huawei, HiSilicon, "3GPP R1-1719841, "Coexistence and channel access for NR-based unlicensed band Operation"," 3GPP TSG RAN 91 Meeting, November 2017.

However, the main challenge that a self-deferring technique may present is that, during a self-defer period, another node may access a channel. Also, note that this technique addresses simultaneous accesses, but does not address a case in which a node has already accessed the channel and may block neighboring transmissions of nodes within the same RAT (as shown, for example, in FIG. 25B).

LBT blocking within nodes of, e.g., the same RAT (and/or of the same operator) that generally follow coordinated transmission, remains an issue in LAA that needs to be solved. Some communication technologies, such as Wi-Fi and WiGig, employ contention so that LBT blocking is generally allowed, and nodes also do not coordinate for transmission.

Hence, improvements may be desirable for LAA and NR-U (or 5G NR-based access to unlicensed spectrum) that normally follow a scheduled approach.

According to some embodiments, coordinated LBT signaling is disclosed. In some embodiments, a LBT coordination may be implemented to coordinate backoff procedure(s), assuming, for example, that transmit coordination can be applied after the LBT coordination, using, e.g., some of the already available techniques (e.g., CoMP, eICIC, etc.).

Figure 26:
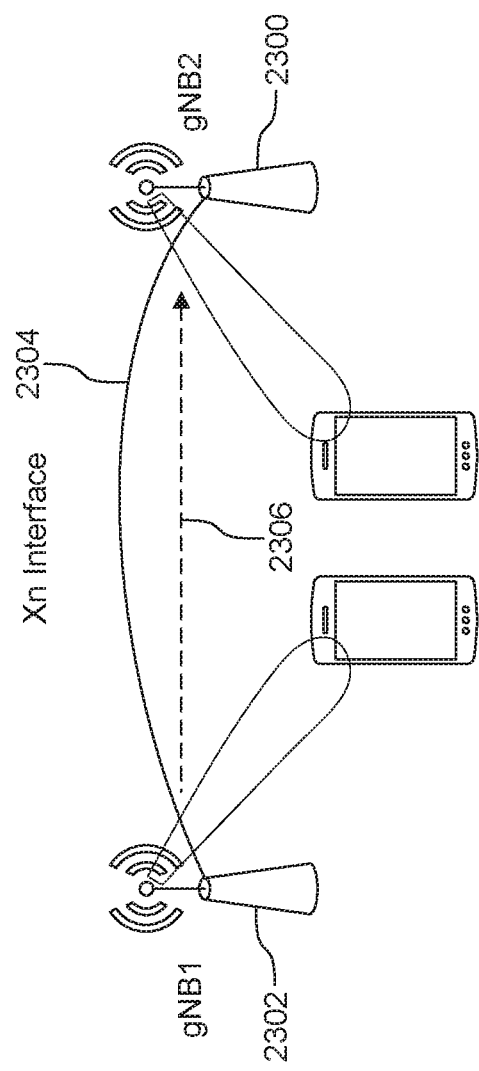
FIG. 26 illustrates an example of a scenario of LBT coordination, in accordance with some embodiments.

In some embodiments, when a gNB (e.g., the gNB1 shown in FIG. 25B) detects that a node occupying a channel is a node using, e.g., the same RAT (e.g., the gNB2 shown in in FIG. 25B), the gNB could send a message over to that node, e.g., via an Xn interface as in NR (or an X2 interface as in LTE) to request a LBT coordination (referred to herein as "LBT-C-RQ") in an effort to avoid unnecessary LBT blocking. FIG. 26 illustrates an example of a scenario of LBT coordination, in accordance with some embodiments.

A node receiving the LBT-C-RQ (e.g., a gNB 2300 (also denoted as "gNB2") in FIG. 26 receiving a LBT-C-RQ 2306 from a gNB 2302 (also denoted as "gNB1") over an Xn interface 2304) may either accept or reject the LBT-C-RQ. If accepted, in some embodiments, the accepting node will send back an acceptance (e.g., in the form of any suitable acceptance message), including or accompanied by, e.g., one or more way(s) in which the LBT coordination to complete a backoff will be or may be performed. Additionally, in some embodiments, the acceptance may also indicate a start time for transmit coordination and a transmit coordination strategy that may be applied after the LBT backoff procedure has been completed.

In some embodiments, a detection of the presence of device(s) of the same RAT, may be based on an assumption that nodes of the same RAT will generally be able to decode their own RAT messages (e.g., a PDCCH or eDRTS (enhanced directional RTS)).

Figures 27A, 27B:
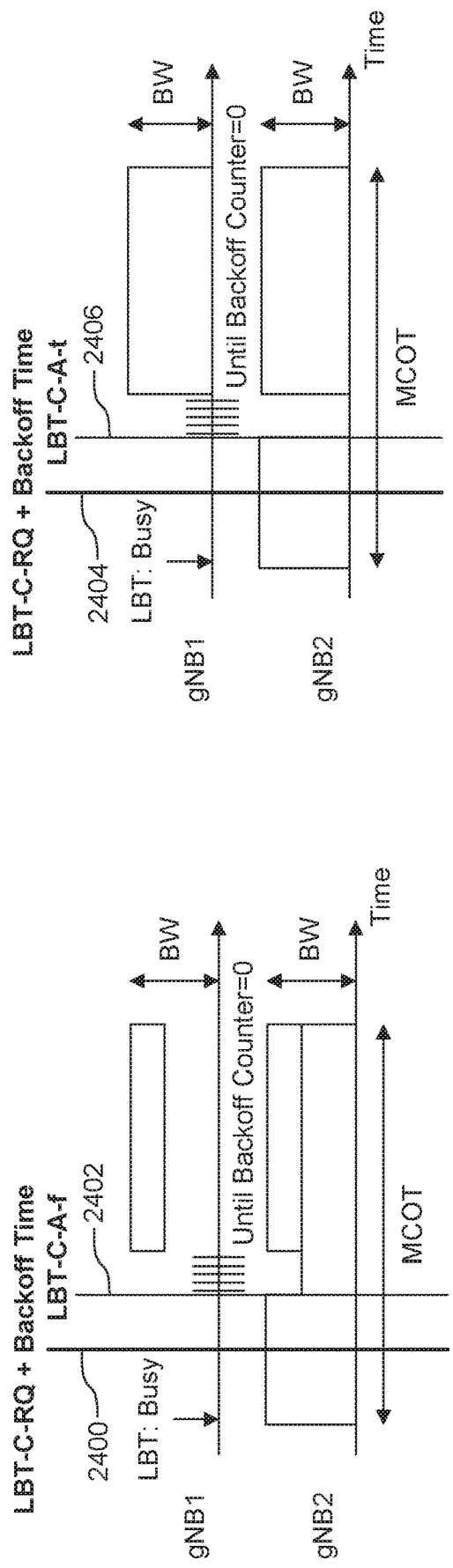
FIG. 27A illustrates an example of a LBT coordination in a frequency-domain, in accordance with some embodiments.
FIG. 27B illustrates an example of a LBT coordination in a time-domain, in accordance with some embodiments.

Once nodes get access to the channel, transmit coordination may be performed in multiple domains, such as time, frequency, space, power, and/or rate. However, note that, in some embodiments, some level and/or form of transmit coordination may be needed to complete the LBT backoff procedure. In some embodiments, the LBT coordination may be either in a frequency domain or a time domain. FIGS. 27A and 27B illustrate, respectively, examples of a LBT coordination in (A) frequency-domain and (B) time-domain, in accordance with some embodiments.

Furthermore, in some embodiments, to improve fairness with respect to other RATs, the LBT coordination may occur within a MCOT (e.g., only within the MCOT).

For a frequency-domain LBT coordination (see FIG. 27A), in some embodiments, an example procedure to complete a LBT backoff and subsequently use any suitable transmit coordination strategy for transmission may be, by way of example, as follows.

Initially, a gNB2, upon receipt of a LBT-C-RQ 2400 and, e.g., an indication of a backoff time from a gNB1, may release some resource blocks (RBs) or a BWP (bandwidth part) for a certain period, and may indicate so to a gNB1 through a frequency-related coordination acceptance (message) 2402 (referred to herein as "LBT-C-A-f"). The gNB2 may also provide, for example, indication(s) of parameters such as, but not limited to, released resources, a transmit coordination strategy, a start time for transmit coordination, and/or a time-to-MCOT limit. Some or all of these parameters may be indicated in the LBT-C-A-f 2402 or, alternatively, transmitted separately from the LBT-C-A-f 2402. Subsequently, the gNB1, upon receipt of the information/message(s) from the gNB2, may change from a wide-band LBT to a BWP LBT (or sub-band LBT) within the indicated frequency resource(s) (or BWP) released by the gNB2.

In the above-described example frequency-domain LBT coordination procedure, a release of some RBs and the gNB1 having an ability to implement the BWP LBT in those RBs, may (i) enable the gNB1 to complete the LBT backoff procedure in accordance with applicable unlicensed spectrum regulation(s), and (ii) subsequently transmit by exploiting a spatial reuse (e.g., by fully exploiting the spatial reuse within an allocated BWP).

For a time-domain LBT coordination (see FIG. 27B), in some embodiments, an example procedure to complete a LBT backoff (b)), and subsequently use any suitable transmit coordination strategy for transmission may be, by way of example as follows Initially, a gNB2, upon receipt of a LBT-C-RQ 2404 and, e.g., an indication of a backoff time, may release, e.g., OFDM symbol(s) that may be needed to complete the LBT backoff and indicate so to a gNB1 through a time-related coordination acceptance (message) 2406 (referred to herein as "LBT-C-A-t"). The LBT-C-A-t 2406 may also indicate, for example, parameters such as, but not limited to, a start time for transmit coordination, a transmit coordination strategy, and/or a time-to-MCOT limit. Alternatively, some or all of these parameters may be provided separately from the LBT-C-A-t 2406. Subsequently, the gNB1, upon receipt of the information/message(s) from the gNB2, may continue to use a wide-band LBT.

In some embodiments, in the above-described example time-domain LBT coordination procedure, transmit coordination may occur by exploiting a spatial reuse within, e.g., the whole (or full) bandwidth (BW). However, in comparison to the LBT frequency-domain coordination, in the LBT time-domain coordination, it may be possible that another node might access (or at least try to access) the channel in the released temporal resource(s) (see FIG. 27(B)). In some embodiments, in the event this or similar kind of access occurs, it may be treated as a form of an "intra-RAT shared MCOT." In this case, the released time may be as low as few microseconds (e.g., 25 µs, as in a shared MCOT) and sufficient to complete a LBT.

In accordance with illustrative embodiments, in the time-domain and/or frequency-domain LBT coordination, a time remaining in the backoff (e.g., at the gNB1) may be concurrently or jointly sent with the LBT-C-RQ 2400 and/or 2404, respectively, so that the gNB2 can properly configure the released resources (e.g., a BWP or some temporal symbols) for the gNB1 to complete a LBT. Also, jointly or concurrently with the LBT-C-A, the BWP that is released and/or the temporal symbol(s) that are released to complete the back-off are specified, as well as the information about the start time plus coordination strategy that, e.g., may permit full reuse plus end time (MCOT limit).

Based, for example, on values related to a NR-U operation, an implementation of the proposed LBT coordination may be feasible for NR-U. A MCOT for the unlicensed 60 GHz band takes a value of 9 ms. See, e.g., European Telecommunications Standards Institute (ETSI), "EN 302 567 Broadband Radio Access Networks (BRAN) V2.1.1," ("EN 302 567 BRAN") July 2017. Assuming numerology of $\mu=4$ (i.e., SCS=240 kHz), this results in 16×9=144 slots within the MCOT. Therefore, there are 144 opportunities for the gNB1 to decode a PDCCH from the gNB2, if decodable. A CCA slot (according to, e.g., EN 302 567 BRAN) for the 60 GHz band is of 5 microseconds. As such, according to the example, the gNB1, instead of waiting for 9 ms+backoff (X×5 microseconds), may access the channel by decoding the PDCCH from the gNB2 (e.g., at most one slot, i.e., 62.5 us for $\mu=4$)+coordination+backoff (X×5 microseconds).

Advantageously, some embodiments described herein may not only provide for a spatial reuse but may also reduce a channel access delay.

In addition, 5G NR utilizes an Xn interface (see, e.g. the Xn interface 2304 in FIG. 26) that is used, for example, for communications between base stations (e.g., gNB-gNB). Some embodiments disclosed herein further provide signaling associated with a LBT coordination that is also compatible with or suitable with the use of the Xn interface.

In one example embodiment, a coordinated LBT Request Signaling (referred to herein as "LBTRS") is disclosed. The LBTRS may be sent through Xn by, e.g., a gNB detecting a busy channel due to the presence of a node from a RAT shared with the gNB. The LBTRS may include the following (but not limited to) information: (i) a request for intra-RAT LBT coordination within MCOT (LBT-C-RQ), (ii) a remaining backoff time, (iii) a requesting gNB identification, and/or (iv) a requested gNB identification.

In one example embodiment, a coordinated LBT Enabled Signaling (referred to herein as "LBTES") is disclosed. The LBTES may be sent through Xn by a gNB that occupies the channel and receives the LBTRS. Further, the LBTES may include the following (but not limited to) information: (i) a frequency-domain LBT coordination acceptance to complete a backoff (LBT-C-A-f), (ii) released resources in a frequency domain (e.g., BWP), (iii) a time-domain LBT coordination acceptance to complete a backoff (LBT-C-A-t), (iv) a start time of a transmit coordination, (iv) a transmit coordination strategy (time, freq, power, space, CoMP, etc.), (v) a time to MCOT limit, (vi) a requesting gNB identification, and/or (vii) a requested gNB identification.

In the above signaling, the use of the requesting gNB identification (e.g., an ID of a gNB1) and a requested gNB identification (e.g., an ID of a gNB2) in, e.g., the LBTRS enable the coordination between specific gNBs, rather than being directed towards, e.g., all of the nodes (e.g., all of gNBs) of a given RAT.

In addition, in some embodiments, once a gNB gets an access to the channel, it may inform nearby gNBs (e.g., gNBs of the same RAT) through, e.g., an indicator of the channel access to facilitate a detection on part of nearby gNBs of whether that channel is busy/accessed by another gNB of, e.g., the same RAT.

In contrast to other proposed approaches to LBT coordination (e.g., a self-defer approach before a channel access, as noted above), some embodiments disclosed herein may provide signaling to request for coordination of LBT backoff procedures (either in time or in frequency (e.g., a BWP)) after, e.g., detecting ongoing transmissions of TRPs of the same RAT that can be coordinated for transmission. In some disclosed embodiments, the kind, or type, of LBT backoff coordination that is accepted (which may imply, e.g., a change from a wide-band LBT to a BWP LBT if indicated), may be further signaled so that nodes may self-defer, for example, in the whole BW or only in a BWP for transmit coordination.

Further, some embodiments disclosed herein provide ways to ensure fairness among different RATs in unlicensed band/spectrum.

More specifically, two LBT solutions, for example, have been considered for NR-U in 3GPP to ensure a fair multi-RAT coexistence in unlicensed mmWave bands: (i) an omnidirectional LBT (also referred to herein as "omniLBT") and (ii) a directional LBT (also referred to herein as "dirLBT"). Those two solutions differ as to the type of a physical carrier sense. OmniLBT senses omnidirectionally, while dirLBT senses in a directional manner towards the intended RX. See, e.g., Huawei, HiSilicon, "R1-1713785, "Coexistence and channel access for NR unlicensed band operation"," 3GPP TSG RAN WG1 90 Meeting, August 2017.

Figure 28B:
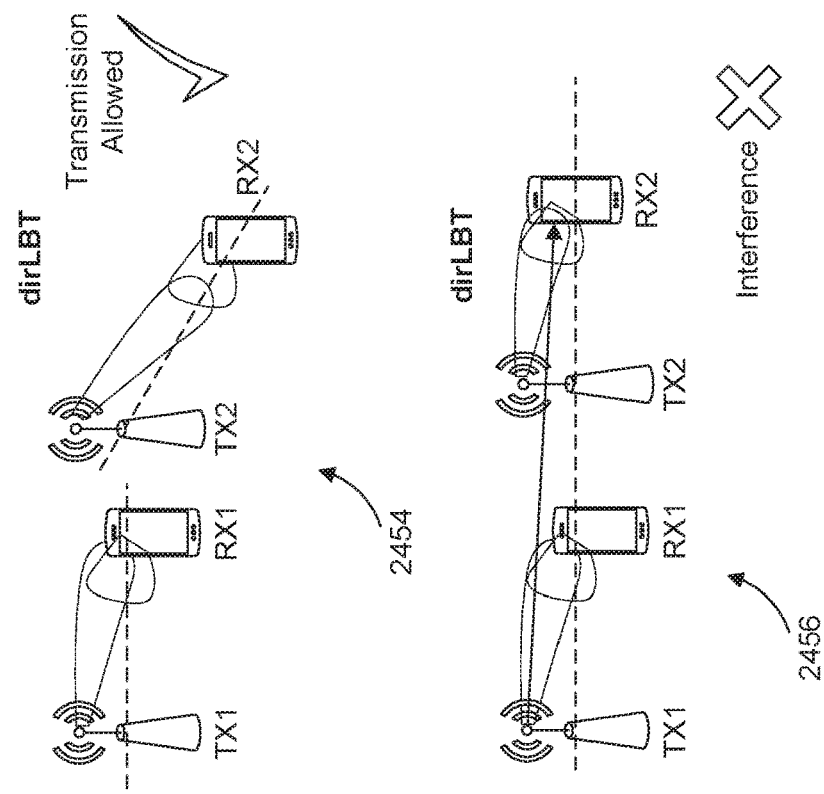
FIG. 28B illustrates an example of a behavior of a directional LBT for directional transmissions/receptions, accordance with some embodiments.
Figure 28A:
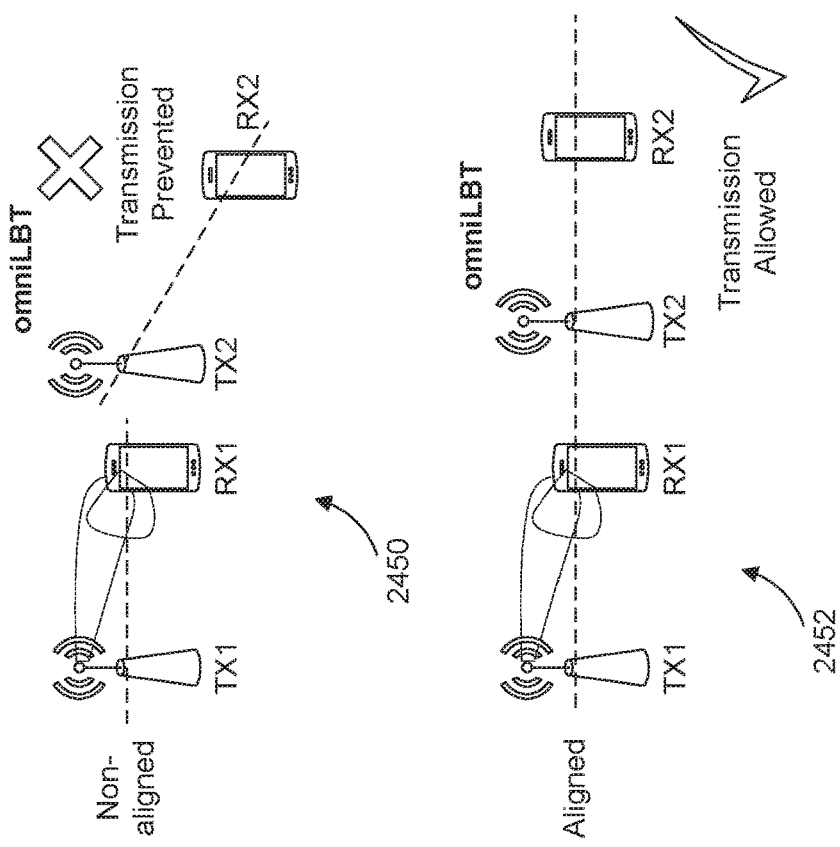
FIG. 28A illustrates an example of a behavior of an omnidirectional LBT, in accordance with some embodiments.

However, some shortcomings may exist with those approaches. FIG. 28A illustrates an example of a behavior of an omnidirectional LBT, in accordance with some embodiments. FIG. 28B illustrates an example of a behavior of a directional LBT for directional transmissions/receptions, in accordance with some embodiments.

For directional transmissions, an omnidirectional LBT may cause overprotection because a transmission may be prevented even if a signal is detected from a direction that may not create a harmful interference for the intended RX (e.g., an exposed node problem, as shown in FIG. 28A (top) (a case 2450 of non-aligned transmissions), for TX2-RX2, which could have reused the spectrum but have been prevented by the omnidirectional LBT). For many implementations, omnidirectional LBT may, e.g., only be appropriate when transmissions are aligned in space, as shown in FIG. 28A (bottom) (a case 2452 of aligned transmissions).

In contrast, a directional LBT may not create overprotection because it may typically only sense a spatial direction in which a transmission will be carried out (see FIG. 28B (top) (a case 2454 of non-aligned transmissions)). However, in a directional LBT, other ongoing nearby transmissions might not be detected. Hence, directional hidden node problem(s) may cause interference, as shown in FIG. 28B (bottom), because the transmission of TX1 lies within an antenna boresight of RX2 (a case 2456 of aligned transmissions).

Therefore, the above-discussed approaches may result in (1) an omniLBT-based scheme that is overprotective and prevents a spatial reuse, and (2) a dirLBT-based scheme that enables a spatial reuse but with a possibility of some hidden node problems. These trade-offs are shown in FIGS. 28A and 28B for non-aligned (top) and aligned (bottom) transmissions. Accordingly, it would be advantageous in certain implementations to make use of LBT schemes in a more optimal manner.

Furthermore, it can be shown via, e.g., Monte-Carlo simulations that the best physical carrier sense scheme from among a directional LBT, a paired LBT (also referred to herein as "pairLBT"), and an omni directional LBT) (at least in terms of performance) varies in accordance with a network density and employed beamwidths. For example, for a low network density, a directional LBT may be enough, while for a high network density, an omnidirectional LBT may be enough. Similarly, for narrow beamwidths, a directional LBT may be enough, while for wide beamwidths, an omnidirectional LBT may be enough. Additionally, a complexity of a given LBT mode maybe taken into account when selecting a LBT mode. Generally, an omnidirectional LBT, e.g., may be considered to be the simplest one.

According to some embodiments, methods and systems disclosed herein provide a LBT switching mechanism that addresses at least some of the shortcomings associated with, for example, the use of omnidirectional LBT and/or directional LBT in cases of directional transmissions and receptions, as illustrated in FIGS. 28A and 28B.

In some embodiments, switching from a directional LBT to an omnidirectional LBT may be done when the directional LBT senses a channel as idle, but a hidden node problem arises. In some systems, the switching may be performed based on HARQ-ACK feedback. For example, if multiple HARQ-ACK feedbacks are NACKs, then a transmitting node (TX) may switch to an omnidirectional LBT. Otherwise, it may continue with the directional LBT. Note that a NACK may typically be determined either when an incorrect reception arises (e.g., a control channel was decoded but data could not be decoded) or when no feedback is received (e.g., a control channel could not be decoded, or a NACK feedback was not correctly decoded or blocked, e.g., due to a LBT).

Switching from a directional LBT to an omnidirectional LBT may be implemented based, e.g., on information such as a HARQ-ACK feedback. More specifically, in some embodiments, the transmitting node may average the collected information for a DL (downlink) case. In one example embodiment, the transmitting node in the DL case, such as a gNB, may collect HARQ-ACK feedback from a UE, and may determine to switch from a directional LBT to an omnidirectional LBT when a number of NACKs exceeds a particular threshold within a given time period or over a certain number of received HARQ feedbacks.

In some embodiments, switching from an omnidirectional LBT to a directional LBT may be done when the omniLBT prevents a number (e.g., a predetermined number or a number exceeding a certain threshold) of accesses to a channel, such as due to exposed nodes rather than due to interference situations. In some embodiments, the LBT switching may be performed based on reported information from a receiving node (RX) according to the following example mechanism described below.

In the example mechanism, a TX (transmitting node) may track the channel accesses in which a status of "busy" was determined by the omniLBT, and may save specific time instants of those determinations. When the TX can successfully access the channel, it may send information to the RX regarding the time instants of prevented channel accesses. In the meantime, the RX may perform a continuous ED (energy detection) carrier sense, with an antenna configuration or beam that it would normally use for data reception from TX, while in a Radio Resource Control (RRC) connected mode, and may save result(s) in memory. The RX, based on the received prevented channel access time instants from the TX, may compare those time instants with the results of the ED carrier sense and respond to the TX if the RX senses signal energy larger than a threshold using the antenna configuration or beam that is used for the data reception from the TX.

Based on the response from the RX, the TX may proceed as follows: (i) if the presence of other nearby transmitting node(s) appears to be the primary cause of prevented channel accesses, the TX may continue to use the omniLBT (e.g., decide do so autonomously (or at least partially autonomously) or be instructed by the RX to do so); (ii) if no other nearby transmitting node(s) appear to be the primary cause of prevented channel accesses, the TX may switch to a dirLBT (e.g., decide do so autonomously (or at least partially autonomously) or be instructed by the RX to do so).

Note that, in some embodiments, switching from an omniLBT to, e.g., a dirLBT may require new information, such as information to measure a level of overprotection or an amount of missed transmission opportunities of the omniLBT. Hence, in some embodiments, if the switching is to proceed, a procedure to measure an omniLBT overprotection, and thus allow to switch a sensing scheme to, e.g., a dirLBT, may be used.

Figure 29:
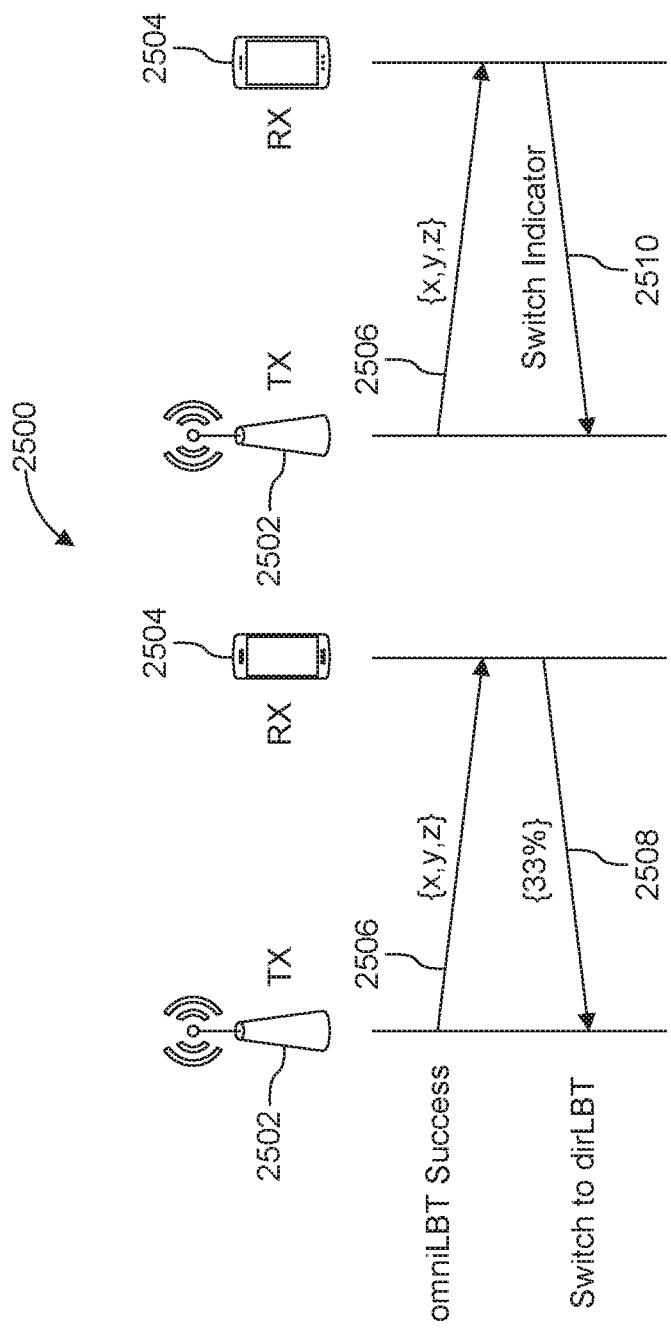
FIG. 29 illustrates a procedure for an omnidirectional LBT overprotective detection, in accordance with some embodiments.

FIG. 29 illustrates a procedure 2500 for an omnidirectional LBT overprotective detection, in accordance with some embodiments. Such procedure may involve, by way of example, the following: (i) sensing information 2506 transmitted from a transmitting node 2502 (also denoted as "TX"), e.g., slot and/or OFDM symbol (OS) indexes in which a channel access was attempted (and found busy) ({x, y, z}, as, e.g., shown in FIG. 29); and/or (ii) a response 2508 to the sensing information 2506 sent from a receiving node 2504 (also denoted as "RX"). In this regard, multiple response options may be available, some examples of which include one or more of the following: (1) slot/OS indexes in which a sensed node was detected, (2) a percentage of attempts 2508 (as shown in FIG. 29) during which the channel was found busy on the RX side, and/or (3) a switching (or switch) indicator 2510 (as shown in FIG. 29).

Based on a message exchange, as shown in FIG. 29 for example, the TX may know if it sensed something that the RX did not (in this case, it may, e.g., switch the LBT strategy). If both the transmitting and receiving nodes sensed a transmission, the TX may continue to use an omniLBT (strategy). For example, in some embodiments, the sensing information 2506 from the TX may include indices of slots or OFDM symbols when the channel was sensed and determined to be busy using an omniLBT. Then, the RX may determine how much of the time that the TX determined the channel as busy was determined as busy by the RX as well. The RX may respond to the TX with a value that includes this information as, e.g., a percentage or fraction (see, e.g., the percentage 2508 in FIG. 29 (left side)) or may send a switch indicator (see, e.g., the switch indicator 2510 in FIG. 29 (right side)) to inform the TX to switch a LBT mode.

In the DL case, reporting (3) (see above) has a lower overhead but provides less detailed information on a TX side (e.g., a UE side) than (1) and (2). In some embodiments, a base station (e.g., an eNB) may switch a LBT mode for all connected UEs in a cell. The UE reports based on formats (1) and (2) may provide additional information to the base station, relative to format (3), to make the switch decision, but use of these UE report formats may, e.g., require a higher signaling overhead than (3). In some embodiments, for a specific Tx beam, a number of switching indicators received may be, e.g., required to exceed a particular threshold in order to perform the switching. In the UL case, since the TX (e.g., a UE) may communicate with different TRPs through different beams, reporting (1), (2), and/or (3) may be equivalent because no averaging is required at the TX (e.g., a UE).

Further, in some embodiments, proposed mechanisms used to switch LBT strategy may, for example, include a switch (i) from an omniLBT to a pairLBT (a soft change), (ii) from an omniLBT to a dirLBT (a drastic change, if it is determined that the omniLBT results in more missed channel access occasions than necessary) or (iii) from a pairLBT to a dirLBT.

Furthermore, in some embodiments, a LBT switching procedure may be extended to cases involving different access schemes for NR, such as, e.g., a DL (scheduled) access scheme, a SUL (scheduled, UL grant-based) access scheme, and/or an AUL (UL grant-free) access scheme. As the DL and the SUL will typically have a higher priority than the AUL for channel access, an LBT scheme may be constrained to be omnidirectional for some types of channel access and network densities, e.g., the AUL in dense networks, by, e.g., not enabling the LBT switching procedure from an omniLBT to any other type of LBT.

According to some embodiments, methods and systems are disclosed herein for modifying a contention window size (CWS) for directional transmissions in case of collisions.

In LAA, a CWS is updated based on HARQ feedbacks. If, e.g., 80% of HARQ feedbacks of one reference subframe is a NACK, the CWS is increased; otherwise it is not. It may be desirable to implement some form of a CWS adaptation procedure based on observed (data) collisions in a NR-U framework. However, in a case of, for example, a directional transmission, CWS adaptation procedure(s) adapted for use in LAA may not be appropriate and different CWS adaptation procedure(s) may, e.g., be needed.

Figure 30B:
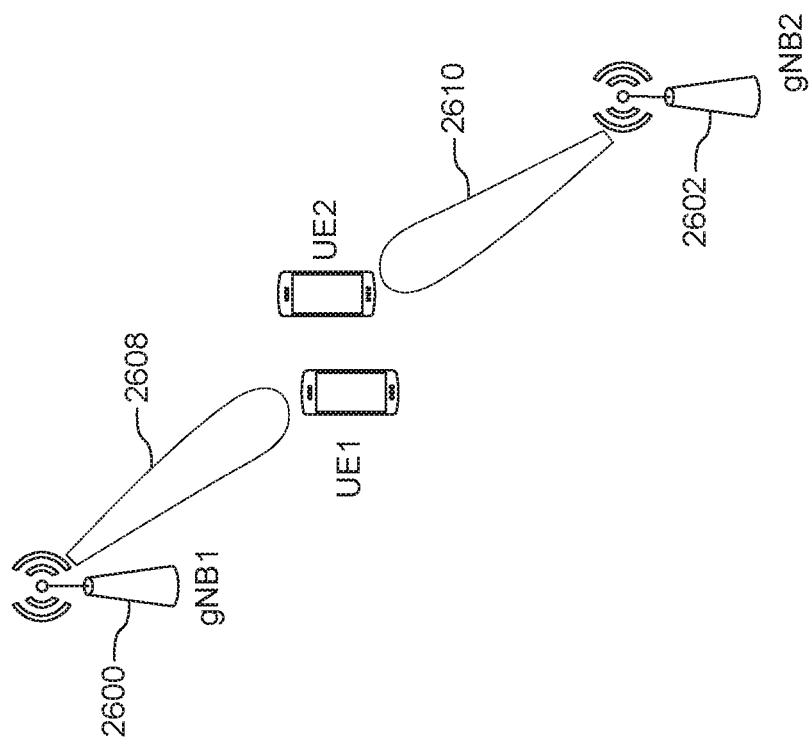
FIGS. 30A and 30B illustrate examples of a contention window size (CWS) adaptation in multi-cell scenarios, in accordance with some embodiments.
Figure 30A:
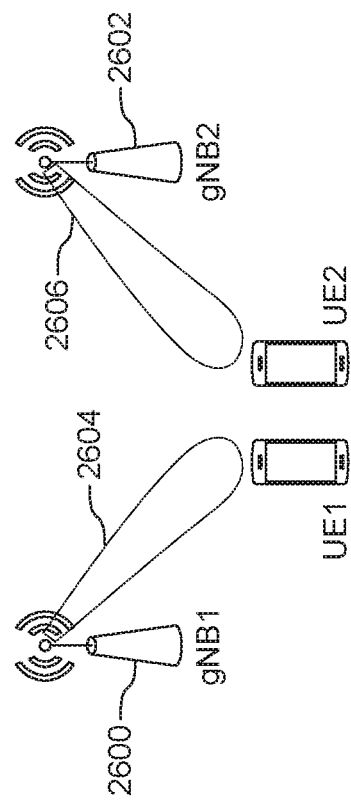

FIGS. 30A and 30B illustrate examples of a CWS adaptation in multi-cell scenarios. For example, as shown in the example of FIG. 30A, LBTs (represented by respective beams 2604 and 2606) of a gNB 2600 and a gNB 2602 (also denoted as "gNB1" and "gNB2", respectively) are not aligned and both gNBs 2600 and 2602 may listen to a channel during a DIFS. Since a transmission of one gNB may not or cannot be heard by the other gNB, the channel is sensed free for both of the gNBs 2600 and 2602. Therefore, both gNBs access the channel substantially at the same time, and a collision results. If the same CWS adaptation procedure used for LAA is applied in this case, then both gNBs may exponentially increase the CWS. Both gNBs listen again during a DIFS, sense the channel to be free again, and another collision occurs. Hence, the same procedure will continue repeatedly. In such case, since LBTs are not aligned (as shown in FIG. 30A), increasing the CWS based on HARQ procedure may not be appropriate.

The described CWS adaptation procedure may, e.g., only be appropriate for a scenario shown in FIG. 30B, when respective LBTs (represented by respective beams 2608 and 2610) of both of the gNBs 2600 and 2602 are aligned. If the gNBs 2600 and 2602 see each other, they likely would backoff and randomize their channel access by adapting their respective CWS.

According to some embodiments, in cases of, for example, simultaneous or concurrent transmission from multiple gNBs when transmission directions are not aligned with each other (as shown, e.g., in FIG. 30A), a UE may force a backoff procedure to randomize their gNB's accesses to the channel. In some embodiments, the UE may perform channel sensing in a direction of a receive beam and also in the opposite direction that is intended to cover the gNB transmit beam direction and, if the channel is sensed busy for a duration exceeding a particular threshold, the UE may send a message to the gNB requesting a backoff. In some embodiments, such message may include a new message or may be included as an additional parameter in an eDCTS sent in response to an eDRTS received from the gNB.

In some other embodiments, a CWS adaptation at a gNB may be based on a statistical paired sensing at a targeted UE, in a direction of a transmitting beam. This may include channel sensing in a direction of a receive beam and also in the opposite direction that is intended to cover the gNB transmit beam direction. In some embodiments, the targeted UE may suggest the most appropriate CWS over the transmission beam line, based, for example, on a percentage of busy slots sensed during a sensing phase.

In yet some other embodiments, a CWS adaptation based on, e.g., HARQ NACKs/ACKs may be used, if, for instance, the NACK includes directional information from sensing, indicating whether a source of interference aligned with a transmission beam exists, where such source may have caused a collision.

Figure 35:
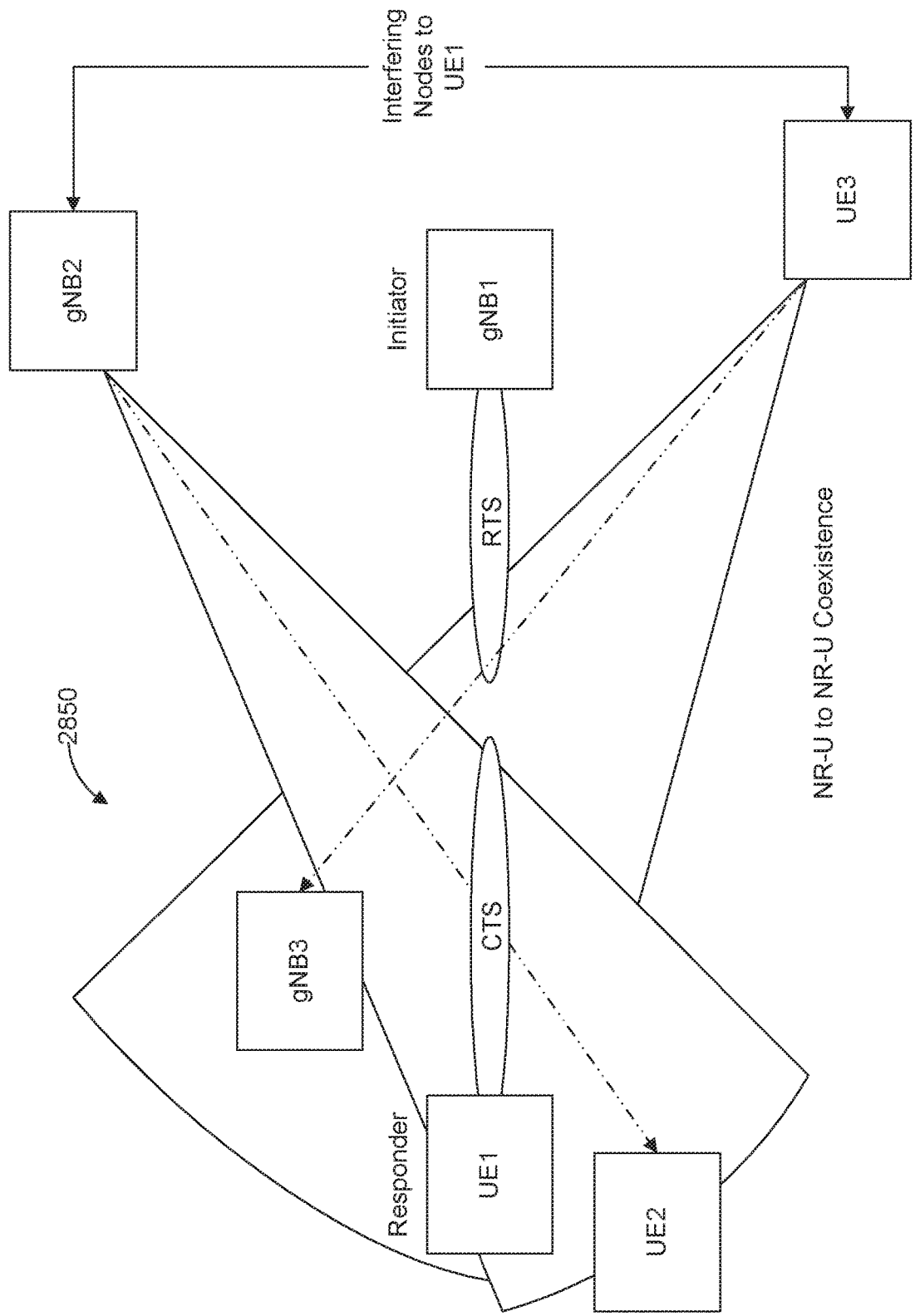
FIG. 35 illustrates an example scenario involving directional RTS/CTS in a NR-U to NR-U coexistence in the presence of interfering nodes.

In general, as addressed herein, a transmission at mmW frequencies may, e.g., require a directional Tx-Rx (transmit-receive) operation. Further, transmissions at unlicensed frequencies may, e.g., require channel sensing to determine if the channel is free. Simply performing, e.g., a directional LBT and a RTS/CTS in a direction of the intended transmission/reception, may in some implementations not be sufficient to correctly determine a channel utilization status due to, e.g., a potential existence of directional hidden nodes. FIG. 35 illustrates an example scenario 2850 involving directional RTS/CTS in NR-U to NR-U coexistence in the presence of interfering nodes.

As described above, methods and systems disclosed herein in accordance with some embodiments address challenges relating to how to reserve an unlicensed channel using directional Tx-Rx in the presence of hidden nodes.

Figure 36:
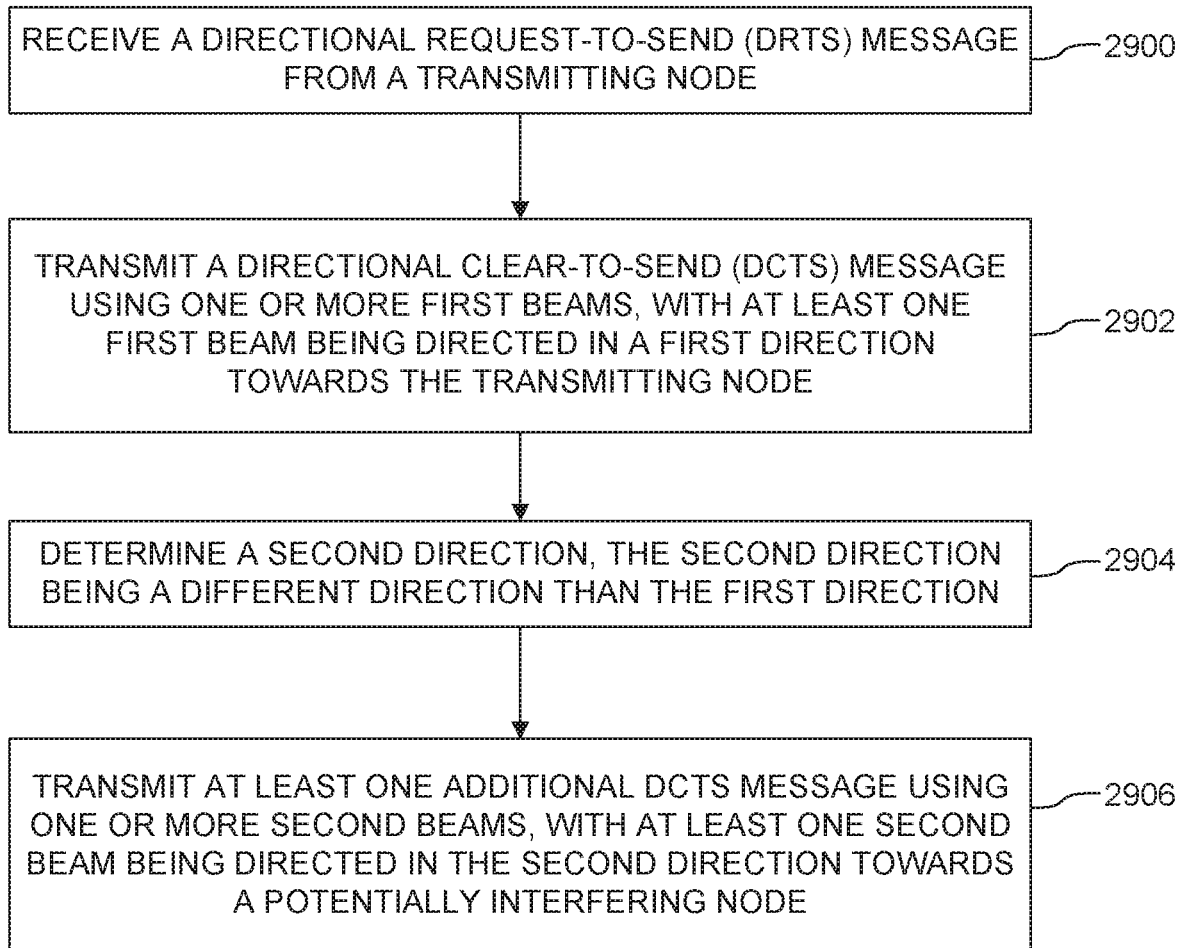
FIG. 36 is a flow chart illustrating a method for reserving a directional channel, in accordance with some embodiments.

FIG. 36 is a flow chart illustrating a method for reserving a directional channel, in accordance with some embodiments. In accordance with some embodiments, the method may be performed by a receiving node, such a wireless transmit/receive unit (e.g., a UE). As shown in FIG. 36, at step 2900, the receiving node receives a directional Request-to-Send (DRTS) message from a transmitting node. At step 2902, the receiving node transmits a directional Clear-to-Send (DCTS) message using one or more first beams, with at least one first beam being directed in a first direction towards the transmitting node. At step 2904, the receiving node determines a second direction, the second direction being a different direction than the first direction. Then, at step 2906, the receiving node transmits at least one additional DCTS message using one or more second beams, with at least one second beam being directed in the second direction towards a potentially interfering node.

Figure 37:
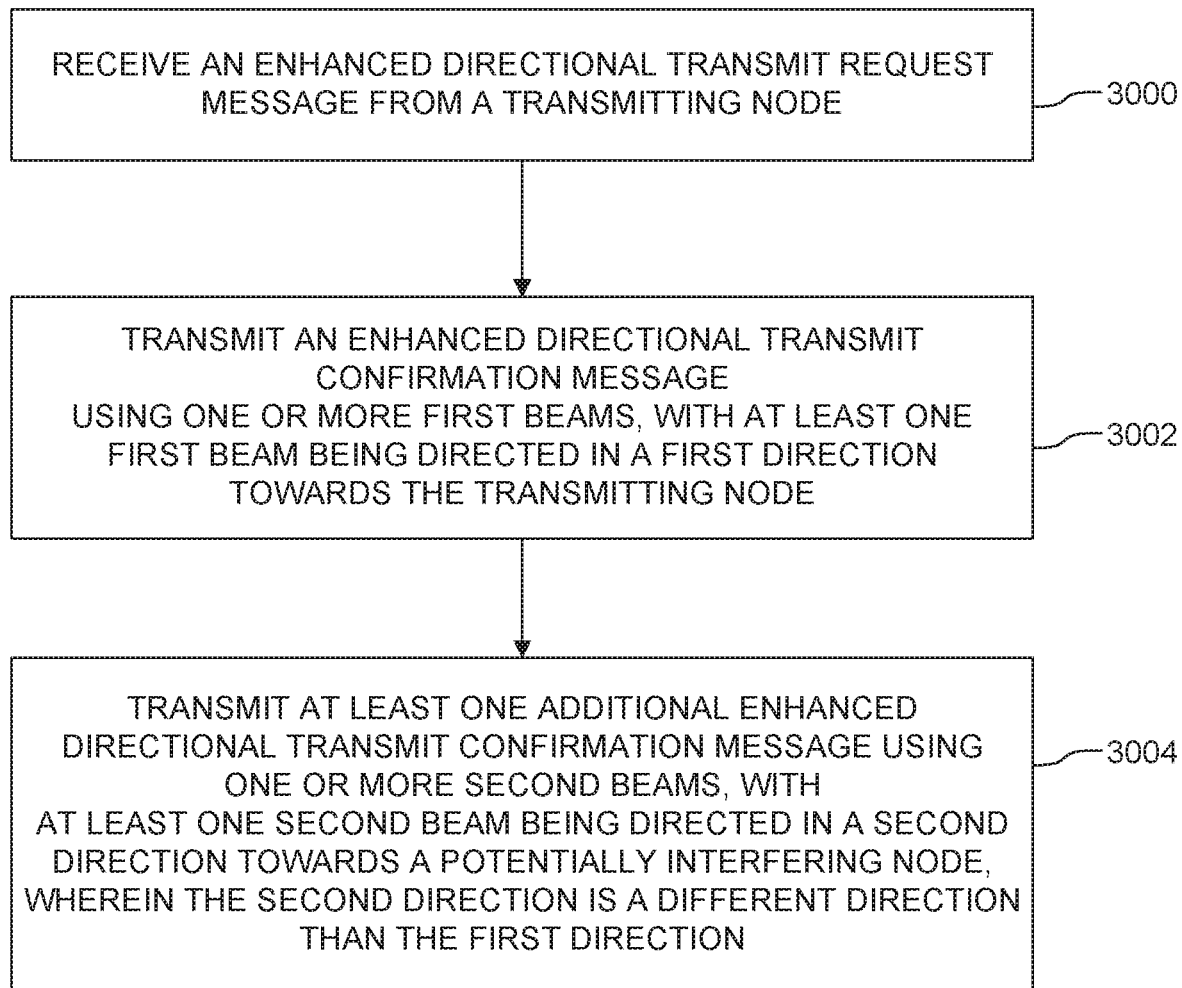
FIG. 37 is a flow chart illustrating another method for reserving a directional channel, in accordance with some embodiments.

FIG. 37 is a flow chart illustrating another method for reserving a directional channel, in accordance with some embodiments. In accordance with some embodiments, the method may be performed by a receiving node. As shown in FIG. 37, at step 3000, the receiving node receives an enhanced directional transmit request message from a transmitting node. At step 3002, the receiving node transmits an enhanced directional transmit confirmation message using one or more first beams, with at least one first beam being directed in a first direction towards the transmitting node. Then, at step 3004, the receiving node transmits at least one additional enhanced directional transmit confirmation message using one or more second beams, with at least one second beam being directed in a second direction towards a potentially interfering node, wherein the second direction is a different direction than the first direction.

In some embodiments, as described hereinabove, methods and systems disclosed herein use an enhanced directional messaging (e.g., an eDCTS and/or an eDCTS-to-Self message) towards, e.g., potentially interfering node(s) (e.g., dominant interfering nodes). In some embodiments, an eDRTS may contain scheduling information of data and an eDCTS-to-Self and/or interfering node locations and orientations. Further, in some embodiments, an eDCTS-to-Self may be targeted towards direction(s) of, e.g., potentially (e.g., known) interfering node(s) (e.g. obtained from a gNB or via measurement(s)).

Figure 38:
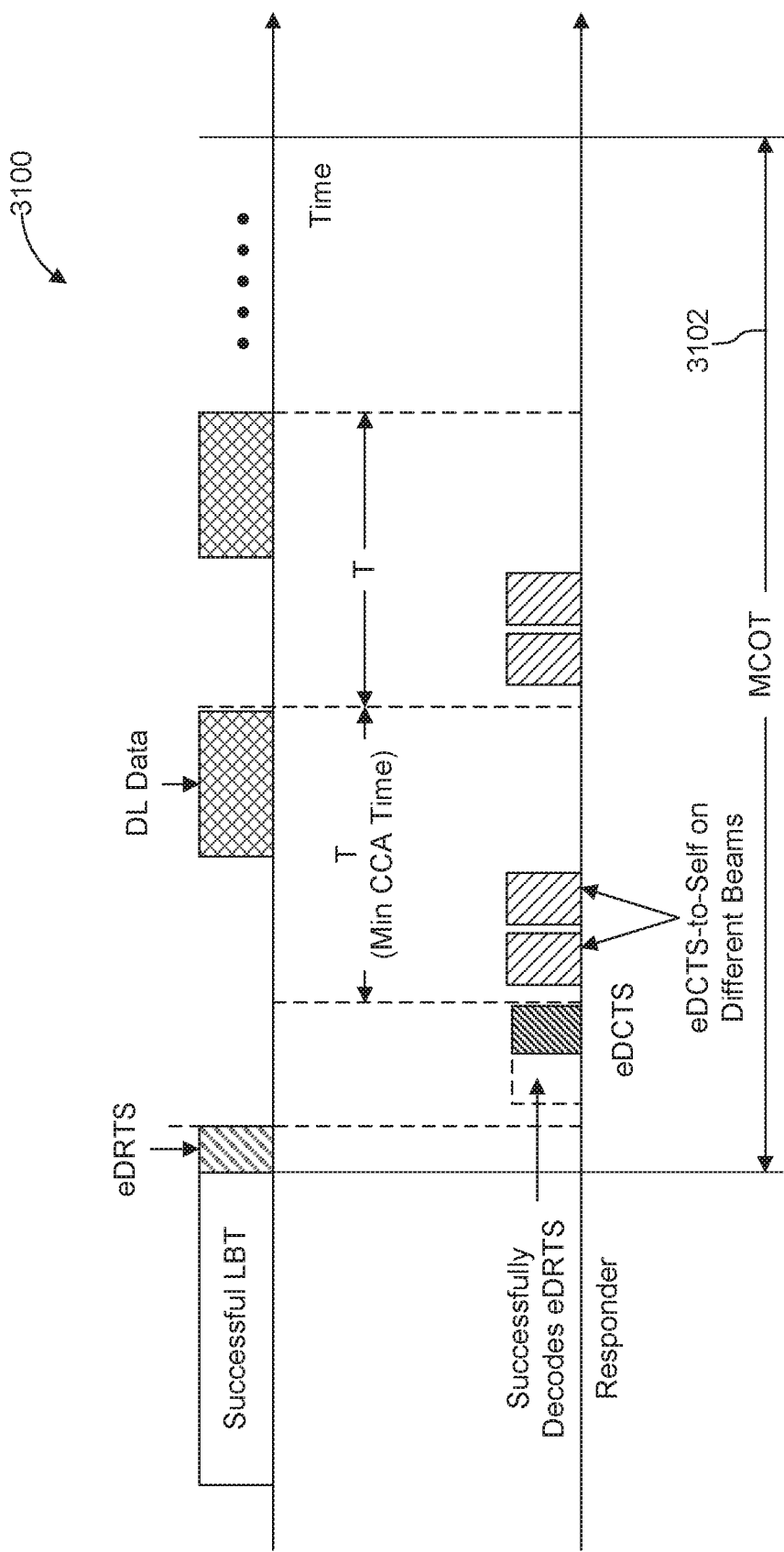
FIG. 38 illustrates an example of a series of transmissions, including eDRTS and eDCTS-to-Self transmissions, in accordance with some embodiments.

In some embodiments, the eDCTS-to-Self transmission may be repeated once every T (or every given time period) (e.g., based on a minimum CCA duration). In some embodiments, the eDCTS-to-Self may contain remaining MCOT duration information. Referencing FIG. 31, for example, a MCOT may, e.g., begin just prior to an eDRTS being sent or just after a (e.g., successful) LBT and may include multiple periods T. FIG. 38 illustrates an example of a series of transmissions 3100, including eDRTS and eDCTS-to-Self transmissions, in accordance with some embodiments. FIG. 38 shows an example of MCOT duration 3102 and periodic eDCTS-to-Self transmissions within the MCOT.

Figure 39:
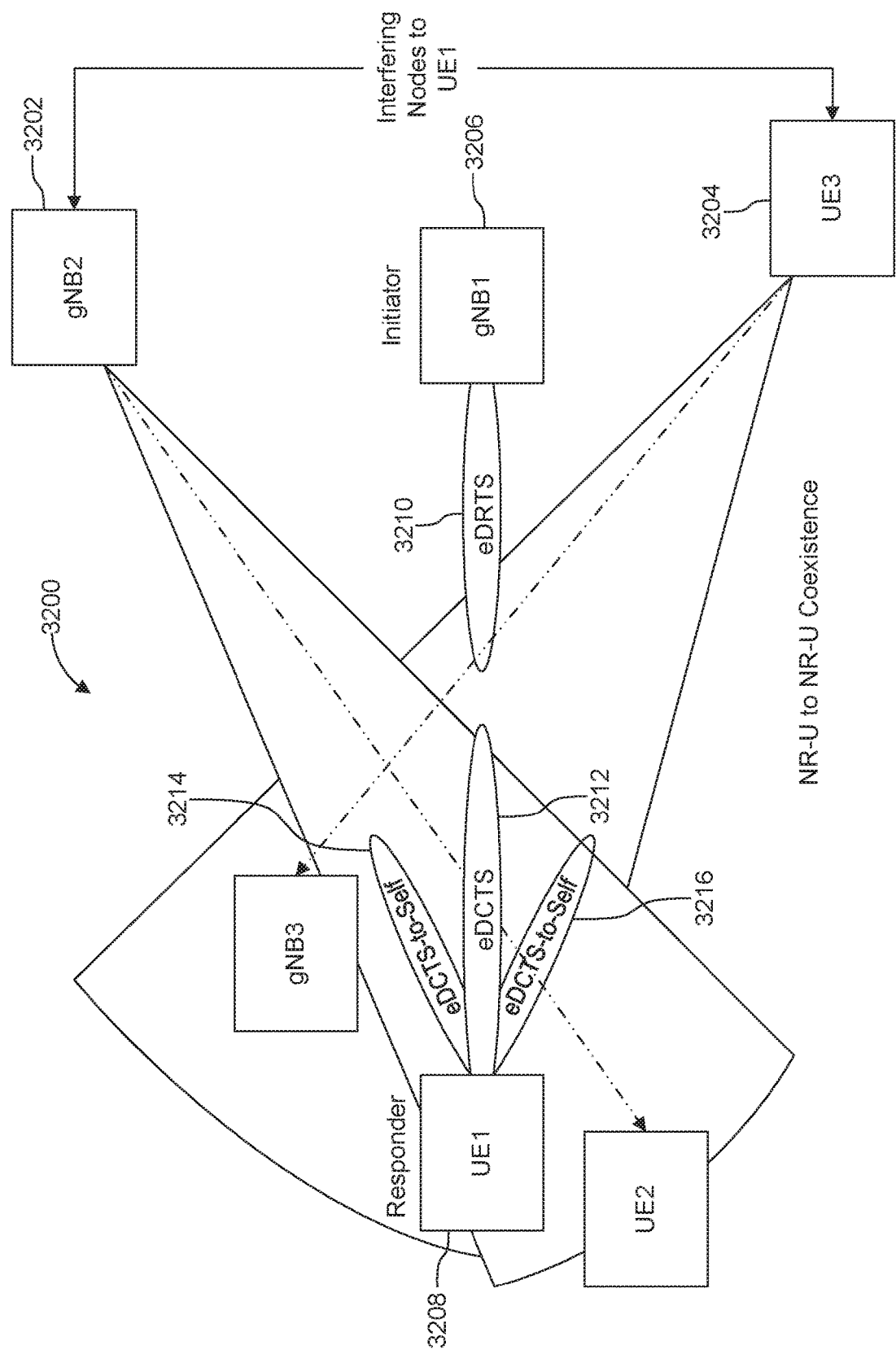
FIG. 39 illustrates an example interference scenario with an eDRTS, eDCTS, and multiple eDCTS-to-Self procedure in a NR-U to NR-U coexistence, in accordance with some embodiments.

FIG. 39 illustrates an example interference scenario with an eDRTS, eDCTS, and multiple eDCTS-to-Self procedure 3200 in a NR-U to NR-U coexistence, in accordance with some embodiments. In some embodiments, for instance, the example transmission configuration shown in FIG. 38 may be applied to the scenario illustrated in FIG. 39. As shown in FIG. 39, a gNB 3202 and a UE 3204 (also denoted as "gNB2" and "UE3," respectively) may be, for instance, nodes that may potentially cause interference to a UE 3208 (also denoted as "UE1"). As shown in FIG. 39, a gNB 3206 (also denoted as "gNB1") may transmit an eDRTS message 3210 for receipt by the UE 3208. Subsequently, the UE 3208 may transmit an eDCTS message 3212 using a beam directed in a direction towards the gNB 3206. The UE 3208 may also transmit multiple eDCTS-to-Self messages 3214 and 3216 directed towards the potentially interfering nodes. As illustrated, the UE 3208 may transmit the eDCTS-to-Self message 3214 using a beam directed in a direction of the gNB 3202 and may transmit the eDCTS-to-Self message 3216 using a beam directed in a direction of the UE 3204.

As noted above, potentially hidden nodes may interfere with directional transmission and reception at unlicensed frequencies. According to some embodiments, as described herein, a receiving UE may perform a directional channel access using enhanced messaging in multiple directions to reserve a channel between the UE and a transmitting node (e.g., a gNB).

In some embodiments, a method performed by a UE to reserve a channel may include: receiving an enhanced directional request-to-send (eDRTS) message from a transmitting node; transmitting an enhanced directional clear-to-send (eDCTS) message in a first direction toward the transmitting node; and transmitting an additional eDCTS message in a second direction toward a potentially interfering node.

In some embodiments, the second direction is different from the first direction.

In some embodiments, the UE may determine the second direction (of the potentially interfering node) from the eDRTS message or a listen-before-talk (LBT) assessment.

In some embodiments, the UE may transmit the eDCTS message multiple times within a MCOT.

In addition, various other and related embodiments have been described hereinabove.

According to some embodiments, a method of addressing, at a receiving device, a potential interference from one or more potentially hidden network nodes during directional transmission and reception between the receiving node and a transmitting node at unlicensed frequencies may include the receiving node performing a directional channel access using enhanced messaging in multiple directions to reserve a directional channel between the receiving node and the transmitting node. In some embodiments, the receiving node is a UE, and the transmitting node is a base station (e.g., a gNB).

According to some embodiments, a method performed by a device, such as, e.g., a UE, for a directional channel access is disclosed. Such method includes the device transmitting multiple channel reservation signals in one or more directions that are different than a direction of an intended receiver of a subsequent data transmission. In some embodiments, the method may further include: receiving a first type of message (e.g., an enhanced Directional-Request-To-Send (eDRTS)) in a first direction; and transmitting a second type of message (e.g., an enhanced Directional Clear-To-Send (eDCTS)) in the first direction and a second direction. In some embodiments, the first and second directions are different and at least one of the first and the second directions is a direction towards a potentially interfering node. In some embodiments, the direction towards the potentially interfering node may be indicated by the first type of message. In some embodiments, the second type of message is an enhanced Directional Clear-To-Send-to-Self (eDCTS-to-Self) message. In some other embodiments, the second type of message is an eDCTS, and the eDCTS may be sent repeatedly multiple times by the device within a given time duration, such as a maximum channel occupancy time (MCOT).

According to some embodiments, a method performed at a transmitting node includes: performing a first listen-before-talk (LBT) in a direction of a transmitting beam towards a receiving node; determining if a channel is busy based on the performed first LBT in the direction of the transmitting beam; performing a second LBT in a reverse direction; and determining if an interfering signal is detected from the reverse direction. In some embodiments, the method may further include deferring a transmission if the interfering signal is detected. Deferring the transmission may, for example, include waiting a backoff time and performing the first and second LBTs again. Further, various parameters, including for example, a configuration of a beam width, a number of predefined beams, an energy detection threshold, and/or MCS selection for a communication link may be adaptively chosen.

According to some embodiments, methods are disclosed for a NR-U and WiGig coexisting system, in which, for example, a device (e.g., a UE) may adaptively set a transmit power and/or a number of repetitions in a direction towards an interferer until the interferer backs off.

According to some embodiments, a method is disclosed for use among multiple nodes to enable a resource reuse in an unlicensed band by using a listen-before-talk (LBT) coordination. In such method, the unlicensed band may be a sub 6 GHz or mmWave band. Further, the multiple nodes may be associated with a given radio access technology (RAT) and/or a given operator.

According to some embodiments, a method for a coordinated listen-before-talk (LBT) signaling between nodes may include: receiving, at a first node, a request for a LBT coordination from a second node; and upon acceptance of the request at the first node, providing to the second node an indication of a given LBT coordination for completing a LBT backoff. In some embodiments, the method may further include the second node completing the LBT back off. In yet other embodiments, the method may further include using a transmit coordination between the first and second nodes for transmission by the second node when the LBT backoff is completed and the second node has access to a channel. The first and second nodes may be associated with a given radio access technology (RAT), such as the same RAT, and/or with a given operator, such as the same operator. Further, the first and second nodes may be coordinated for transmission in an unlicensed band, such as, e.g., a 5 GHz or 60 GHz band. In yet other embodiments, the method for the coordinated LBT signaling may further include providing, by the first node, to the second node at least one of a start time for transmit coordination and a transmit coordination strategy to be used after the LBT backoff is completed.

In the method for the coordinated LBT signaling, the LBT coordination may occur within a maximum channel occupancy time (MCOT). Further, the first and second nodes may be 5G nodes, such as a first gNB and a second gNB.

In some embodiments, the given LBT coordination for completing the LBT backoff may be a frequency-domain LBT coordination, where, for instance: upon the receipt of the request for the LBT coordination at the first node, the first node releases frequency resource(s); the first node provides an indication of the released frequency resource(s) to the second node; and upon receipt of the indication from the first node, the second node changes from a use of a wide-band LBT to a use of a sub-band LBT within the indicated released frequency resource(s). The released frequency resource(s) may be indicated in a frequency-related coordination acceptance, may include a bandwidth part (BWP), and/or may be released for a given period of time. Further, in some embodiments, a remaining backoff time may be sent by the second node concurrently or jointly with the request for the LBT coordination so that the first node can configure the released frequency resource(s) in accordance with the remaining backoff time.

In some embodiments, the given LBT coordination for completing the LBT backoff may be a frequency-domain LBT coordination, where, for instance: upon the receipt of the request for the LBT coordination at the first node, the first node releases temporal resource(s) for completing the LBT backoff; the first node provides an indication of the released temporal resource(s) to the second node; and upon receipt of the indication from the first node, the second node continues to use a wide-band LBT. The released temporal resource(s) may be indicated in a time-related coordination acceptance and/or may include one or more OFDM symbols. Further, in some embodiments, a remaining backoff time may be sent by the second node concurrently or jointly with the request for the LBT coordination so that the first node can configure the released temporal resource(s) in accordance with the remaining backoff time.

According to some embodiments, a method includes providing signaling associated with a listen-before-talk (LBT) coordination that is suitable for use over a 5G Xn interface. In some embodiments, the signaling associated with the LBT coordination may include a coordinated LBT request signaling (LBTRS). The LBTRS may be sent over the Xn interface by, e.g., a gNB detecting a busy channel due to a presence of a node that shares a radio access technology (RAT) with the gNB. Further, the LBTRS may include (i) a request for an intra-RAT LBT coordination within a maximum channel occupancy time (MCOT), (ii) a remaining backoff time, (iii) an identification of a gNB requesting the intra-RAT LBT coordination, and/or (iv) an identification of a gNB requested for the intra-RAT LBT coordination.

In some embodiments, the signaling associated with the LBT coordination may further include a coordinated LBT enabled signaling (LBTES). The LBTES may be sent over the Xn interface by a gNB that occupies a channel and receives the LBTRS. Further, the LBTES may include (i) a frequency-domain LBT coordination acceptance to complete a backoff, (ii) an indication of released resource(s) in a frequency domain, (iii) a time-domain LBT coordination acceptance to complete a backoff, (iv) a start time of a transmit coordination, (v) a transmit coordination strategy, (vi) a time to a maximum channel occupancy time (MCOT) limit, (vii) an identification of a gNB requesting the intra-RAT LBT coordination, and/or (viii) an identification of a gNB requested for the intra-RAT LBT coordination.

According to some embodiments, a method includes switching between at least two different modes of a listen-before-talk (LBT) in an unlicensed band. In some embodiments, multiple radio access technologies (RATs) coexist in the unlicensed band. Further, in some embodiments, the switching is carried out for directional transmissions and/or receptions. Yet further, the switching may be disabled for a given type of a channel access scheme associated with a NR (New Radio).

The at least two different types of LBT may include an omnidirectional LBT and a directional LBT. The switching may include switching (i) from an omnidirectional LBT to a paired LBT, (ii) from an omnidirectional LBT to a directional LBT, or (iii) from a paired LBT to a directional LBT.

In some embodiments, the switching includes switching from an omnidirectional LBT to a directional LBT when the omnidirectional LBT prevents a given number of accesses to a channel, such as due to exposed node(s) rather than due to interference.

In other embodiments, the switching includes switching from an omnidirectional LBT to a directional LBT, where the switching from the omnidirectional LBT to the directional LBT includes: a transmitting node tracking channel accesses in which a status of "busy" was determined by the omnidirectional LBT, and saving time instants corresponding to the determinations; upon accessing the channel, the transmitting node sending information to a receiving node regarding the time instants of prevented channel accesses; the receiving node comparing the received prevented channel access time instants from the transmitting node with results of a continuous ED (energy detection) carrier sense performed at the receiving node; and the receiving node notifying the transmitting node of a result of the comparison. In some embodiments, based on the notification from the receiving node, the transmitting node continues to use the omnidirectional LBT or switches to the directional LBT.

According to some embodiments, a method of modifying a contention window size (CWS) for directional transmissions includes a user device, such as, e.g., a user equipment (UE), requesting a backoff from a base station, such as, e.g., a gNB.

According to some embodiments, a method of modifying a contention window size (CWS) for directional transmissions at a base station (e.g., a gNB) is disclosed. Such method is based on a paired sensing at a targeted user device (e.g., a user equipment (UE)).

According to some embodiments, a method for a dynamic downlink/uplink switching configuration per beam pair link (BPL) includes using, e.g., periodic enhanced Directional Clear-To-Send-to-Self (eDCTS-to-Self) transmissions. In some embodiments, during data transmission, a transmitter or a receiver or both may periodically transmit multiple eDCTS-to-Self messages to keep a directional channel reserved.

Although features and elements are described herein in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method performed by a receiving node, the method comprising:
    receiving a Request-to-Send (RTS) message from a transmitting node;
    transmitting a Clear-to-Send (CTS) message using one or more first beams, with at least one first beam being directed in a first direction towards the transmitting node;
    determining a second direction, the second direction being a different direction than the first direction;
    transmitting at least one additional CTS message using one or more second beams, with at least one second beam being directed in the second direction;
    receiving data from the transmitting node; and
    in between receiving the data from the transmitting node, periodically transmitting subsequent one or more additional CTS messages in at least the second direction within a maximum channel occupancy time (MCOT).

2. The method of claim 1, wherein:
    the receiving node is a wireless transmit/receive unit, and
    the transmitting node is a base station.

3. The method of claim 1, wherein determining the second direction comprises:
    determining the second direction based on information from a listen-before-talk (LBT) assessment.

4. The method of claim 1, wherein the RTS message contains an indication of the second direction, and wherein determining the second direction comprises:
    determining the second direction based on the indication in the RTS message.

5. The method of claim 1, wherein determining the second direction comprises:
    determining the second direction based on directional channel measurements.

6. The method of claim 1, wherein:
    the RTS message is an enhanced RTS (eRTS) message, and
    the CTS message is an enhanced CTS (eCTS) message.

7. The method of claim 1, wherein the at least one additional CTS message is an enhanced CTS-to-Self (eCTS-to-Self) message.

8. The method of claim 1, wherein the CTS message transmitted towards the transmitting node indicates a count of eCTS-to-Self message transmissions to be performed by the receiving node.

9. The method of claim 1, wherein the at least one additional CTS message includes a defer duration field that specifies an amount of time for which a transmission is to be deferred.

10. The method of claim 1, wherein the at least one additional CTS message indicates a remaining time for which the directional channel is reserved.

11. The method of claim 1, wherein transmitting the at least one additional CTS message comprises:

transmitting the at least one additional CTS message multiple times within the maximum channel occupancy time (MCOT).

12. The method of claim 1, wherein transmitting the at least one additional CTS message using the one or more second beams comprises:
    transmitting the at least one additional CTS message on different beams.

13. The method of claim 1, further comprising:
    receiving a second RTS message from the transmitting node; and
    on condition that the receiving node detects interferences in a direction of one of the receiving node or transmitting node, transmitting a Deny-to-Send (DTS) message to the transmitting node in response to the second RTS message when the receiving node detects potential directional interference.

14. The method of any of claim 13, wherein:
    the DTS message is an enhanced DTS (eDTS) message, and
    the eDTS message identifies a node transmitting an interfering signal.

15. The method of claim 1, wherein a number of the at least one additional CTS message to be transmitted is based on at least one of (i) a number of potentially interfering nodes, (ii) a power of the one or more second beams, and (iii) a width of the one or more second beams.

16. The method of claim 1, wherein contents of each of the RTS, CTS, and the at least one additional CTS message is scrambled using a sequence that is common to a group of cells.

17. The method of claim 1, further comprising:
    performing a first directional listen-before-talk (LBT) assessment in a direction towards another node to which the receiving node intends to transmit, wherein the another node is different from the transmitting node;
    determining if a channel between the receiving node and the another node is busy based on the performed first directional LBT assessment;
    performing a second directional LBT assessment in a reverse direction; and
    determining if an interfering signal is detected from the reverse direction so as to either proceed with a transmission to the another node or defer the transmission if the interfering signal is detected.

18. A wireless transmit/receive unit (WTRU) comprising:
    a processor; and
    a memory storing a plurality of instructions that, when executed by the processor, cause the processor to:
    receive a Request-to-Send (RTS) message from a transmitting node;
    transmit a Clear-to-Send (CTS) message using one or more first beams, with at least one first beam being directed in a first direction towards the transmitting node;
    determine a second direction, the second direction being a different direction than the first direction;
    transmit at least one additional CTS message using one or more second beams, with at least one second beam being directed in the second direction;
    receive data from the transmitting node; and
    in between receiving the data from the transmitting node, periodically transmit subsequent one or more additional CTS messages in at least the second direction within a maximum channel occupancy time (MCOT).

19. A method performed by a receiving node, the method comprising:
    receiving an enhanced Request-to-Send (eRTS) message from a transmitting node;
    transmitting an enhanced Clear-to-Send (eCTS) message using one or more first beams, with at least one first beam being directed in a first direction towards the transmitting node;
    determining a second direction, the second direction being a different direction than the first direction; and wherein the eRTS message contains an indication of the second direction, and wherein determining the second direction comprises determining the second direction based on the indication in the eRTS message; and
    transmitting at least one additional CTS message using one or more second beams, with at least one second beam being directed in the second direction; wherein the at least one additional CTS message is an enhanced CTS-to-Self (eCTS-to-Self) message.

20. A receiving node comprising:
    a processor; and
    a memory storing a plurality of instructions that, when executed by the processor, cause the processor to:
    receive an enhanced Request-to-Send (eRTS) message from a transmitting node;
    transmit an enhanced Clear-to-Send (eCTS) message using one or more first beams, with at least one first beam being directed in a first direction towards the transmitting node;
    determine a second direction, the second direction being a different direction than the first direction; and wherein the eRTS message contains an indication of the second direction, and wherein determining the second direction comprises determining the second direction based on the indication in the DRTS message; and
    transmit at least one additional CTS message using one or more second beams, with at least one second beam being directed in the second direction; wherein the at least one additional CTS message is anenhanced DCTS-to-Self (eCTS-to-Self) message.

21. The method of claim 1, wherein the second direction is a direction toward a potentially interfering node.

22. The method of claim 18, wherein the second direction is a direction toward a potentially interfering node.

23. The method of claim 19, wherein the second direction is a direction toward a potentially interfering node.

24. The method of claim 20, wherein the second direction is a direction toward a potentially interfering node.

25. The WTRU of claim 18 further configured to:
    determine the second direction based on information from a listen-before-talk (LBT) assessment.

26. The WTRU of claim 18, wherein the RTS message contains an indication of the second direction, and wherein determining the second direction comprises:
    determining the second direction based on the indication in the RTS message.

27. The WTRU of claim 18, wherein determining the second direction comprises:
    determining the second direction based on directional channel measurements.

28. The WTRU of claim 18, wherein the at least one additional CTS message includes a defer duration field that specifies an amount of time for which a transmission is to be deferred.

29. The WTRU of claim 18, wherein the at least one additional CTS message indicates a remaining time for which the directional channel is reserved.

30. The WTRU of claim 18, wherein transmitting the at least one additional CTS message comprises:
- transmitting the at least one additional CTS message multiple times within the maximum channel occupancy time (MCOT).

31. The WTRU of claim 18, wherein transmitting the at least one additional CTS message using the one or more second beams comprises:
- transmitting the at least one additional CTS message on different beams.

32. The WTRU of claim 18, wherein a number of the at least one additional CTS message to be transmitted is based on at least one of (i) a number of potentially interfering nodes, (ii) a power of the one or more second beams, and (iii) a width of the one or more second beams.

\* \* \* \* \*